US006216265B1

(12) United States Patent
Roop et al.

(10) Patent No.: US 6,216,265 B1
(45) Date of Patent: *Apr. 10, 2001

(54) SYSTEM AND METHOD FOR TRANSMITTING AND UTILIZING ELECTRONIC PROGRAM GUIDE INFORMATION

(75) Inventors: John H. Roop, Palo Alto; Alan R. Ebright, Los Gatos; Jeffrey J. Kochy, San Jose; David P. Warden; Konstantine Sokolik, both of Redwood City; Giambattista A. Alegiani, San Francisco, all of CA (US)

(73) Assignee: Starsight Telecast, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/096,269

(22) Filed: Jun. 11, 1998

Related U.S. Application Data

(63) Continuation of application No. 08/239,225, filed on May 4, 1994, now Pat. No. 5,790,198, which is a continuation-in-part of application No. 08/198,538, filed on Feb. 18, 1994, now Pat. No. 5,479,268, which is a continuation of application No. 07/579,555, filed on Sep. 10, 1990, now abandoned.

(51) Int. Cl.[7] .................................................. H04N 5/445

(52) U.S. Cl. .............................................. 725/54; 725/50

(58) Field of Search .............................. 348/6, 7, 10, 12, 348/13, 906, 552, 563–570, 731–734; 345/327, 328

(56) References Cited

U.S. PATENT DOCUMENTS

| 3,848,193 | 11/1974 | Martin et al. ........................... 325/53 |
| 3,987,398 | 10/1976 | Fung ................................... 325/309 |
| 4,287,593 | 9/1981 | Paulish et al. ......................... 370/88 |
| 4,307,446 | 12/1981 | Barton et al. ........................ 364/200 |
| 4,347,498 | 8/1982 | Lee et al. ......................... 340/825.02 |
| 4,587,514 | 5/1986 | Schas et al. .......................... 340/347 |
| 4,691,351 | * 9/1987 | Hayashi et al. ...................... 348/475 |
| 4,706,121 | * 11/1987 | Young ................................... 348/473 |
| 4,710,971 | * 12/1987 | Nozaki et al. ........................... 348/7 |
| 4,742,543 | 5/1988 | Frederiksen ............................ 380/9 |
| 4,751,578 | * 6/1988 | Reiter et al. .......................... 348/10 |

(List continued on next page.)

FOREIGN PATENT DOCUMENTS

| 0648980 | * 8/1990 | (AU) ................................... 348/460 |
| 2918846 A1 | 5/1979 | (DE) . |
| 0 055674 A1 | 12/1981 | (EP) . |

(List continued on next page.)

OTHER PUBLICATIONS

A. James, "ORACLE–Broadcasting the Written Word", *Wireless World,* Jul. 1973, pp. 314–316.

G.A. McKenzie, "ORACLE–An Information Broadcasting Service Using Data Transmission in the Vertical Interval", *Journal of the SMPTE,* Jan. 1974, vol. 83, No. 1, pp. 6–10.

(List continued on next page.)

*Primary Examiner*—Nathan Flynn
(74) *Attorney, Agent, or Firm*—Christie, Parker & Hale, LLP

(57) ABSTRACT

Television schedule information transmission and utilization systems (50A–50D) transmit TV schedule data and associated network control messages provided by computer (54) as packets via the Video Blanking Interval (VBI) lines in the TV signal from various television program providers (51). This data is acquired by regional data processing systems and forwarded by the regional data processing systems to subscriber units (52) and used to construct an internal database. This intern database can be accessed by the subscriber unit (52) to display a TV schedule for the channels that are received by the user's TV.

24 Claims, 42 Drawing Sheets

U.S. PATENT DOCUMENTS

| | | | |
|---|---|---|---|
| 4,787,085 | 11/1988 | Suto et al. | 370/110.1 |
| 4,829,569 | 5/1989 | Seth-Smith et al. | 380/10 |
| 4,857,799 | 8/1989 | Spindt et al. | 313/495 |
| 4,866,770 | 9/1989 | Seth-Smith et al. | 380/20 |
| 4,868,866 * | 9/1989 | Williams, Jr. | 348/6 |
| 4,890,321 | 12/1989 | Seth-Smith et al. | 380/20 |
| 4,908,707 * | 3/1990 | Kinghorn | 348/731 |
| 4,908,713 | 3/1990 | Levine | 358/335 |
| 4,977,455 * | 12/1990 | Young | 348/906 |
| 4,987,486 | 1/1991 | Johnson et al. | 358/86 |
| 4,991,011 | 2/1991 | Johnson et al. | 358/141 |
| 4,994,908 | 2/1991 | Kuban et al. | 358/86 |
| 4,994,909 | 2/1991 | Graves et al. | 358/86 |
| 5,001,554 | 3/1991 | Johnson et al. | 358/86 |
| 5,053,883 | 10/1991 | Johnson | 358/349 |
| 5,075,771 * | 12/1991 | Hashimoto | 348/13 |
| 5,077,607 | 12/1991 | Johnson et al. | 358/86 |
| 5,091,936 | 2/1992 | Katznelson et al. | 380/19 |
| 5,099,319 | 3/1992 | Esch et al. | 358/86 |
| 5,151,782 | 9/1992 | Ferraro | 358/86 |
| 5,151,789 * | 9/1992 | Young | 348/6 |
| 5,182,640 * | 1/1993 | Takano | 348/722 |
| 5,200,823 * | 4/1993 | Yoneda et al. | 348/473 |
| 5,220,420 * | 6/1993 | Hoarty et al. | 348/12 |
| 5,283,639 * | 2/1994 | Esch et al. | 348/722 |
| 5,285,272 * | 2/1994 | Bradley et al. | 348/6 |
| 5,293,357 | 3/1994 | Hallenbeck | 348/734 |
| 5,301,028 | 4/1994 | Banker et al. | 348/570 |
| 5,319,707 | 6/1994 | Wasilewski et al. | 380/14 |
| 5,337,155 * | 8/1994 | Cornelis | 348/473 |
| 5,343,300 * | 8/1994 | Hennig | 348/478 |
| 5,345,594 * | 9/1994 | Tsuda | 348/6 |
| 5,355,480 | 10/1994 | Smith et al. | 395/600 |
| 5,357,276 | 10/1994 | Banker et al. | 348/7 |
| B1 4,706,121 | 12/1993 | Young | 358/142 |

FOREIGN PATENT DOCUMENTS

| | | | |
|---|---|---|---|
| 0566454 * | 10/1993 | (EP) | 348/906 |
| 0 566 454 A1 | 4/1993 | (FR) . | |
| 2 256 549 | 5/1992 | (GB) . | |
| 2256549 * | 12/1992 | (GB) | 348/460 |
| 01018380 * | 1/1989 | (JP) | H04N/7/08 |
| WO 90/07844 | 7/1990 | (WO) . | |
| WO 93/11640 | 6/1993 | (WO) . | |
| WO 93/22877 | 11/1993 | (WO) . | |
| WO 93/23957 | 11/1993 | (WO) . | |
| WO 94/13096 | 6/1994 | (WO) . | |
| WO 94/17630 | 9/1994 | (WO) . | |
| WO 94/17633 | 9/1994 | (WO) . | |
| WO 94/19881 | 9/1994 | (WO) . | |
| WO 94/19909 | 9/1994 | (WO) . | |
| WO 94/24826 | 10/1994 | (WO) . | |
| WO 94/29811 | 12/1994 | (WO) . | |
| WO 94/29840 | 12/1994 | (WO) . | |
| WO 94/3008 | 12/1994 | (WO) . | |

OTHER PUBLICATIONS

N.W. Green "ORTICLE –The Problems of Implementing a Teletext System on Independent Television and Their Solution", Colloquium on "Broadcast and Wired Teletext Systems–CEEFAX, ORACLE, VIEWDATA" Organized by Professional Group E14, Jan. 13, 1976, Digest No. 197613.

G. Robinson and W. Loveless "'Touch–Tone' Teletext, A Combined Teletext–Viewdata System", *IEEE Transactions On Consumer Electronics,* vol. CE25 No. 3, Jul. 1979, pp. 299–303.

G.O. Crowther, "Teletext and Viewdata Systems and Their Possible Extension To Europe and USA", *Ieee Transactions On Consumer Electronics* , vol. CE25, No. 3, Jul. 1979, pp. 288–294.

Joseph Roizen, "Teletex in the USA", *Journal of the SMPTE,* Jul. 1981 pp. 602–610.

Jan Gecsei, *The Architecture of Videotex Systems,* 1983, pp. 174–77; 233–38.

S. Money, *Teletext and Viewdata* (1979) "Ch. 10: Viewdata", pp. 112–23.

System as described in DIP II ad.

System as described in Cable Data ad.

Supplemental Search Report, Application No. EP 95 92 1225, Aug. 27, 1999, 6 pages.

* cited by examiner

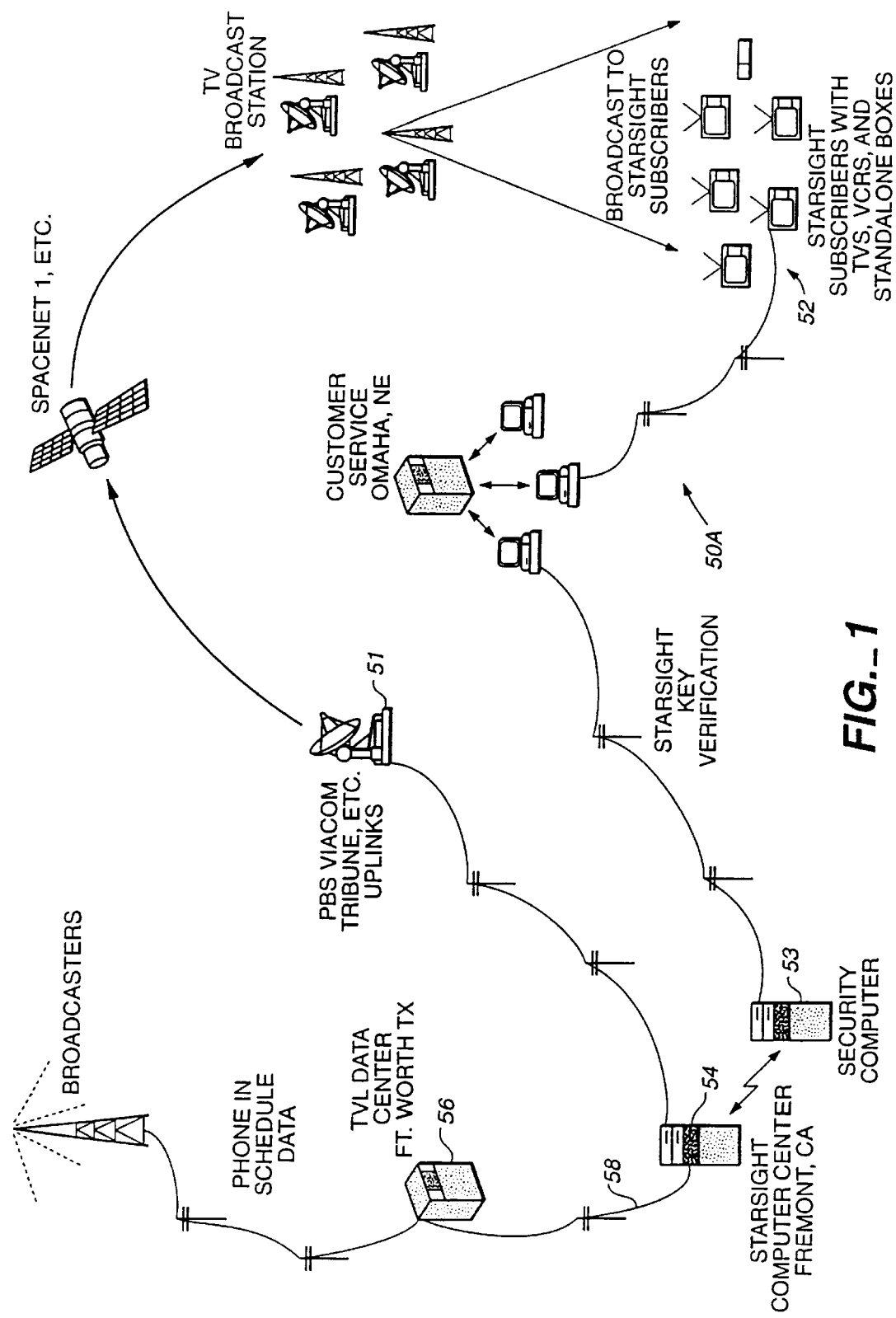
FIG._1

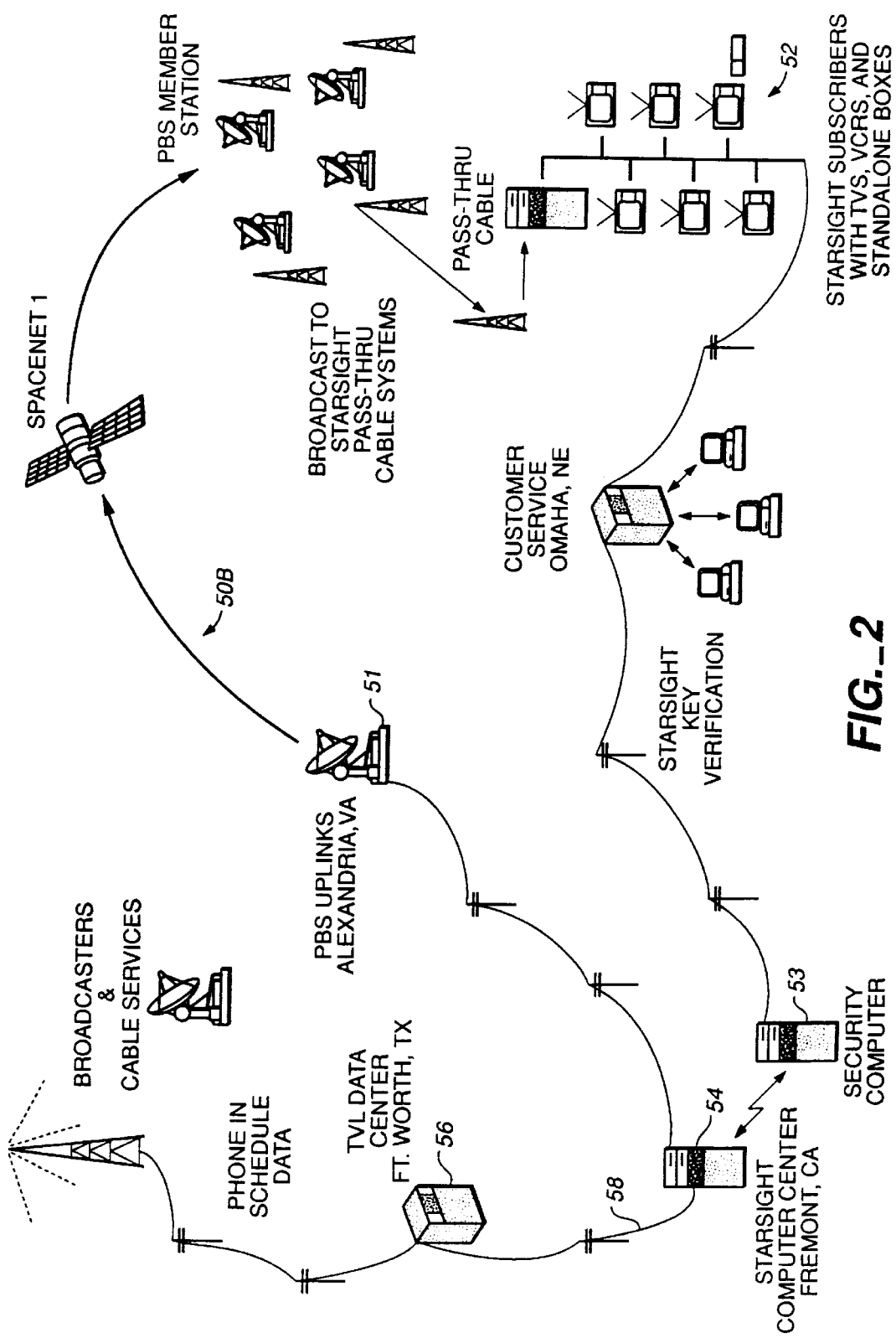
FIG._2

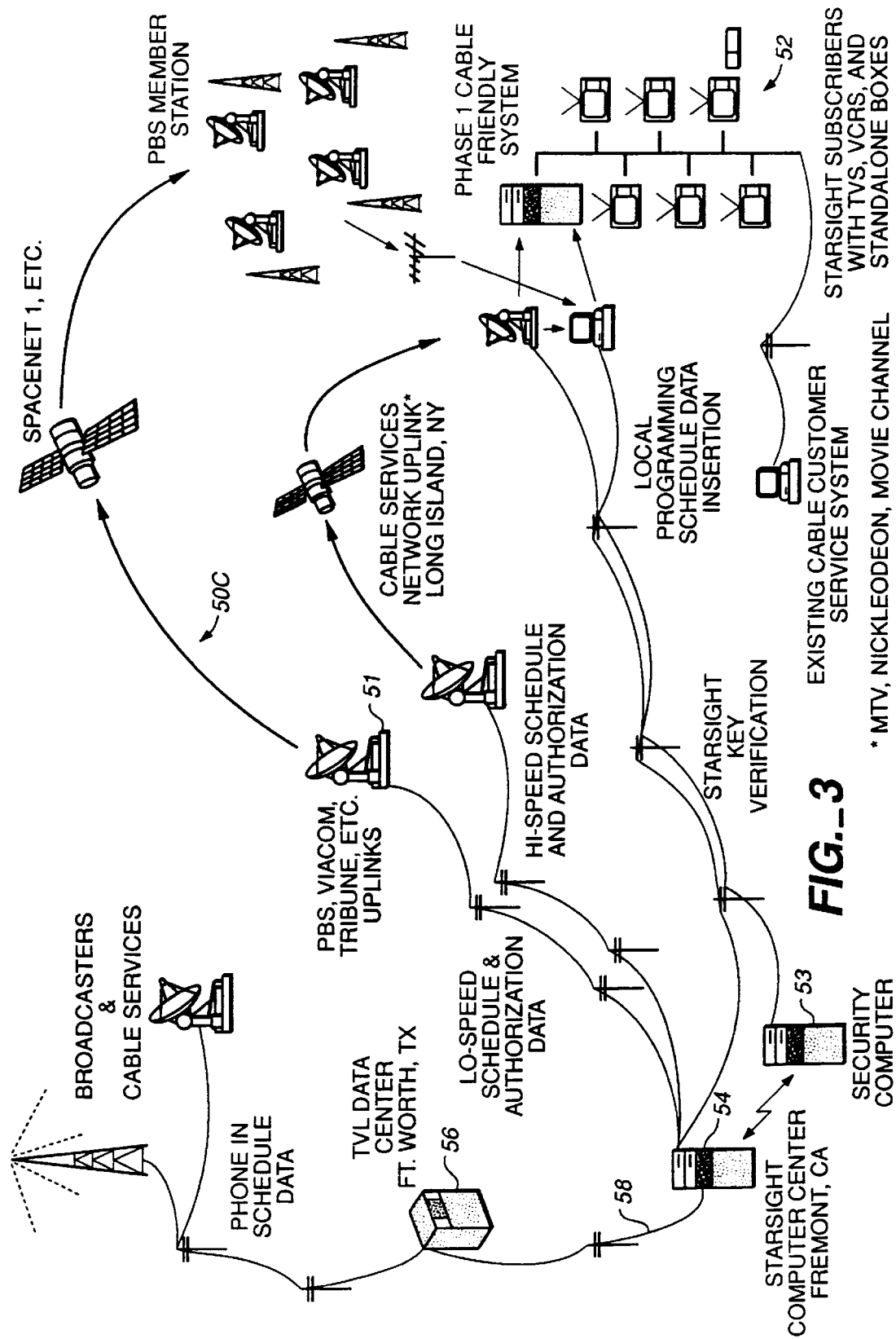
FIG._3

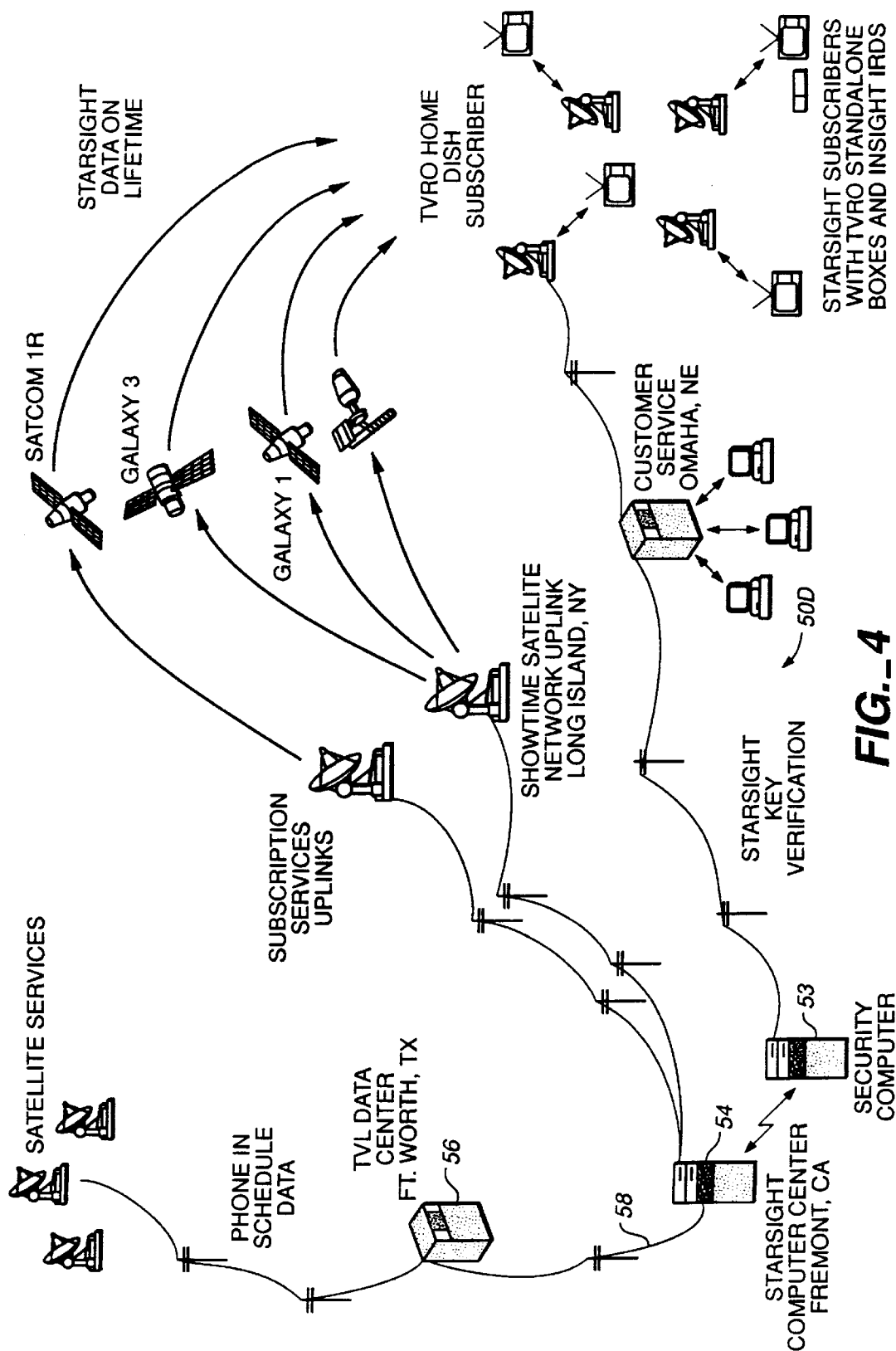
FIG._4

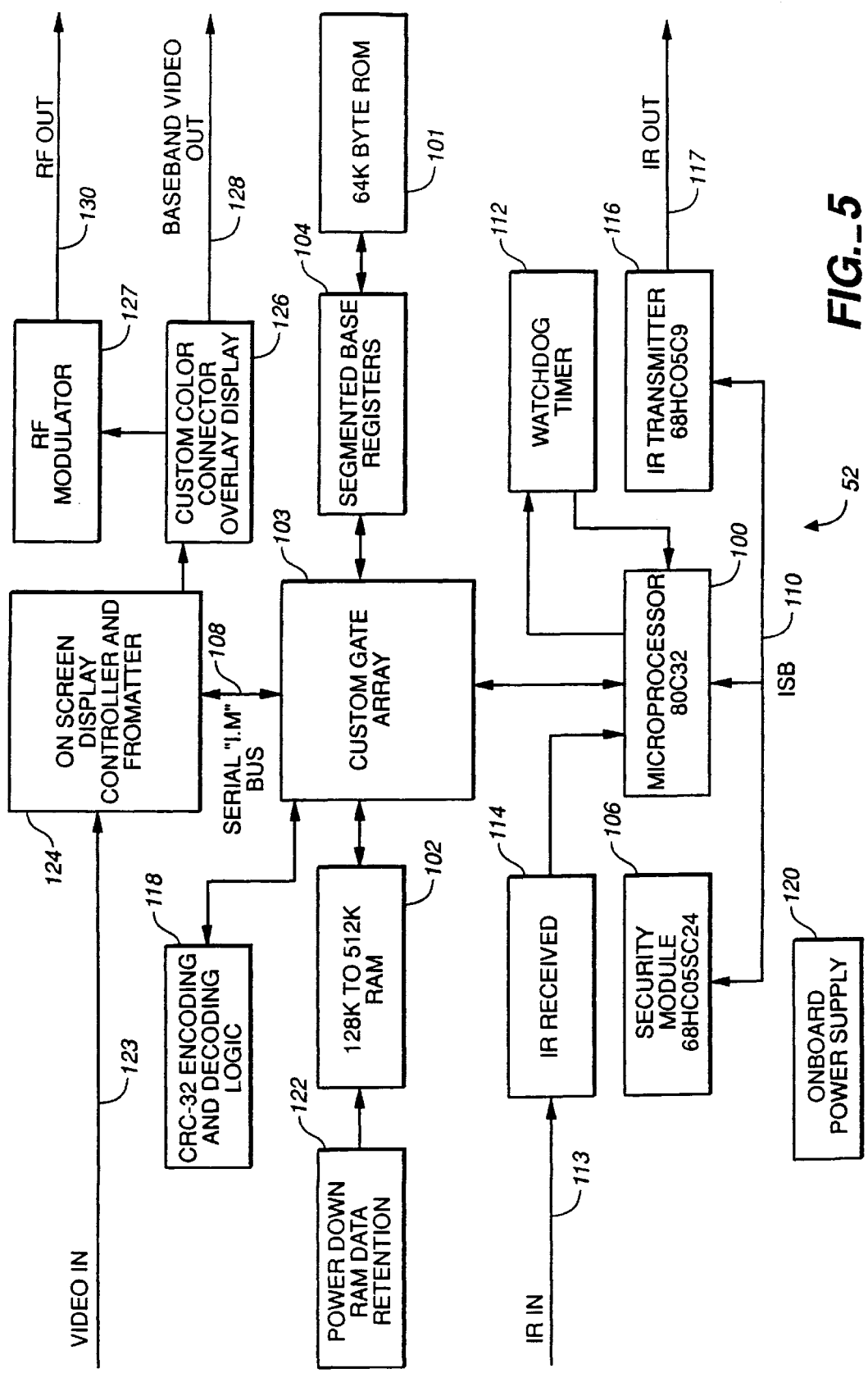
FIG._5

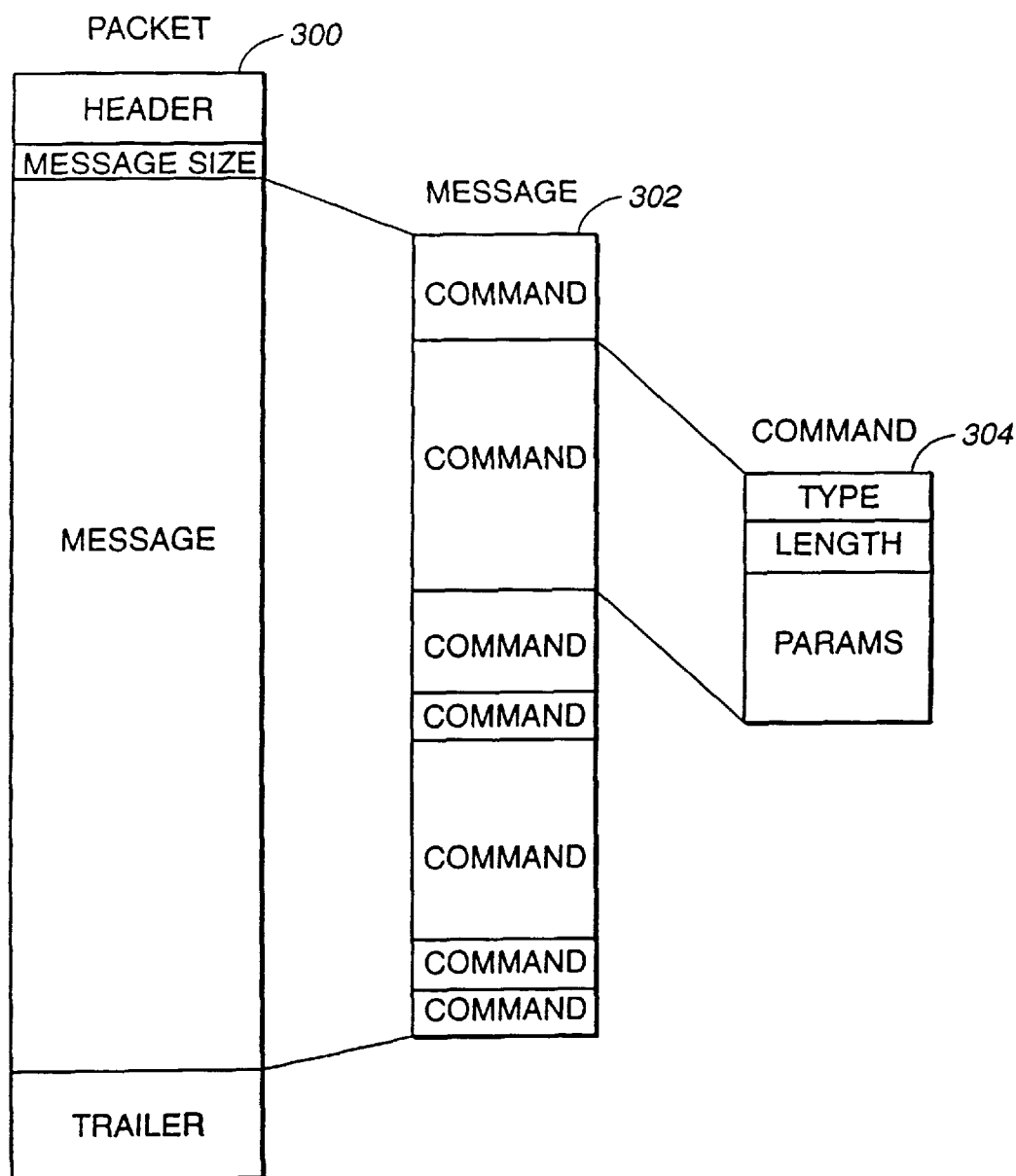
FIG._6

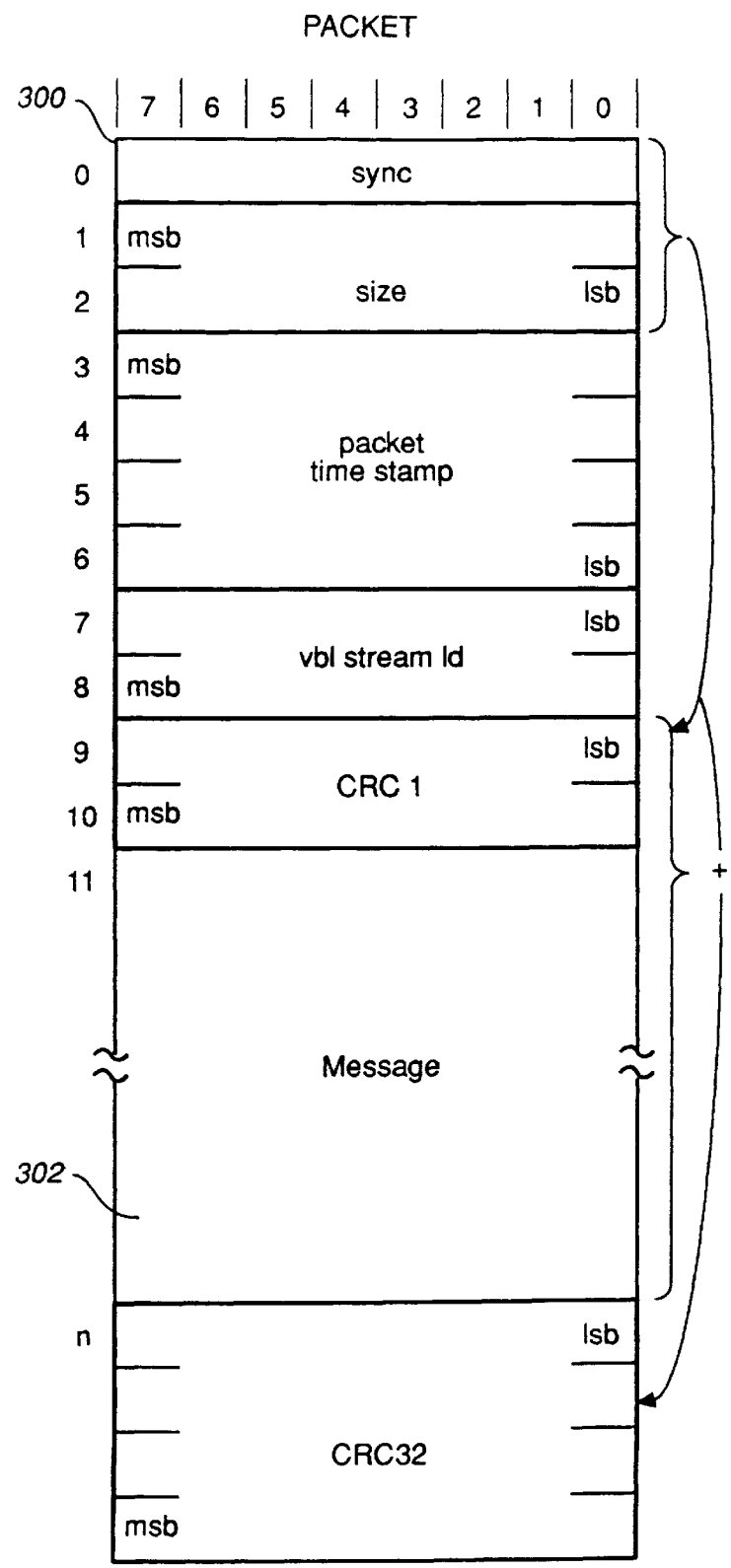
FIG._7

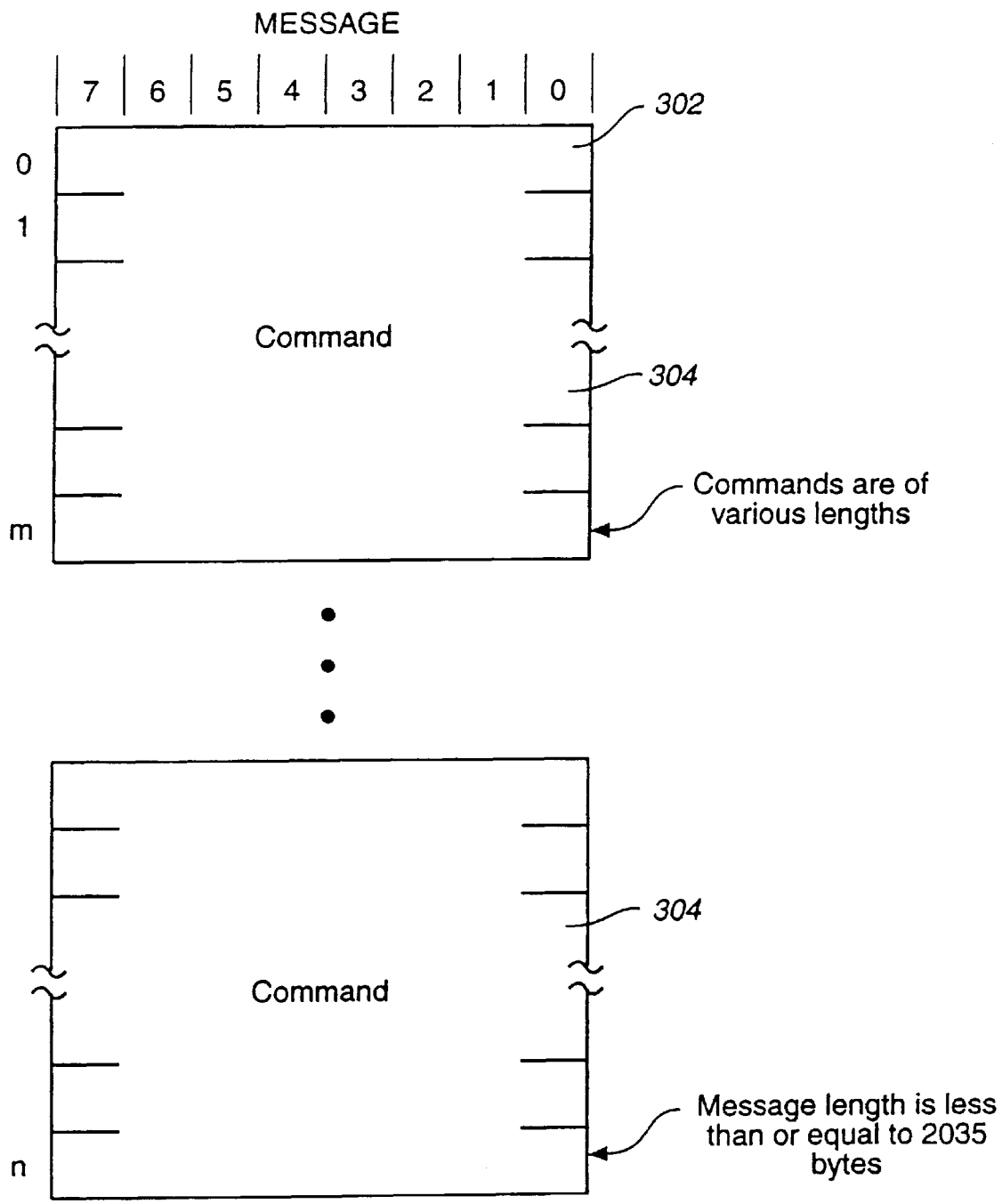
FIG._8

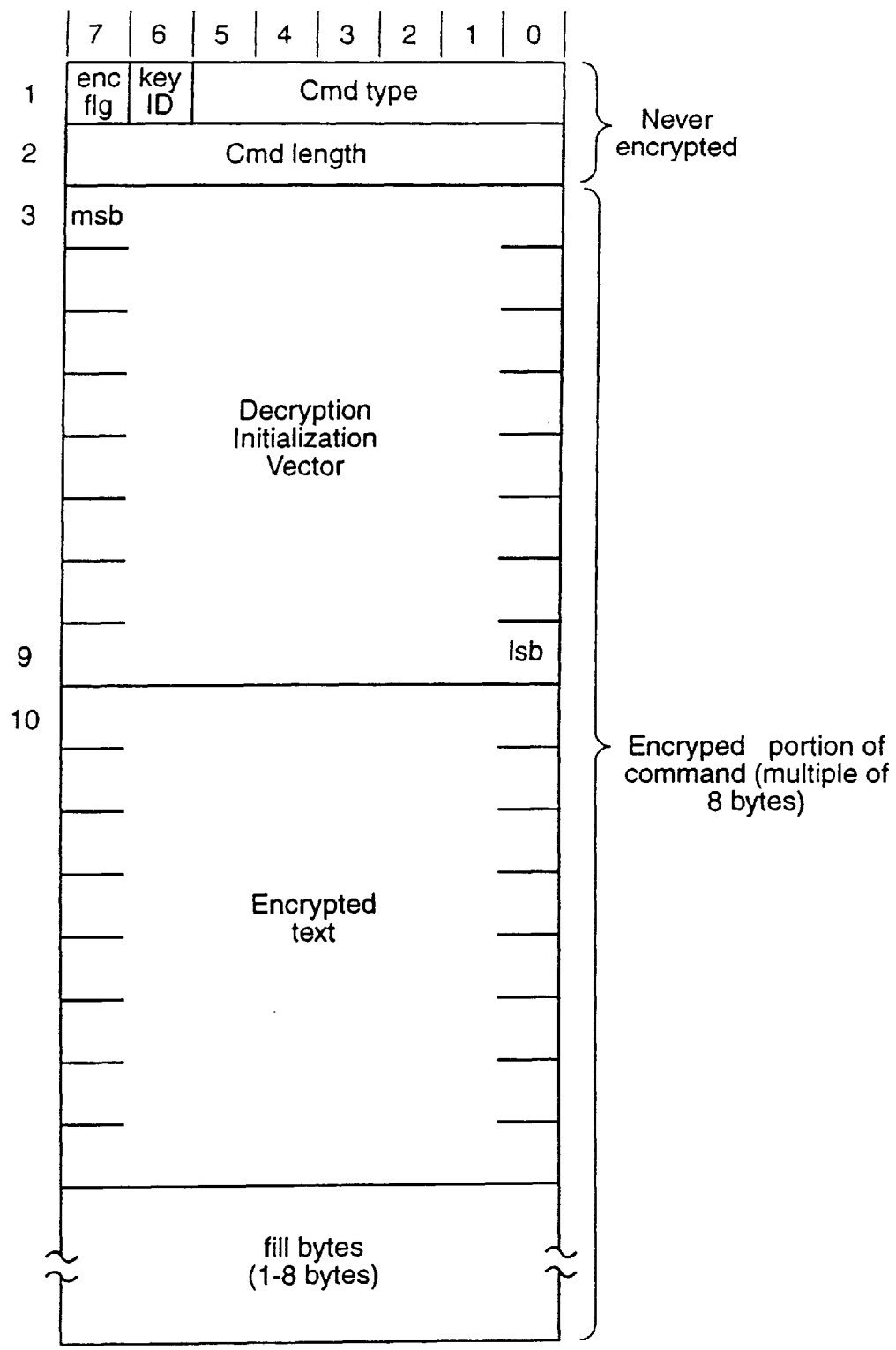
FIG._9

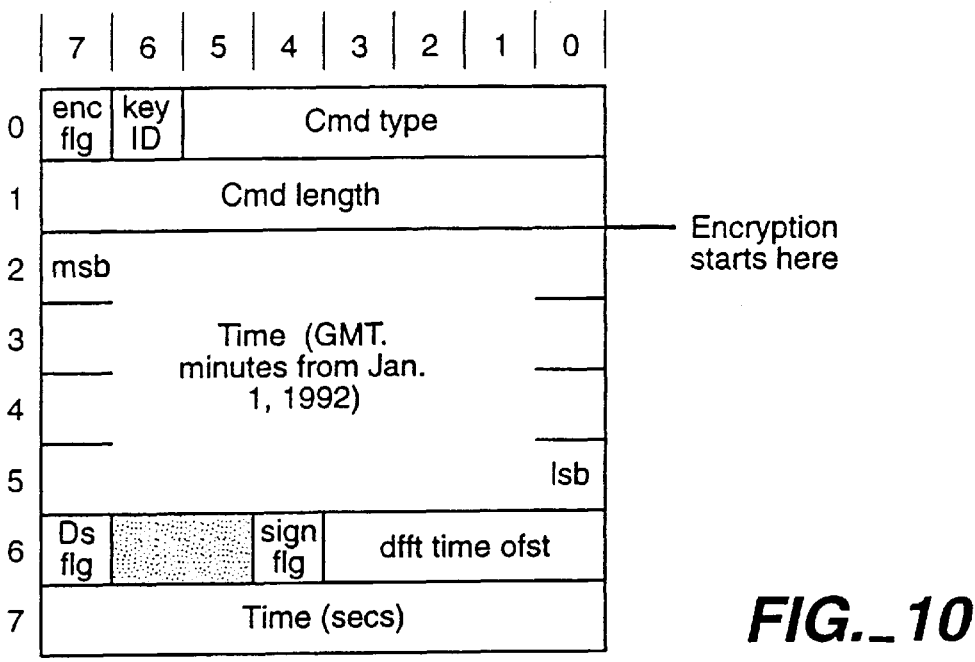
*FIG._10*
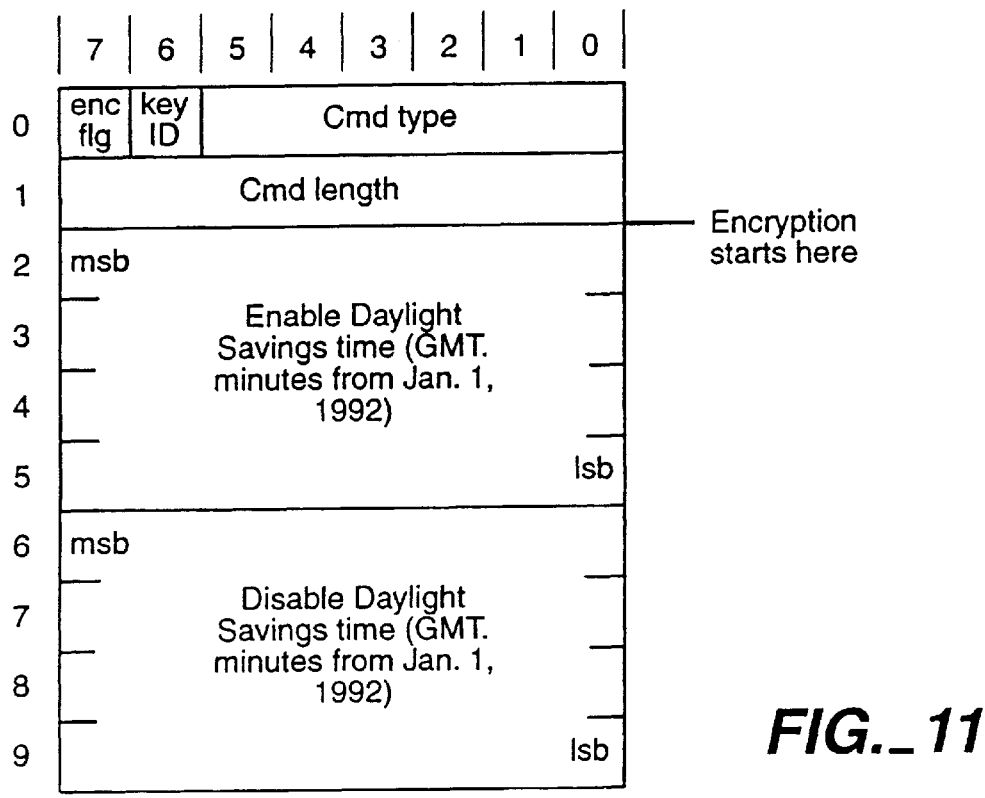
*FIG._11*

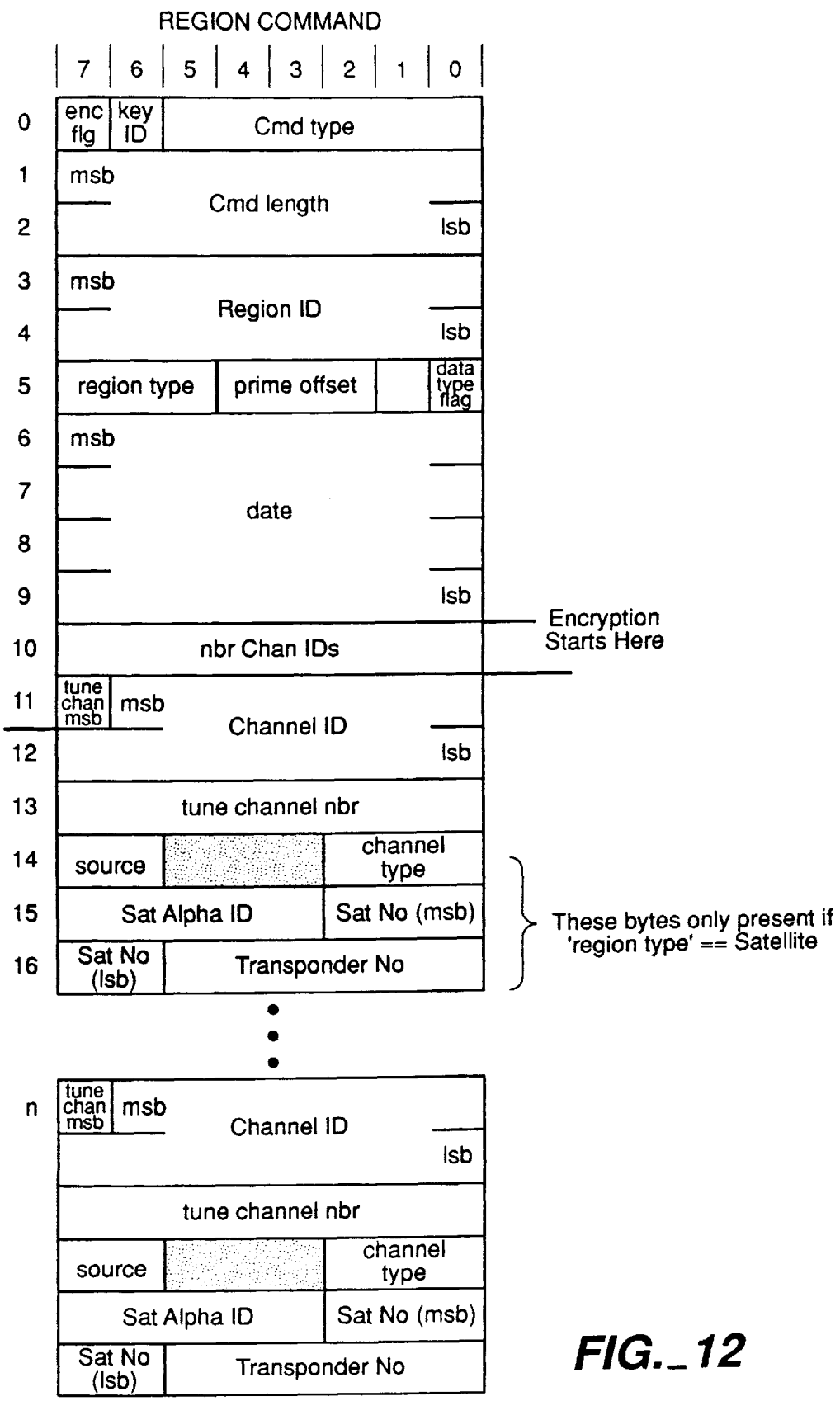
FIG._12

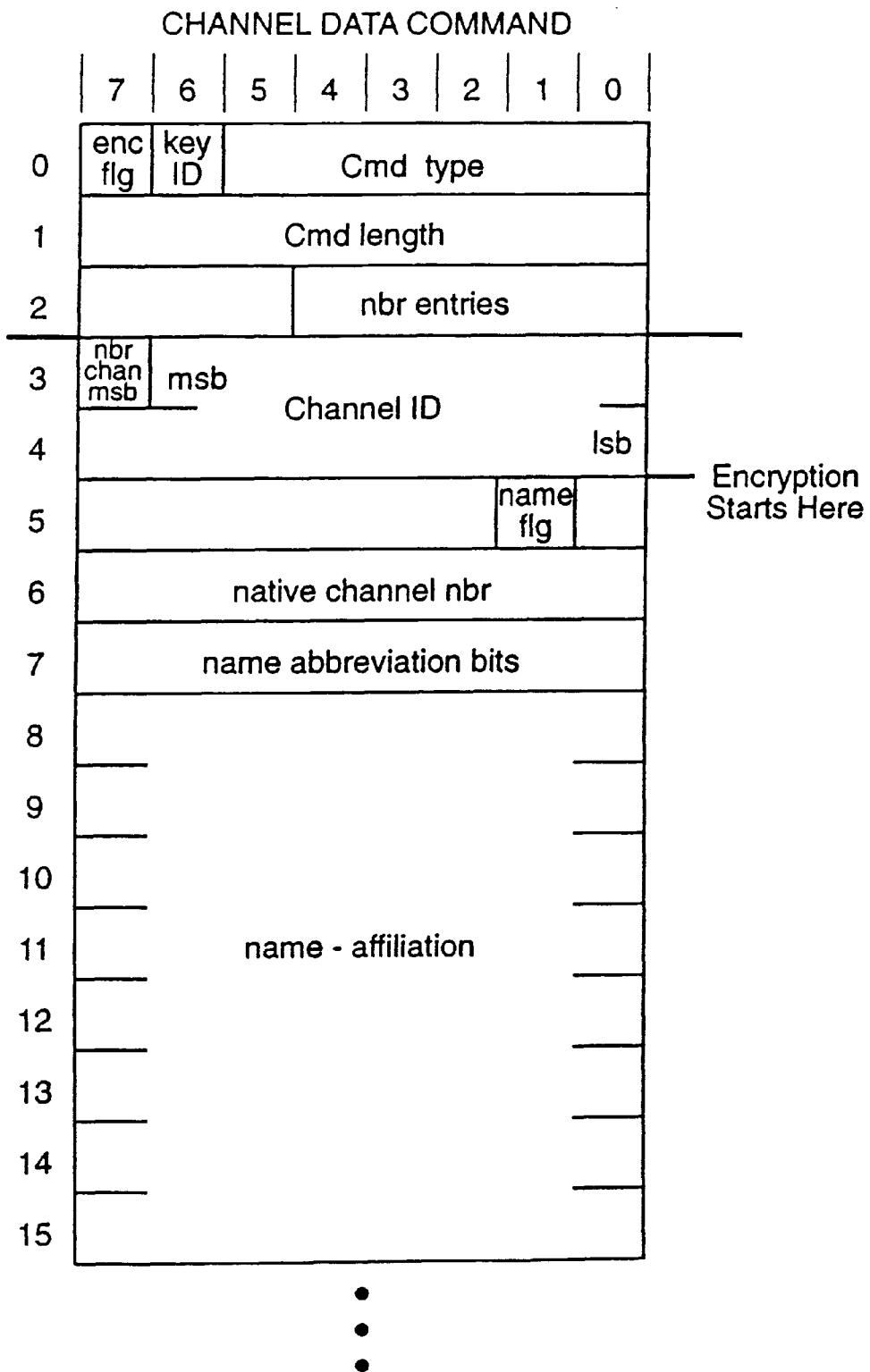
FIG._13

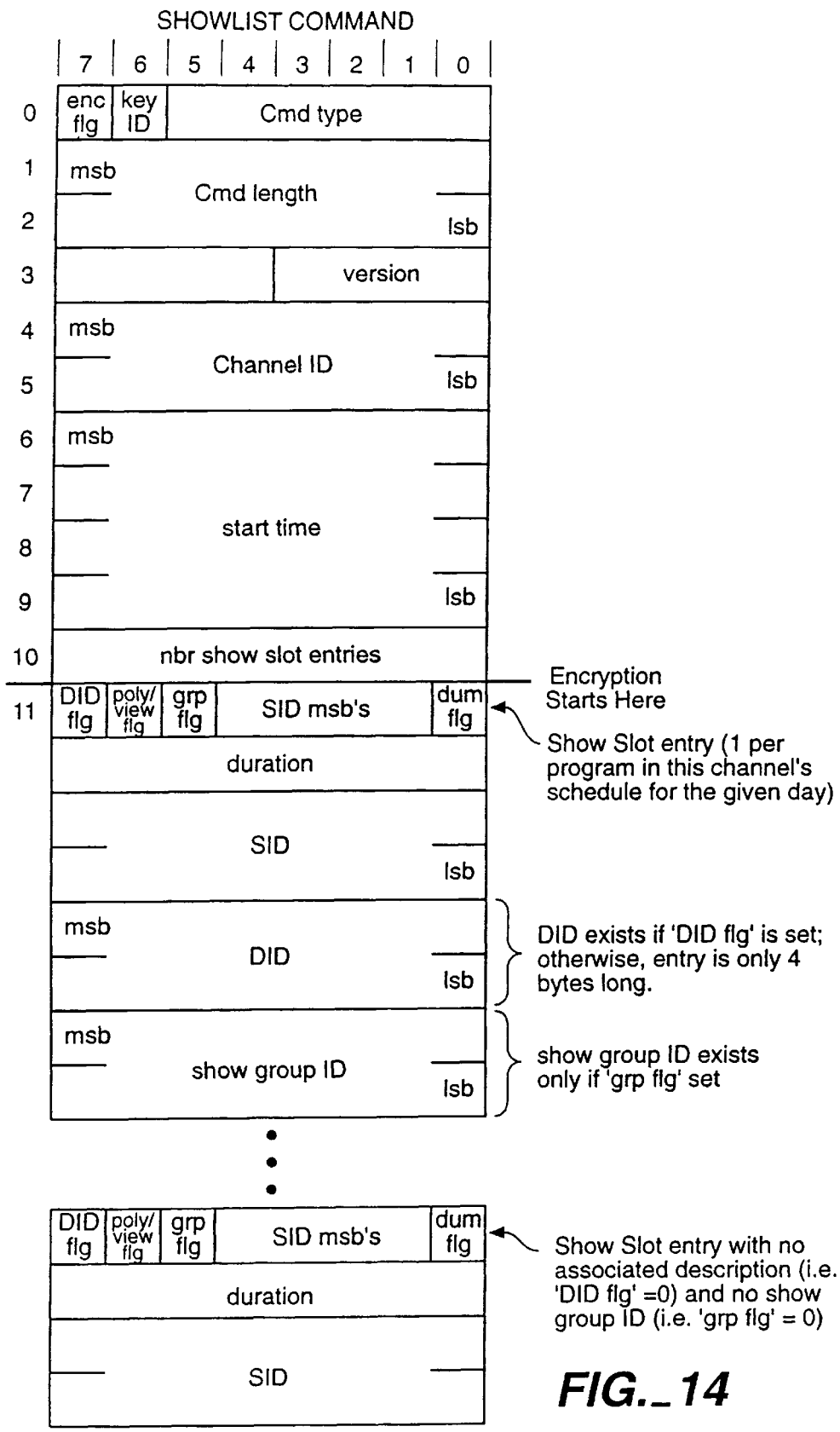
FIG._14

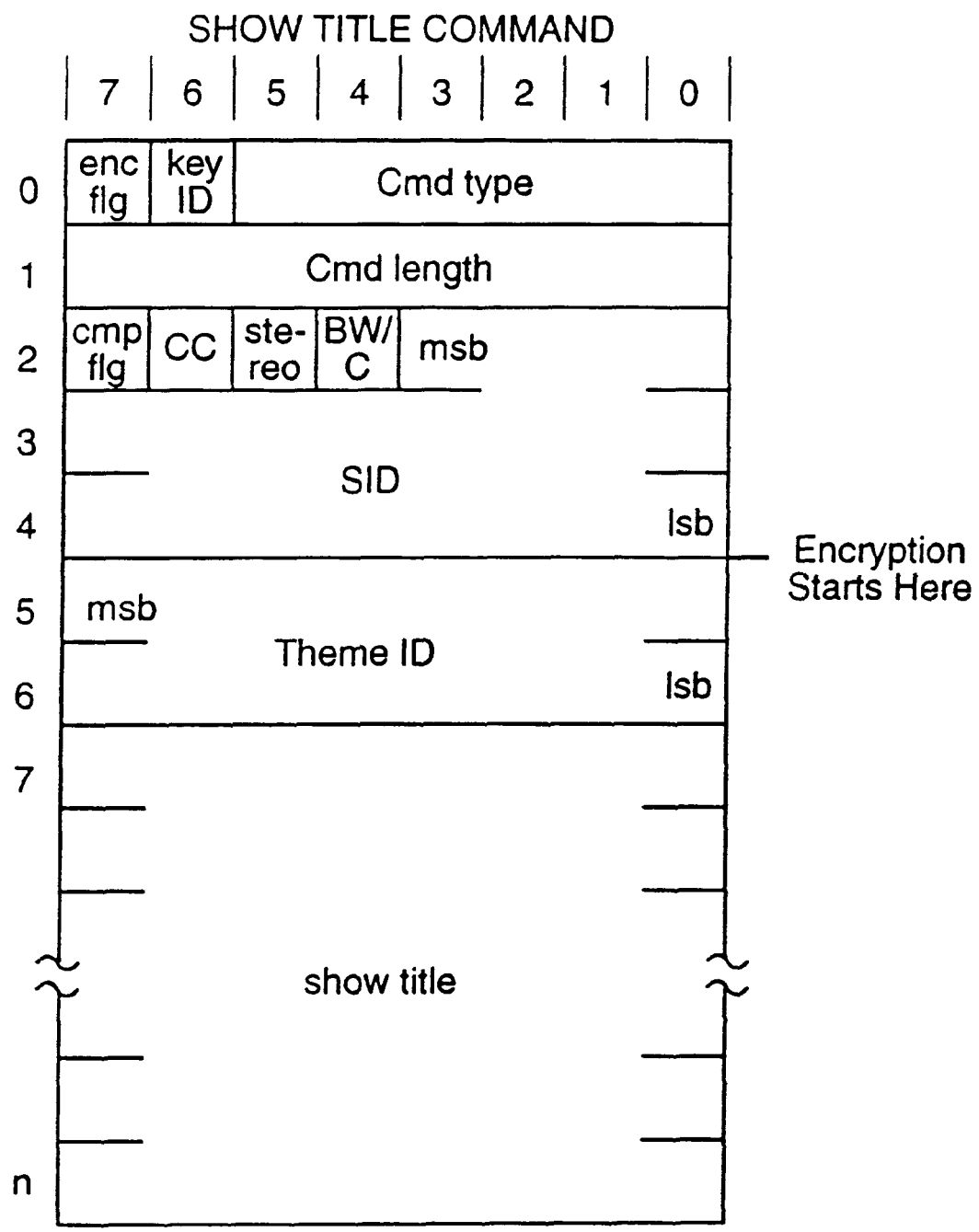
FIG._15

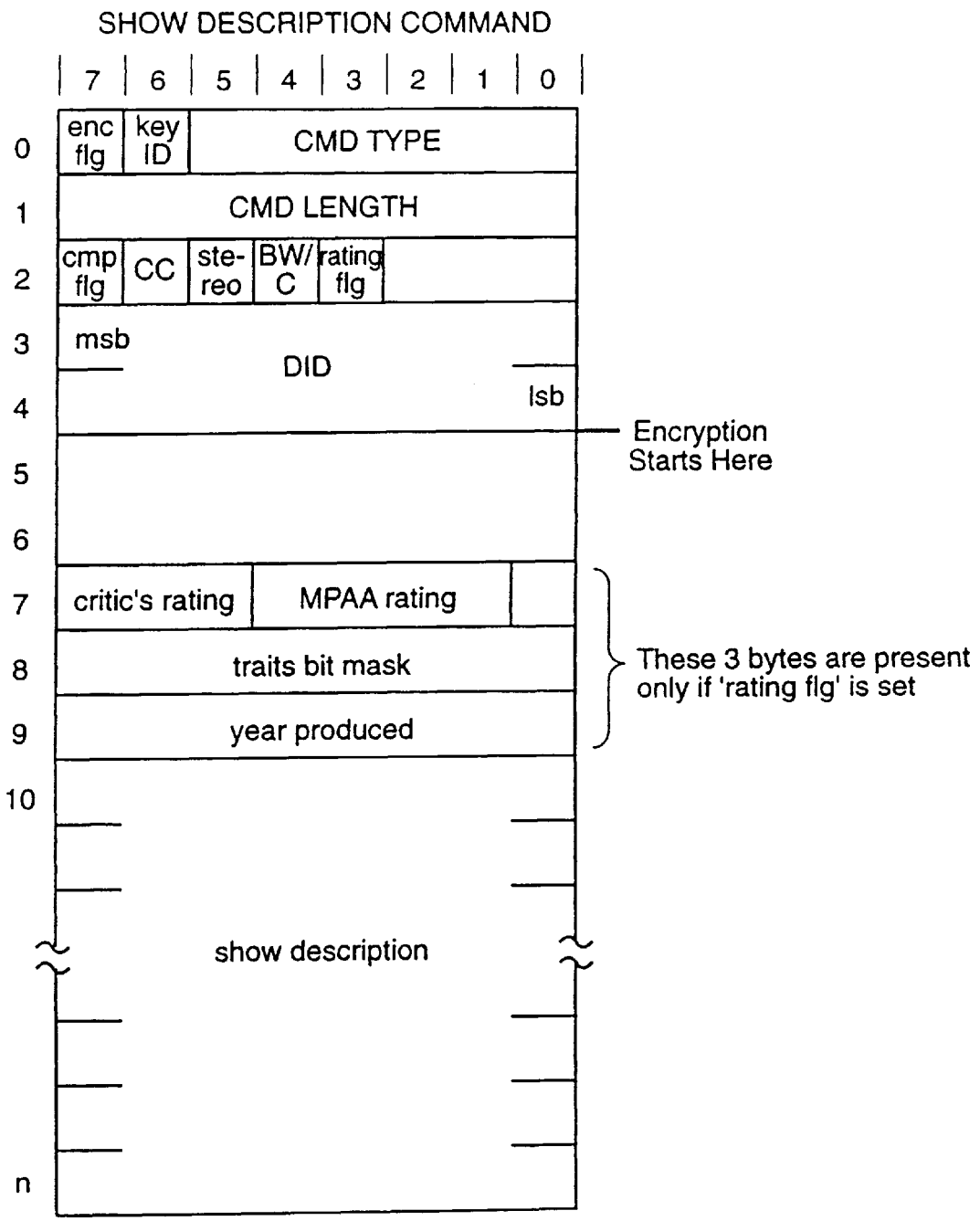
FIG._16

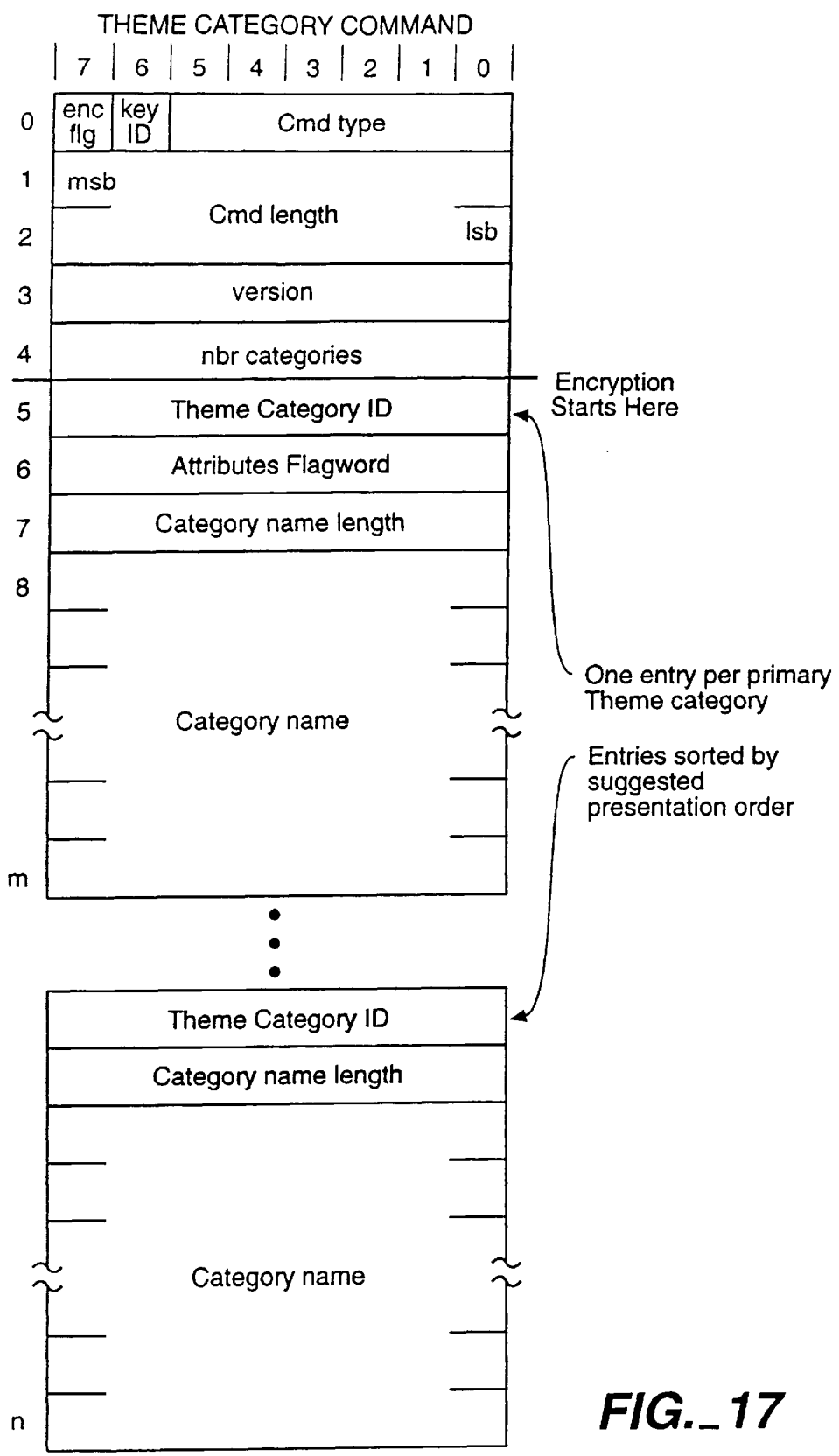
FIG._17

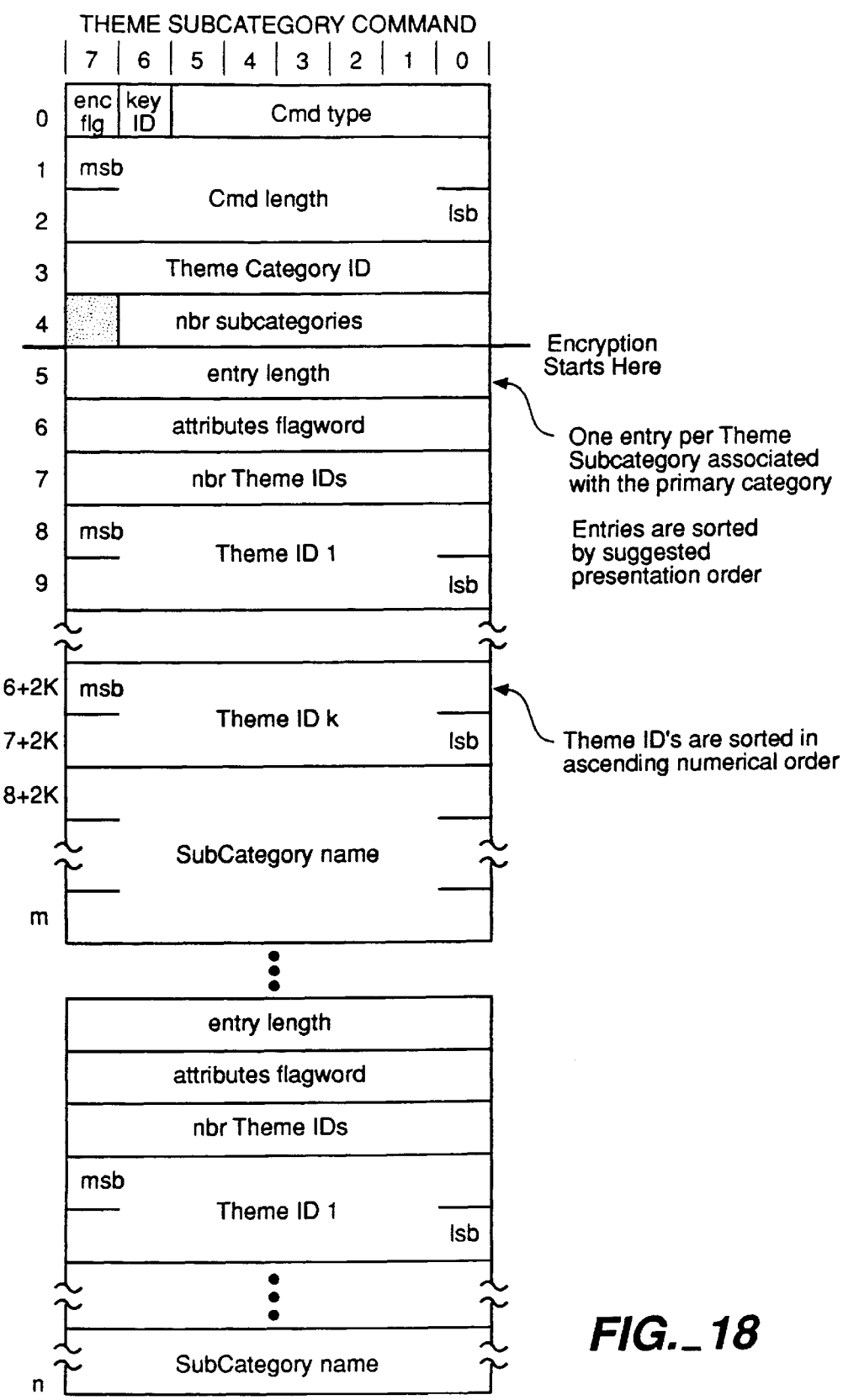
FIG._18

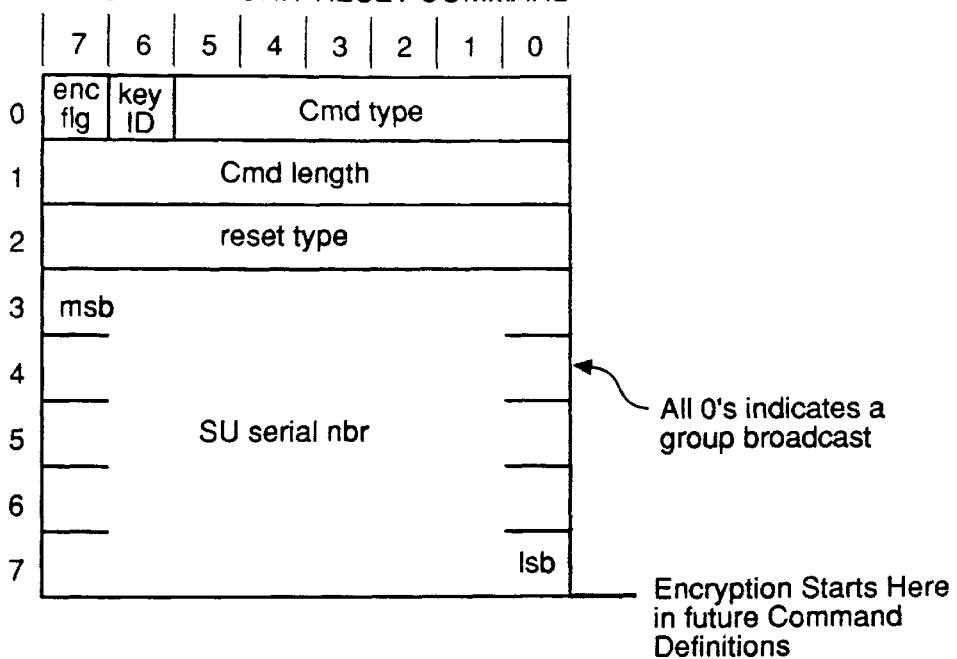
FIG._19
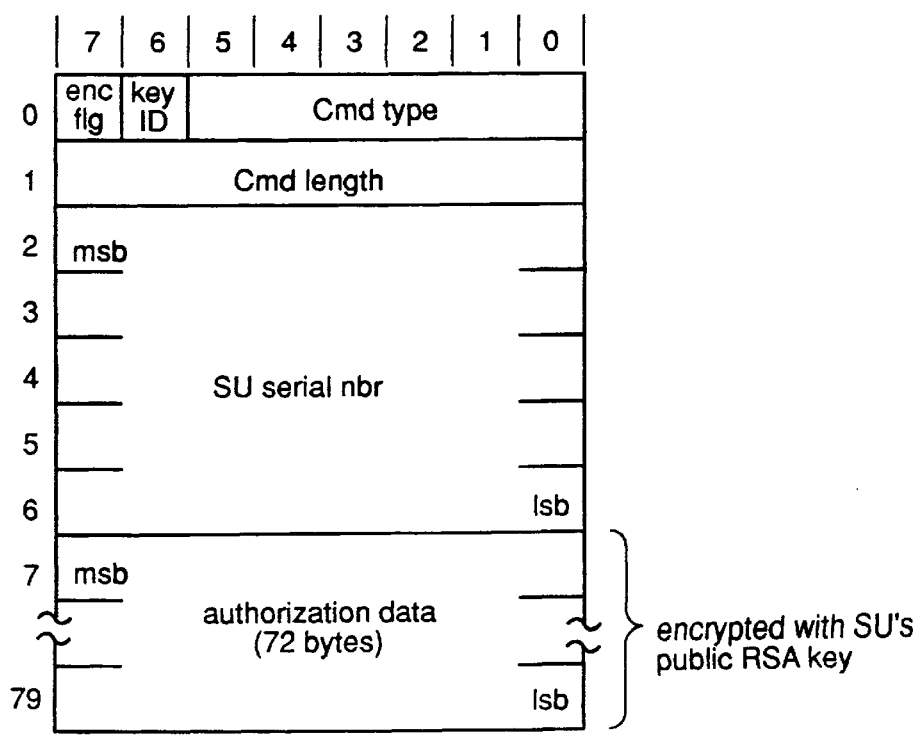
FIG._20

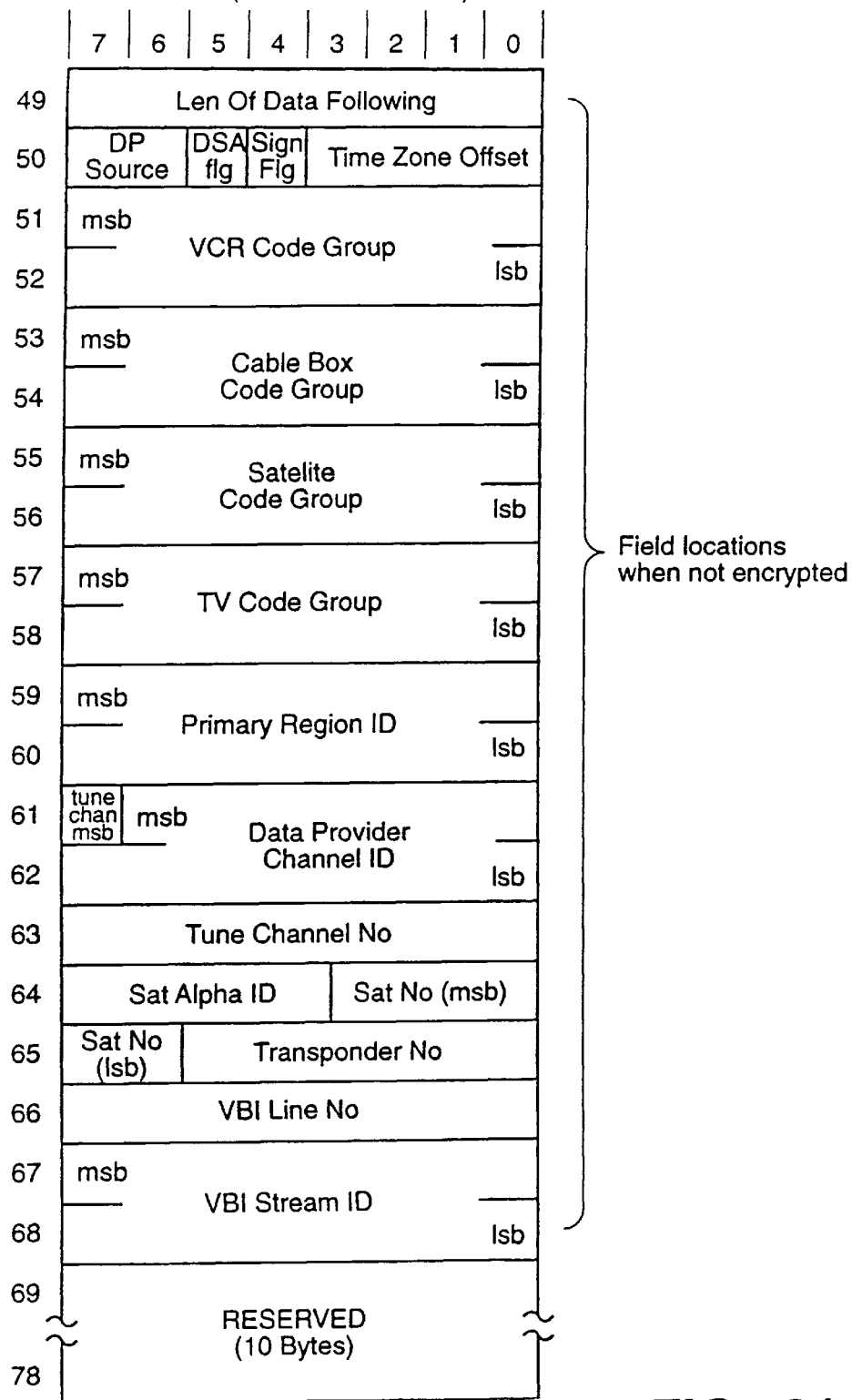
FIG._21

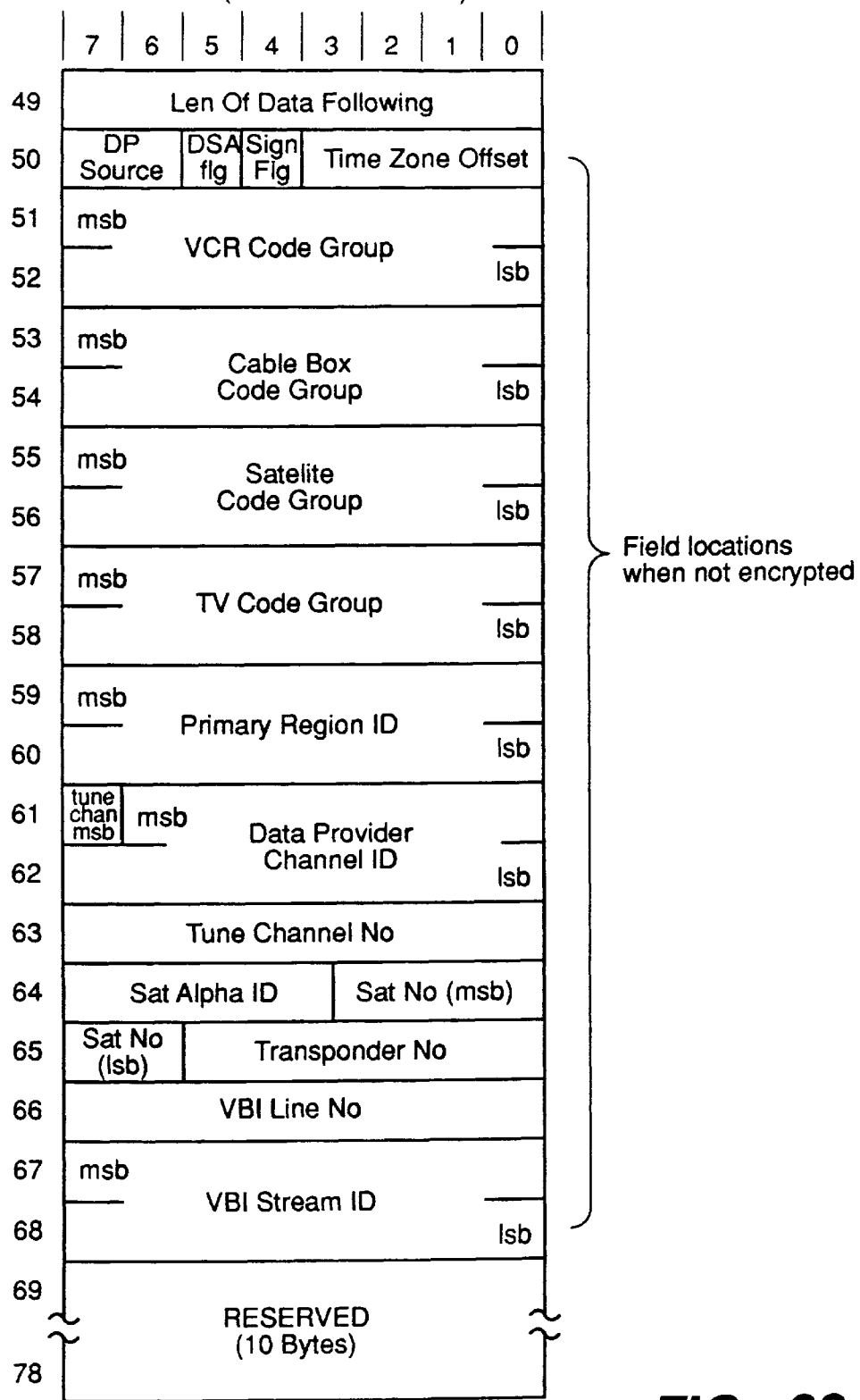
FIG._22

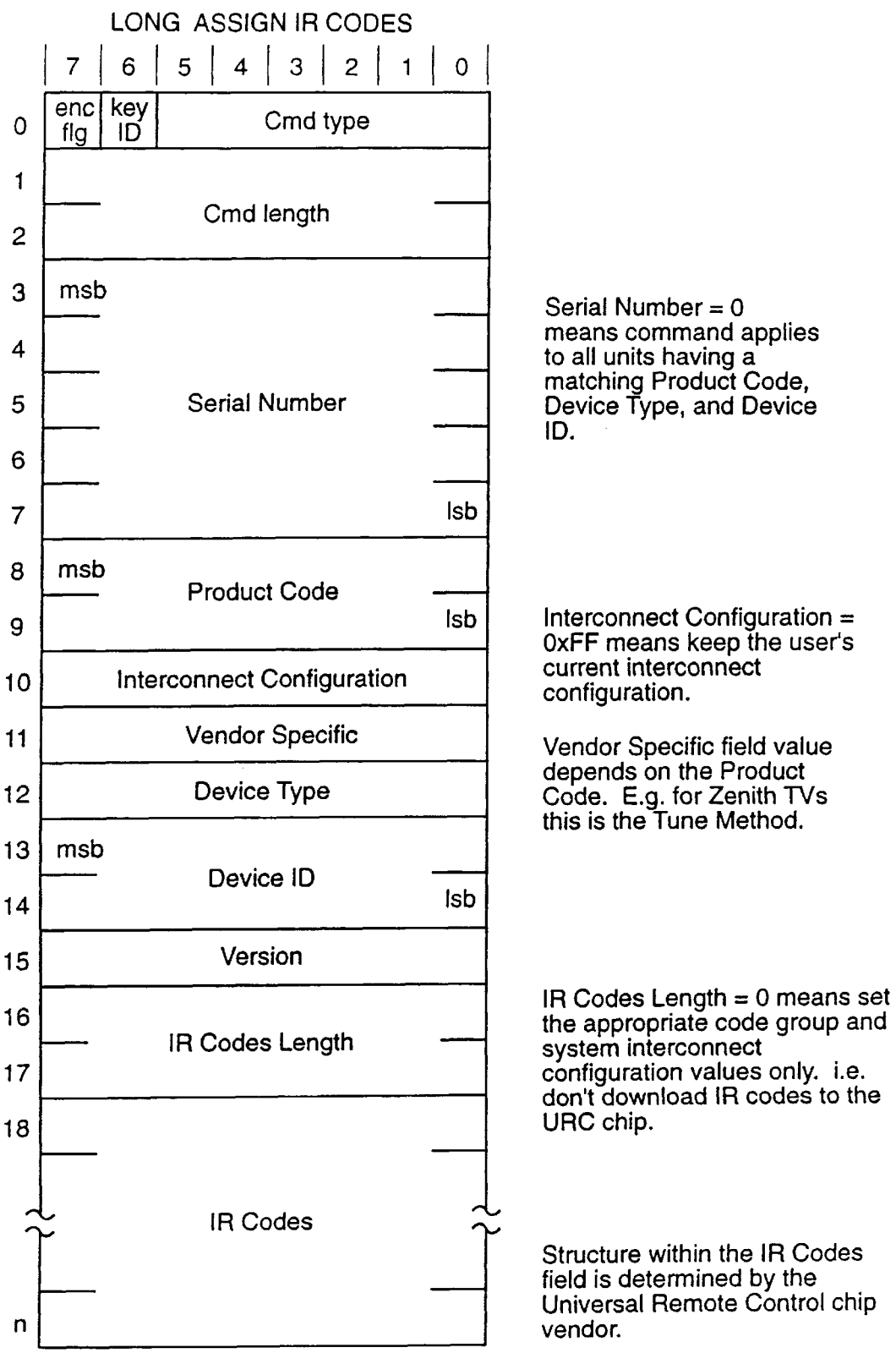
FIG._23

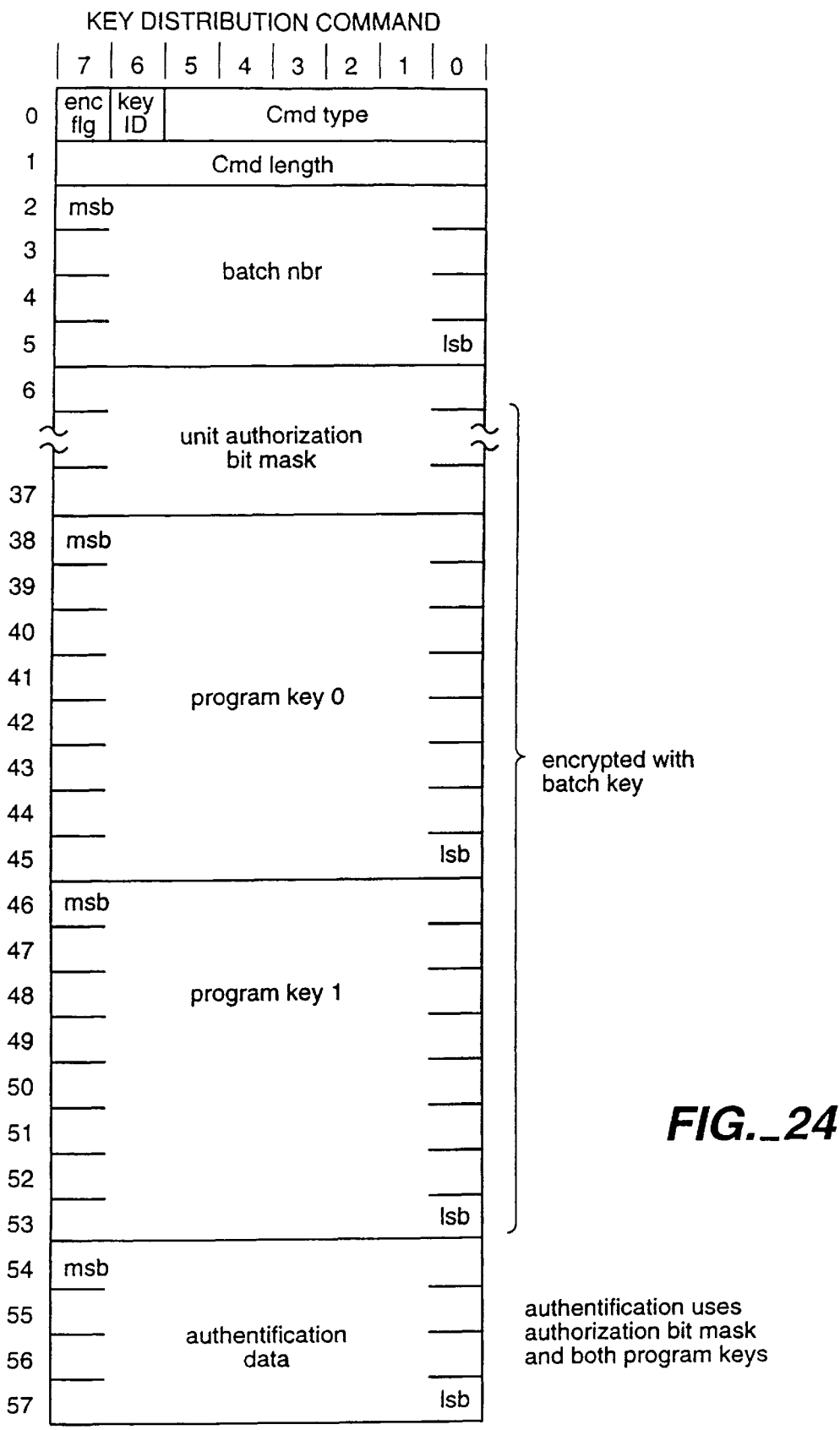
FIG._24

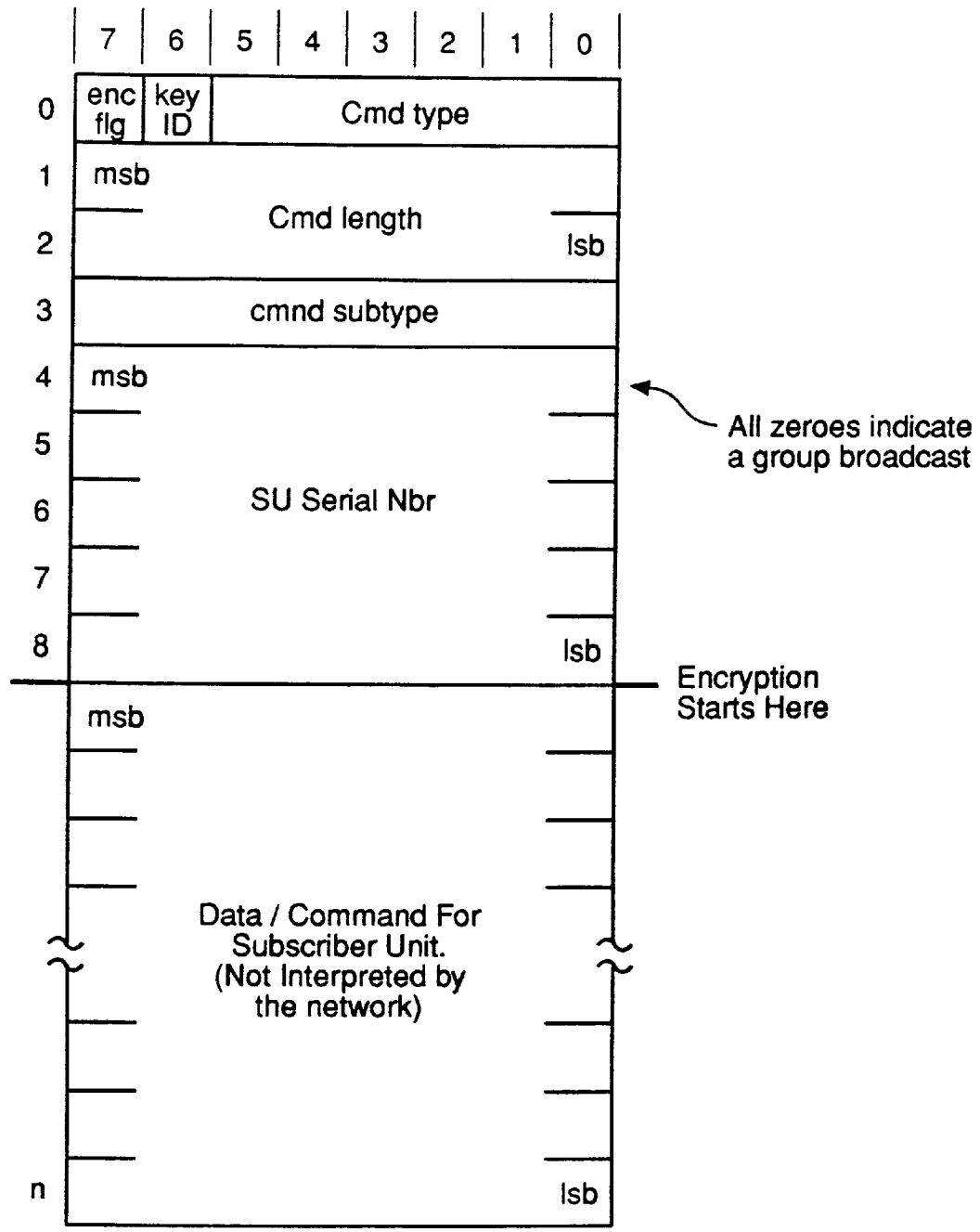
FIG._25

DATABASE MEMORY POOL ACCESS SCHEME
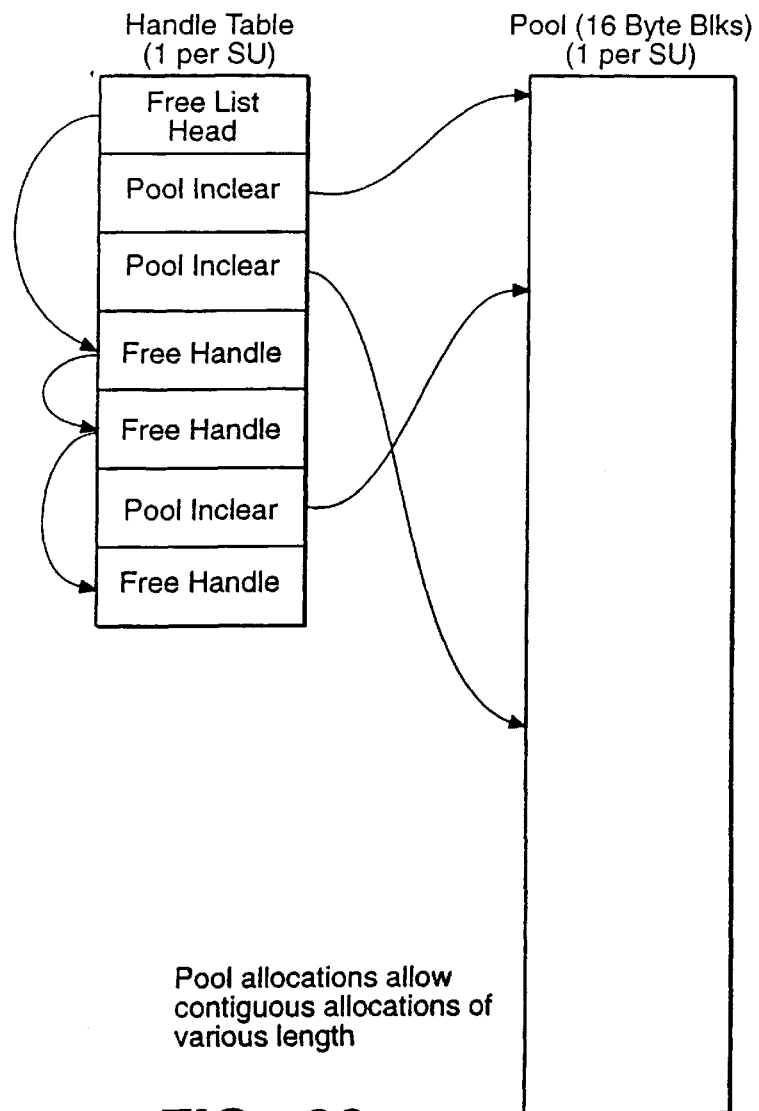
Pool allocations allow contiguous allocations of various length
FIG._26
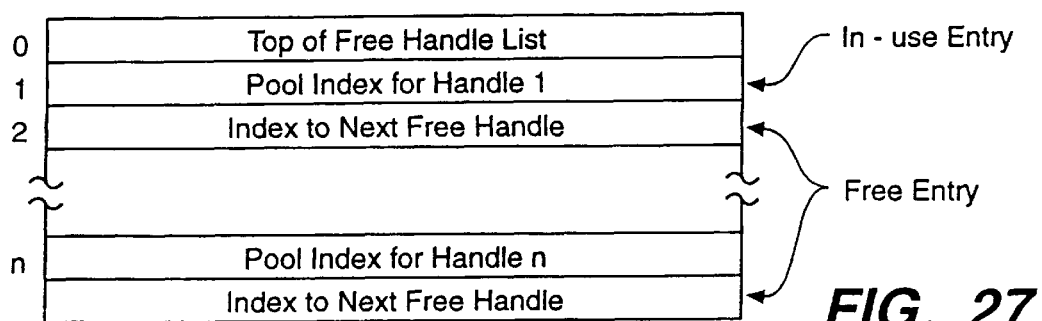
FIG._27

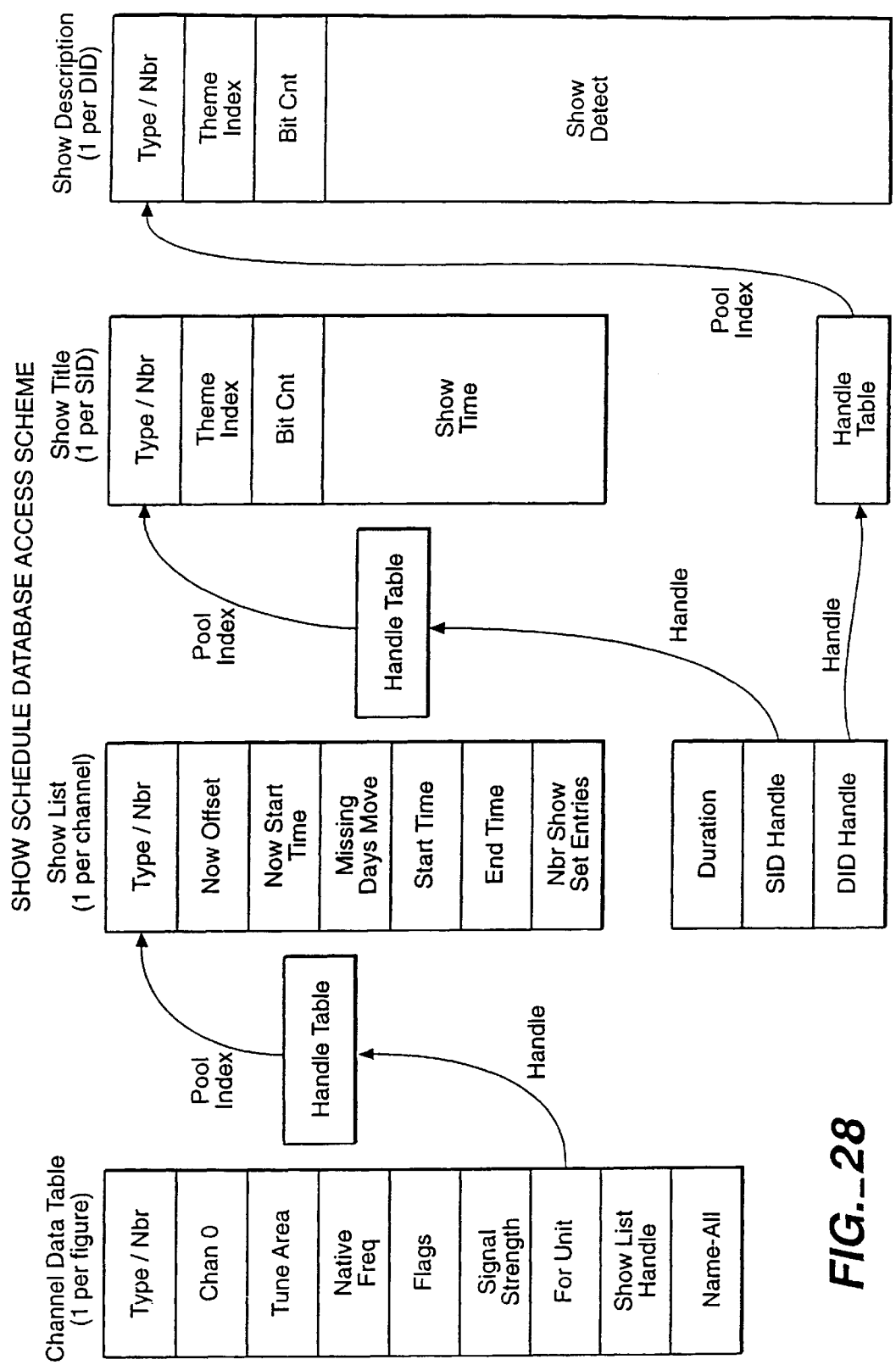
FIG._28

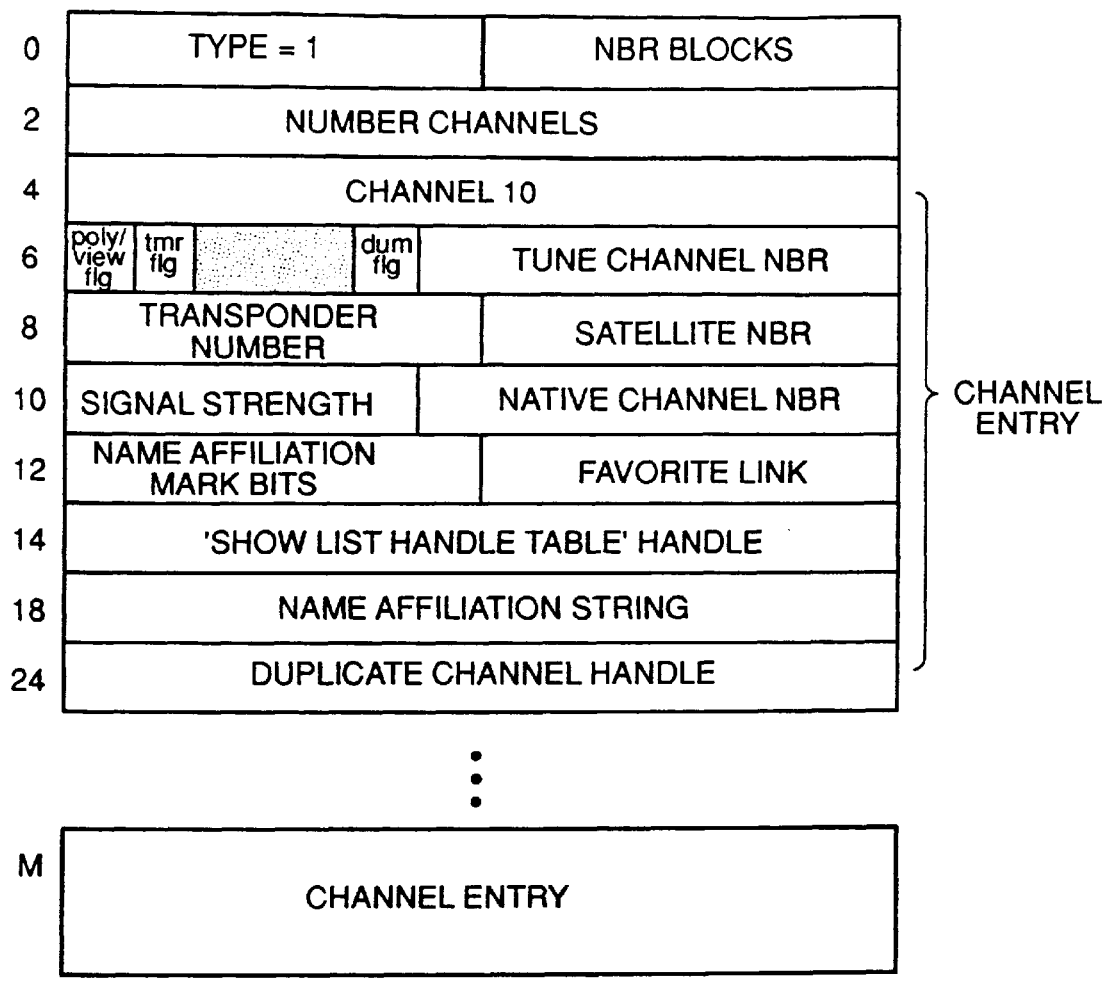
FIG._29
FIG._30

| TYPE / NBR BLOCKS |
|---|
| REFERENCE COUNT |
| MONDAY SHOW LIST HANDLE |
| TUESDAY SHOW LIST HANDLE |
| WEDNESDAY SHOW LIST HANDLE |
| THURSDAY SHOW LIST HANDLE |
| FRIDAY SHOW LIST HANDLE |
| SATURDAY SHOW LIST HANDLE |
| SUNDAY SHOW LIST HANDLE |
*FIG._31*
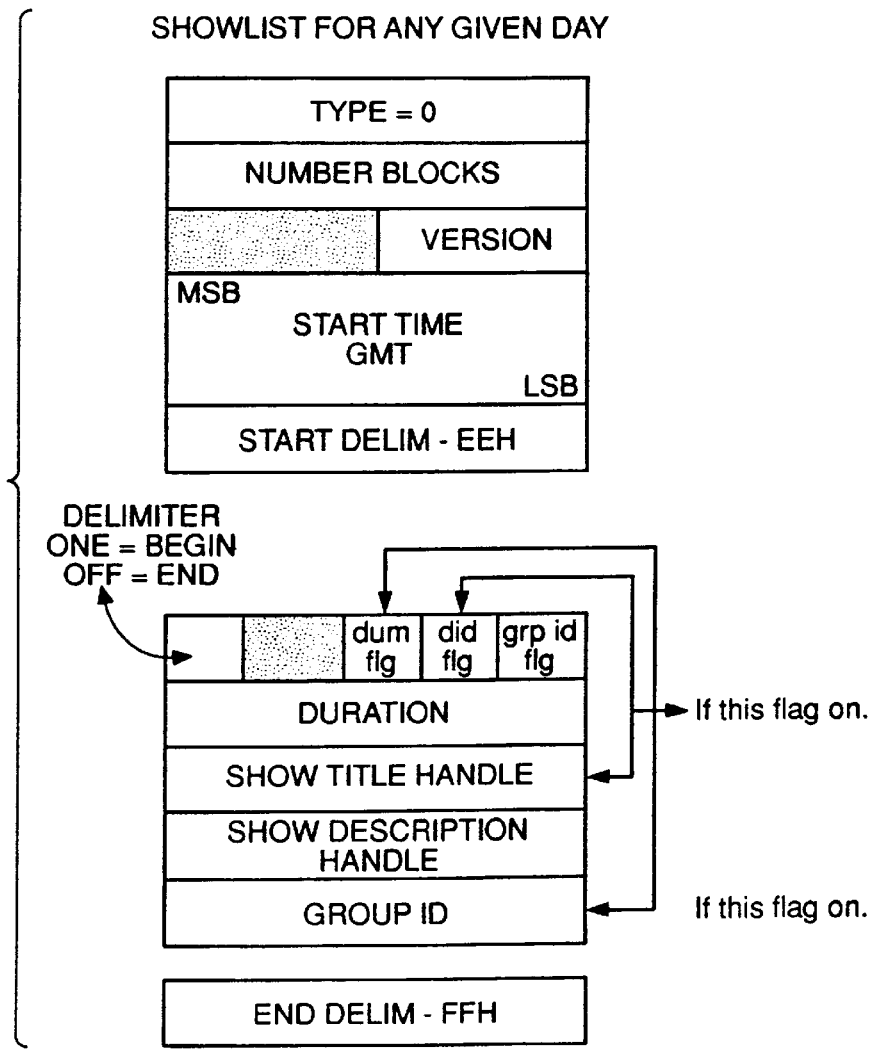
*FIG._32*

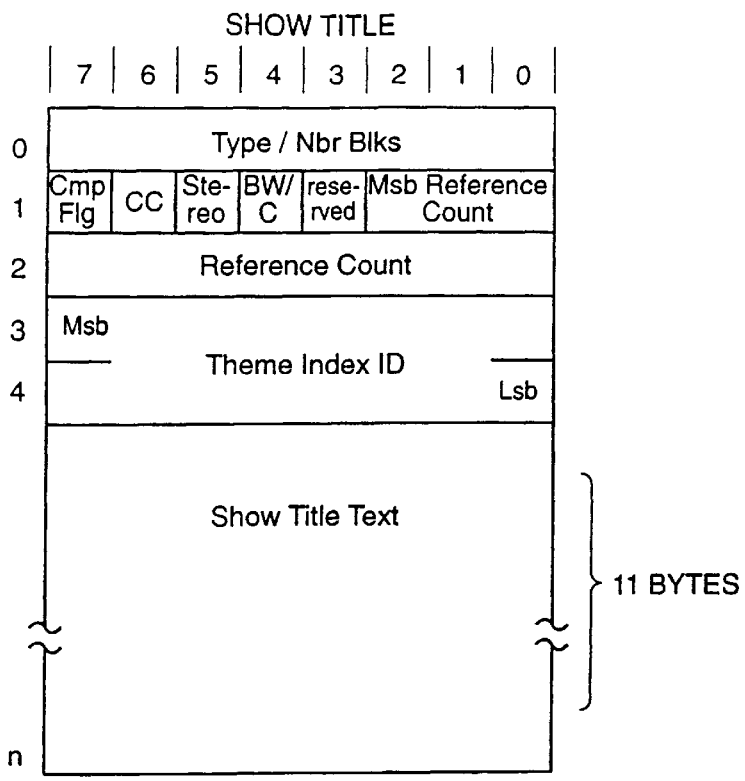
FIG._33
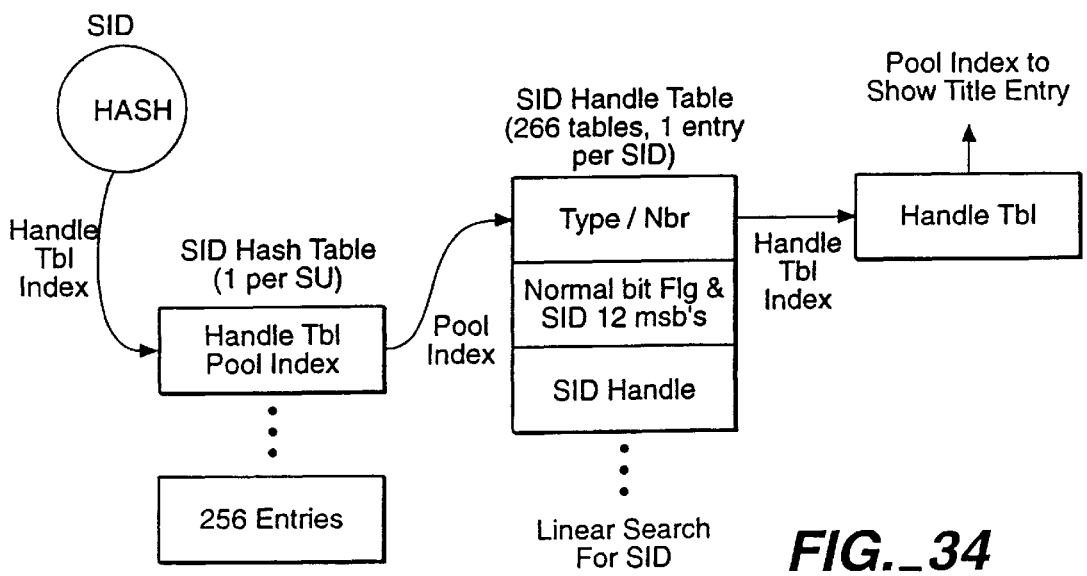
FIG._34

SHOW TITLE HANDLE TABLE

| Type 03 | Nbr Blocks |
|---|---|
| \multicolumn{2}{c}{Nbr Entries} | |

| Show Title Entry Handle Table entry |
|---| need it flg → | | SID 12 msb's |
| Show Title Entry Handle |

FIG._35

SHOW TITLE HASH TABLE

| 0 | Pool Index for SIDS that hash to 0 |
|---|---|
| 1 | Pool Index for SIDS that hash to 1 |
| ⋮ | ⋮ |
| 254 | Pool Index for SIDS that hash to 254 |
| 255 | Pool Index for SIDS that hash to 255 |

FIG._36

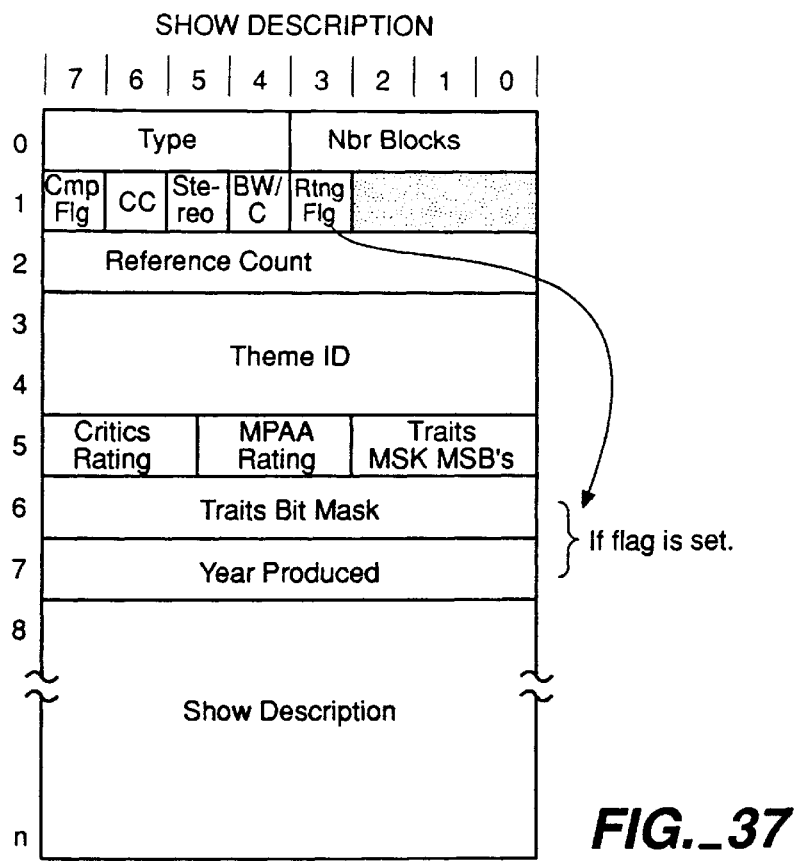
*FIG._37*
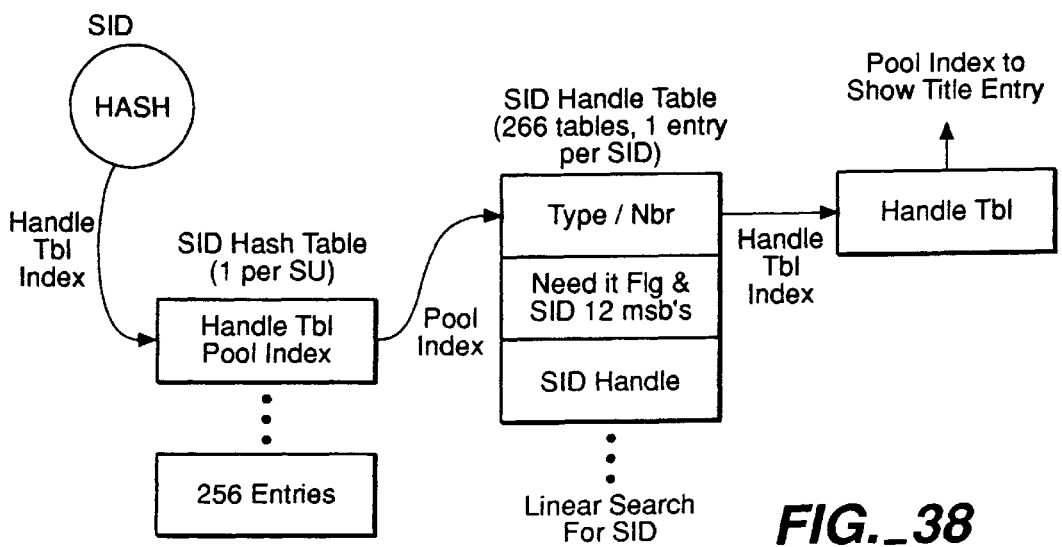
*FIG._38*

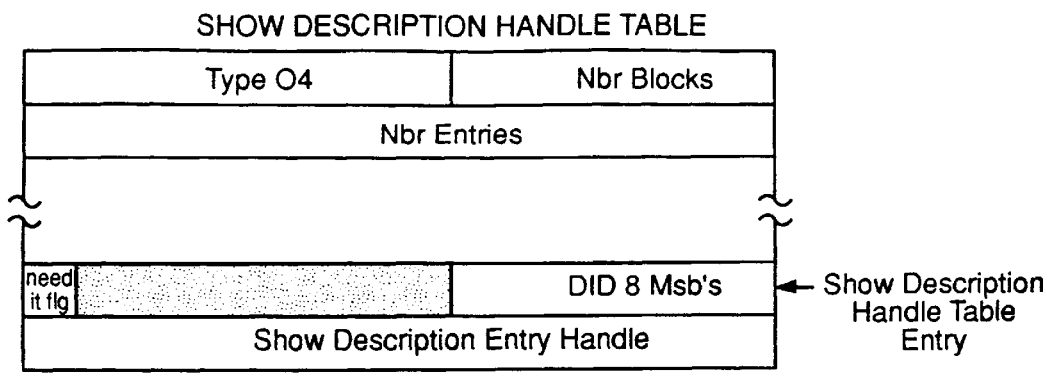
FIG._39
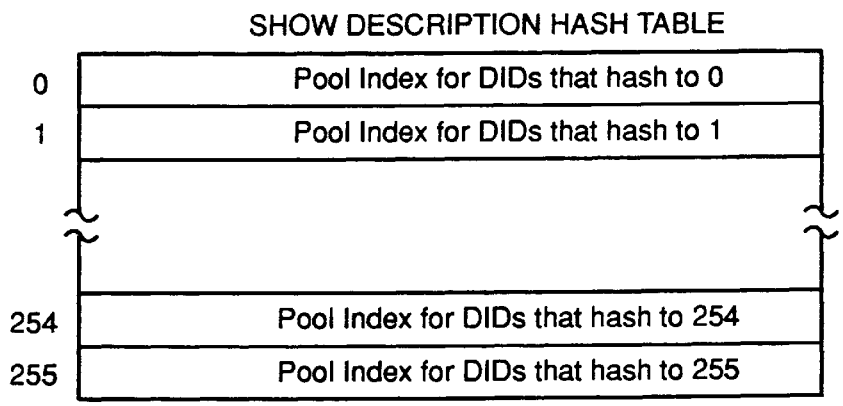
FIG._40
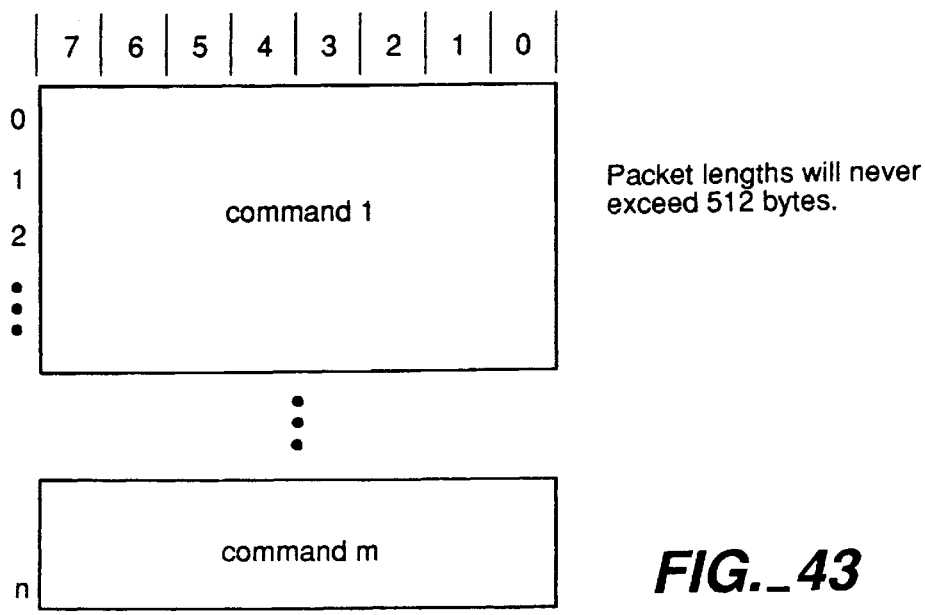
Packet lengths will never exceed 512 bytes.
FIG._43

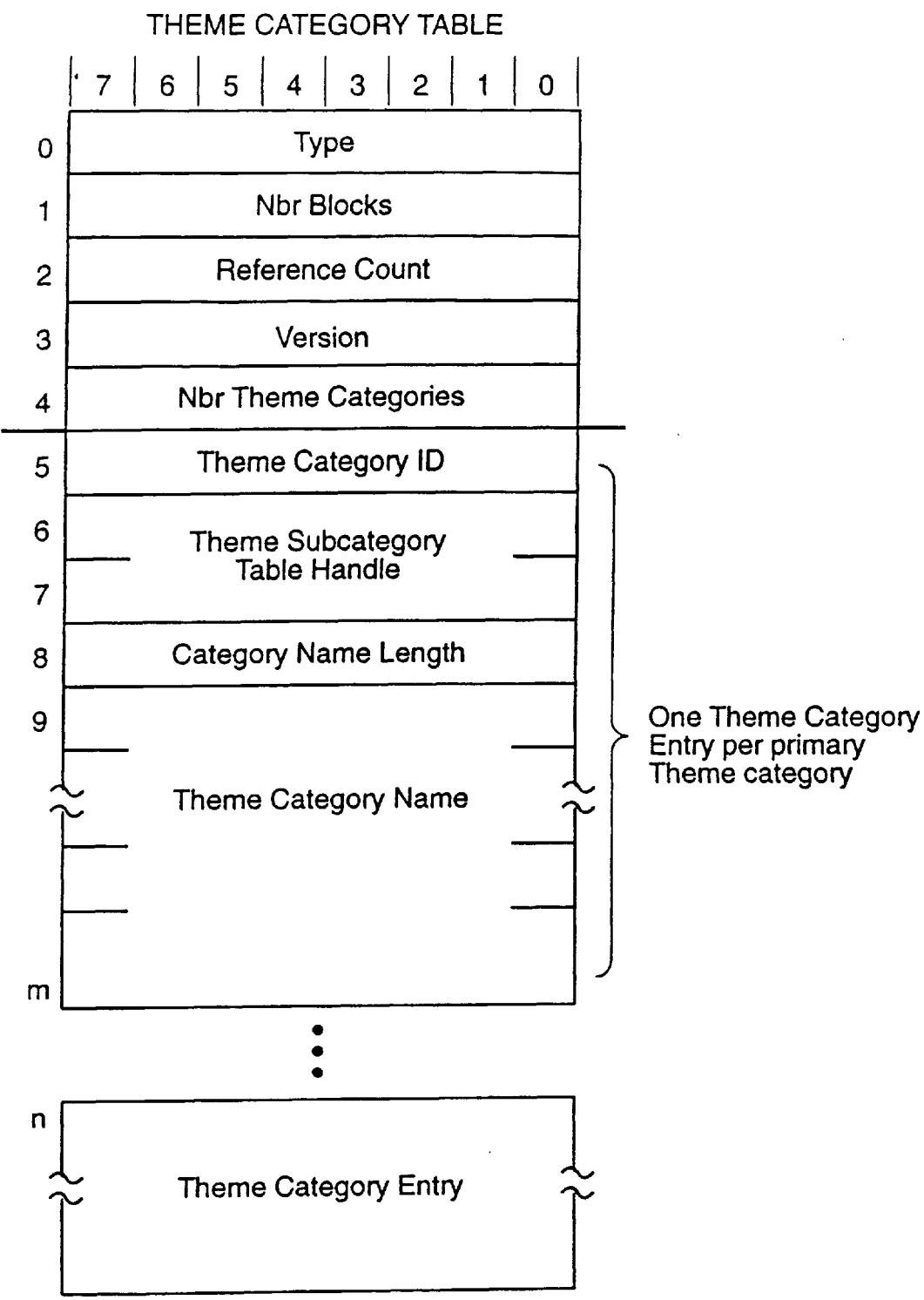
FIG._41

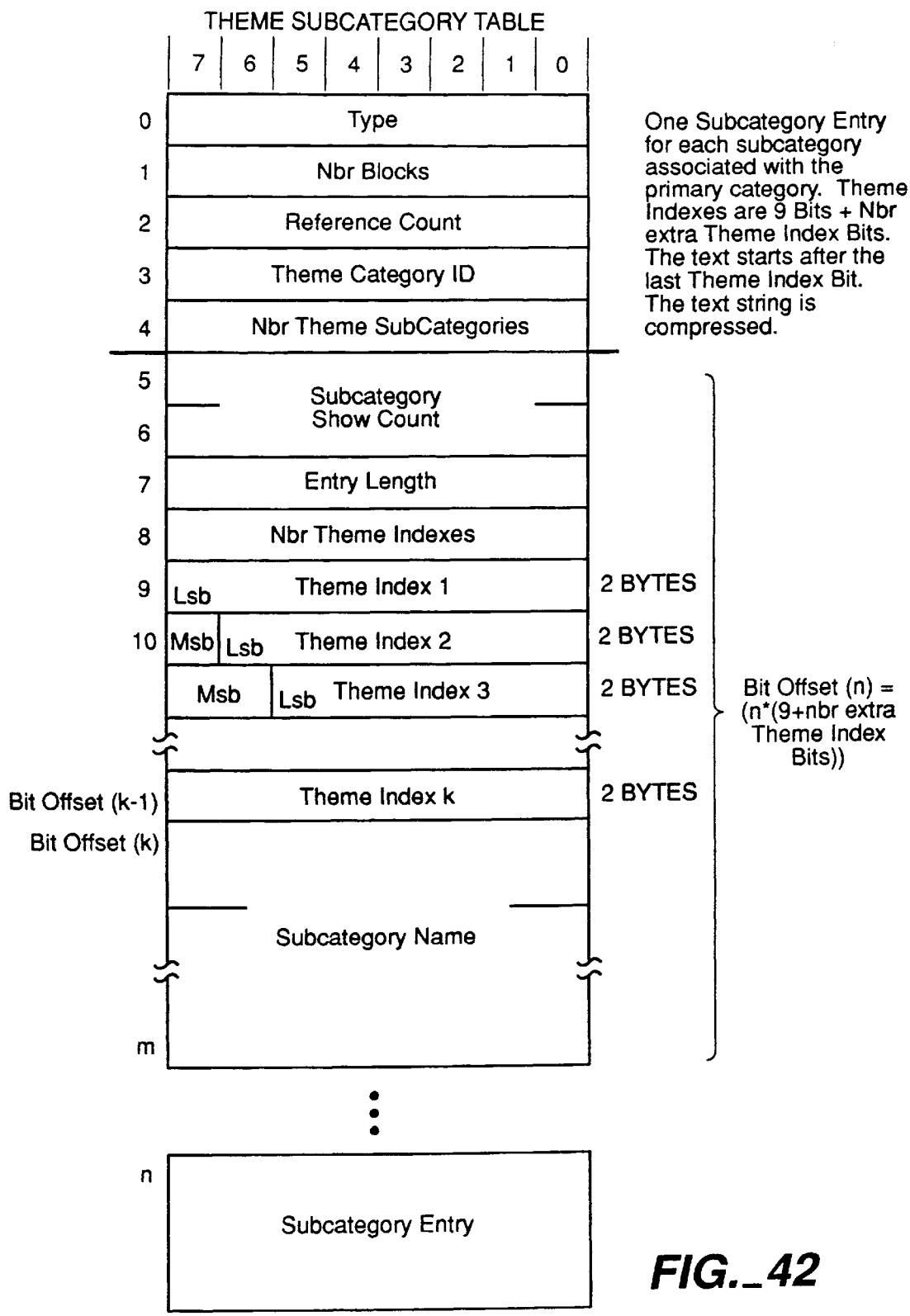
FIG._42

DRAW RECTANGLE

| | 7 | 6 | 5 | 4 | 3 | 2 | 1 | 0 |
|---|---|---|---|---|---|---|---|---|
| 0 | | | \multicolumn{6}{c|}{Cmd type} |
| 1 | \multicolumn{4}{c|}{shadow width} | \multicolumn{4}{c|}{shadow height} |
| 2 | \multicolumn{4}{c|}{shadow color 1} | \multicolumn{4}{c|}{shadow color 2} |
| 3 | \multicolumn{4}{c|}{small font delta X} | \multicolumn{4}{c|}{small font delta Y} |
| 4 | \multicolumn{8}{c|}{large font delta X} |
| 5 | \multicolumn{8}{c|}{large font delta Y} |
| 6 | \multicolumn{4}{c|}{highlight 1} | \multicolumn{4}{c|}{highlight 2} |
| 7 | \multicolumn{4}{c|}{underline 11} | \multicolumn{4}{c|}{underline 12} |
| 8 | \multicolumn{4}{c|}{underline 21} | \multicolumn{4}{c|}{underline 22} |

FIG._44

ERASE SCREEN

| | 7 | 6 | 5 | 4 | 3 | 2 | 1 | 0 |
|---|---|---|---|---|---|---|---|---|
| 0 | | | Cmd type | | | | | |
| 1 | xpar color | | | | | | | |

FIG._45

DRAW RECTANGLE

| | 7 | 6 | 5 | 4 | 3 | 2 | 1 | 0 |
|---|---|---|---|---|---|---|---|---|
| 0 | | | Cmd type | | | | | |
| 1 | upper left X | | | | | | | |
| 2 | upper left Y | | | | | | | |
| 3 | width | | | | | | | |
| 4 | height | | | | | | | |
| 5 | fill color 1 | | | | fill color 2 | | | |
| 6 | outline color 1 | | | | outline color 2 | | | |
| 7 | fill | out-line | sha-dow | em-boss | | | | |

FIG._46

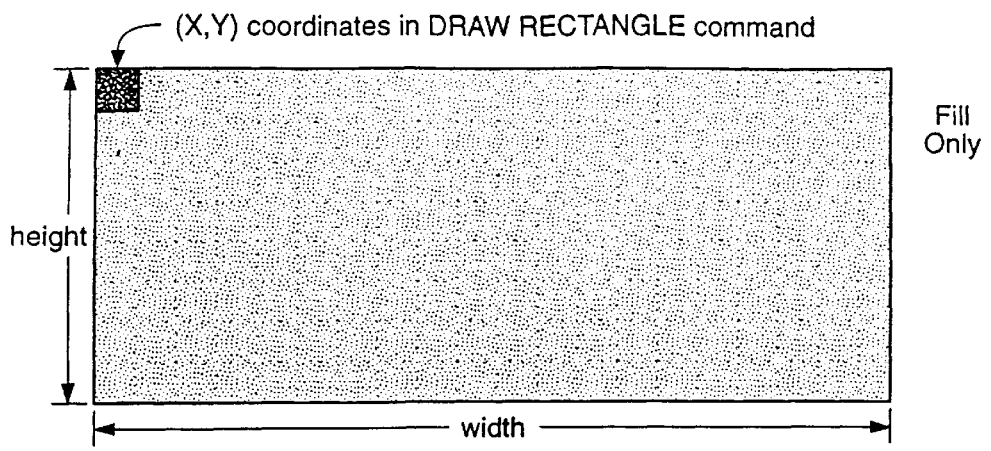
FIG._47A
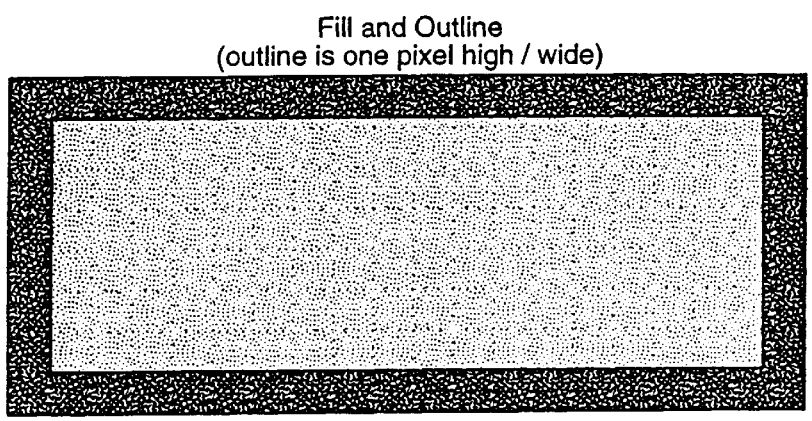
FIG._47B
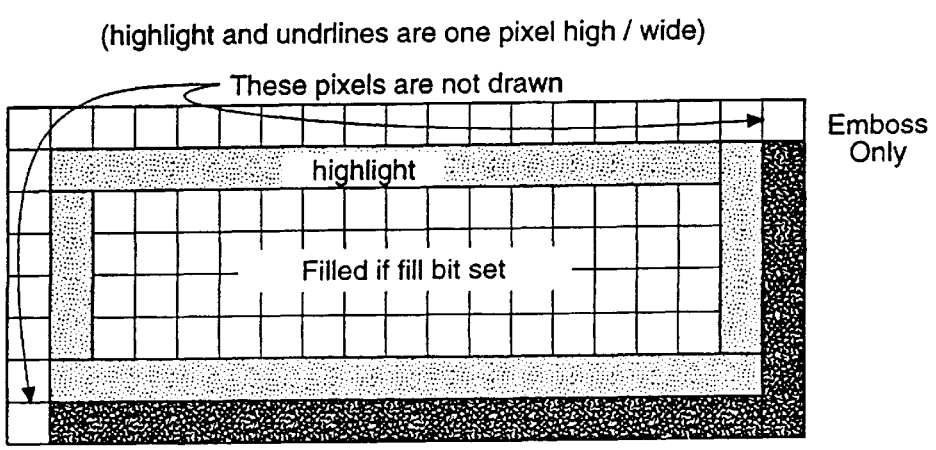
FIG._47C

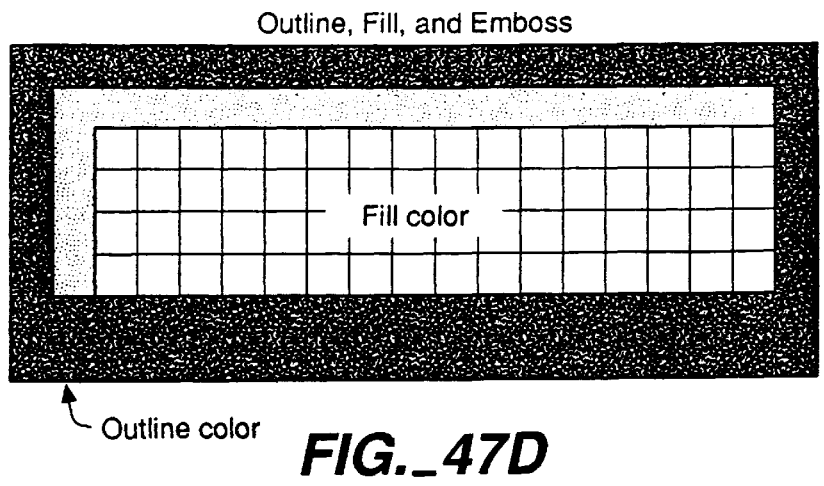
FIG._47D
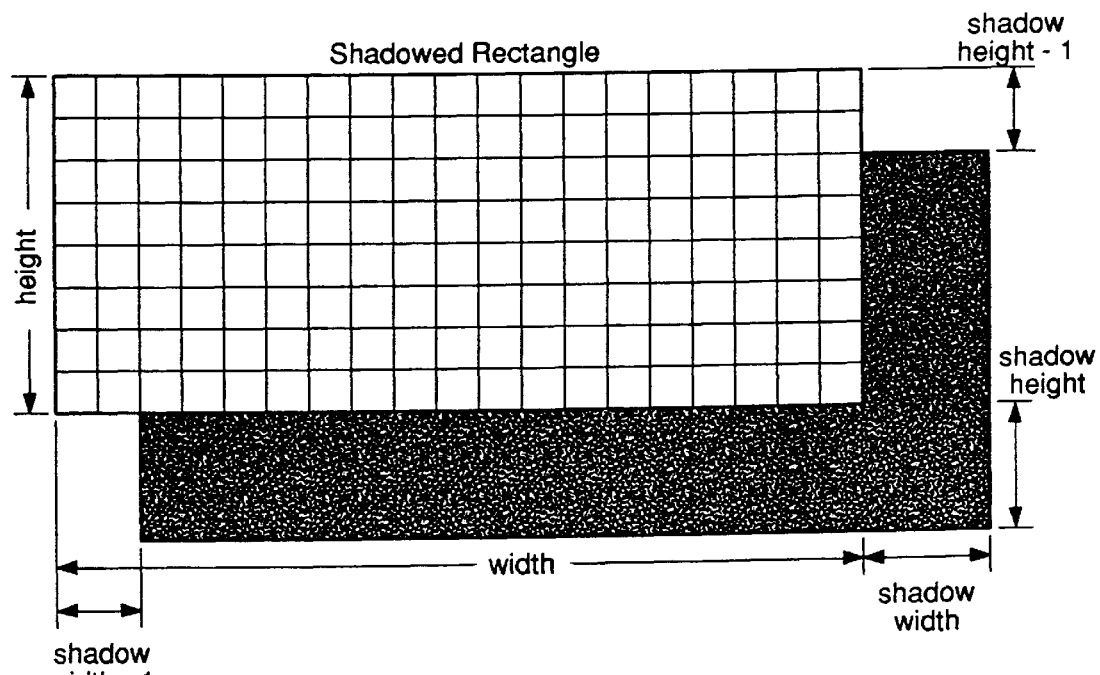
FIG._47E

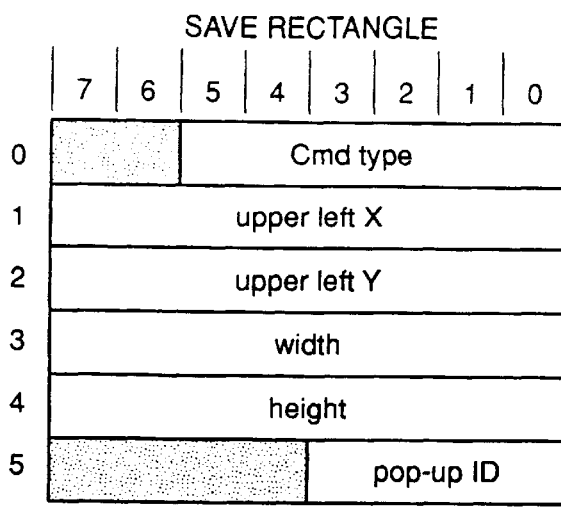
FIG._48
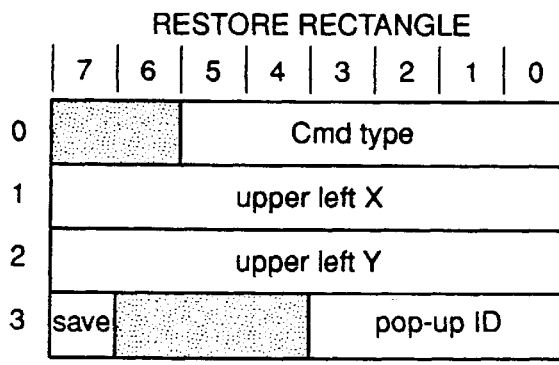
FIG._49
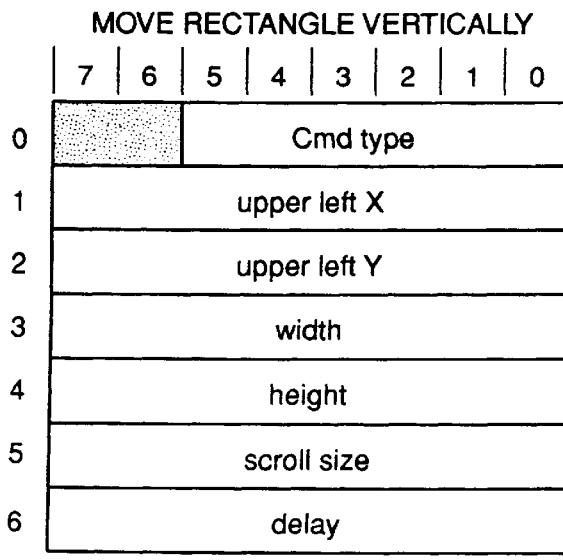
FIG._50

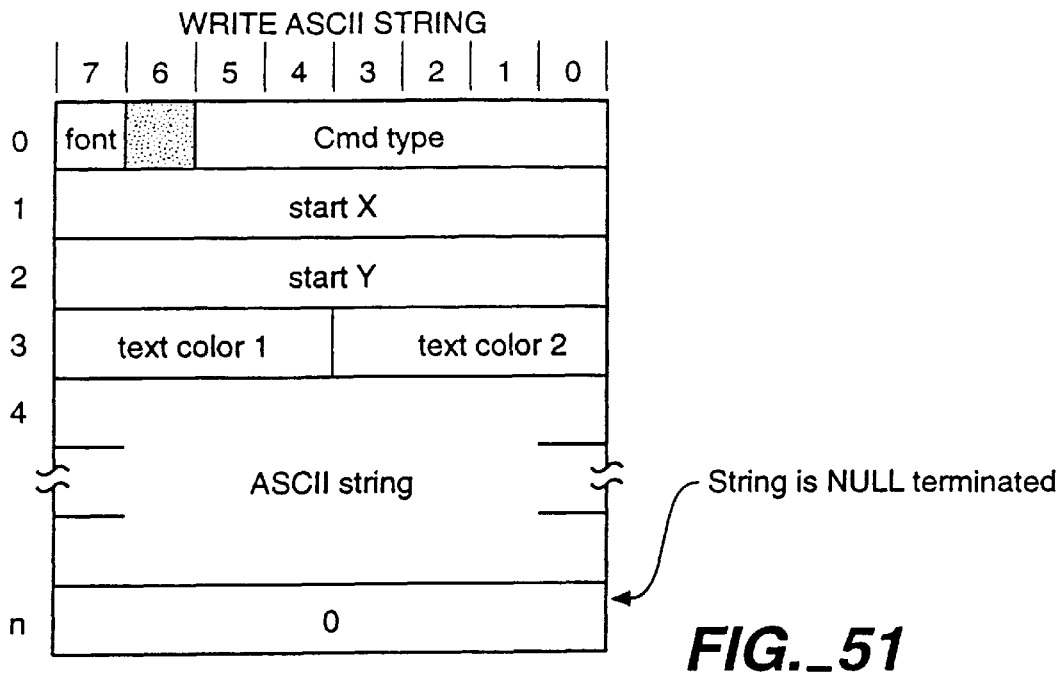
FIG._51
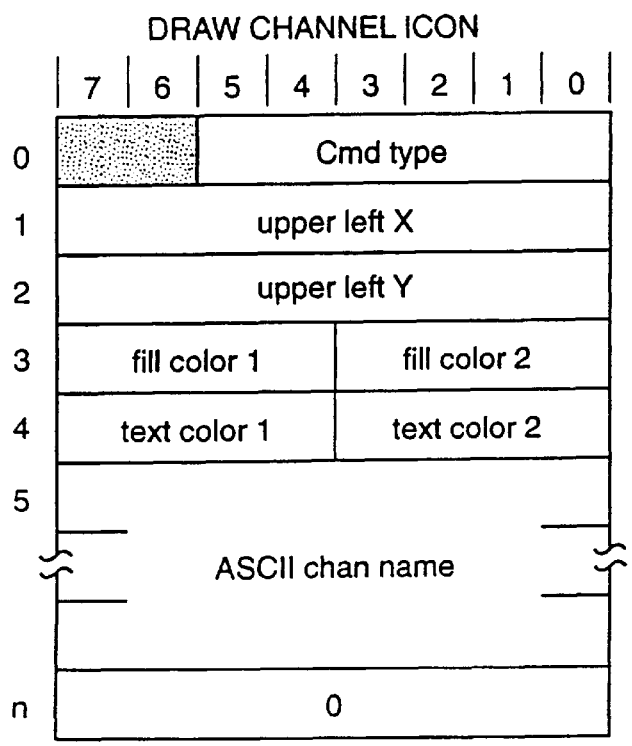
FIG._52

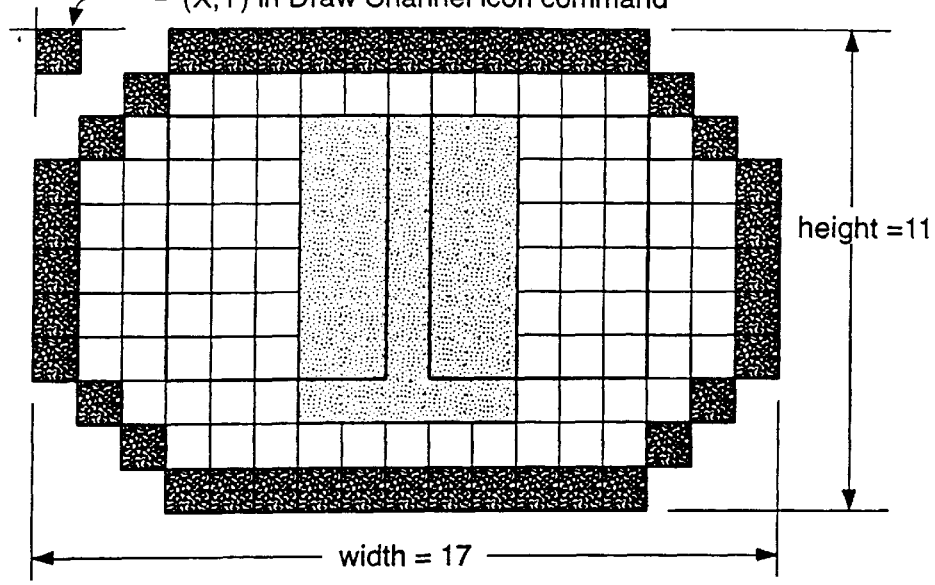
FIG._53A
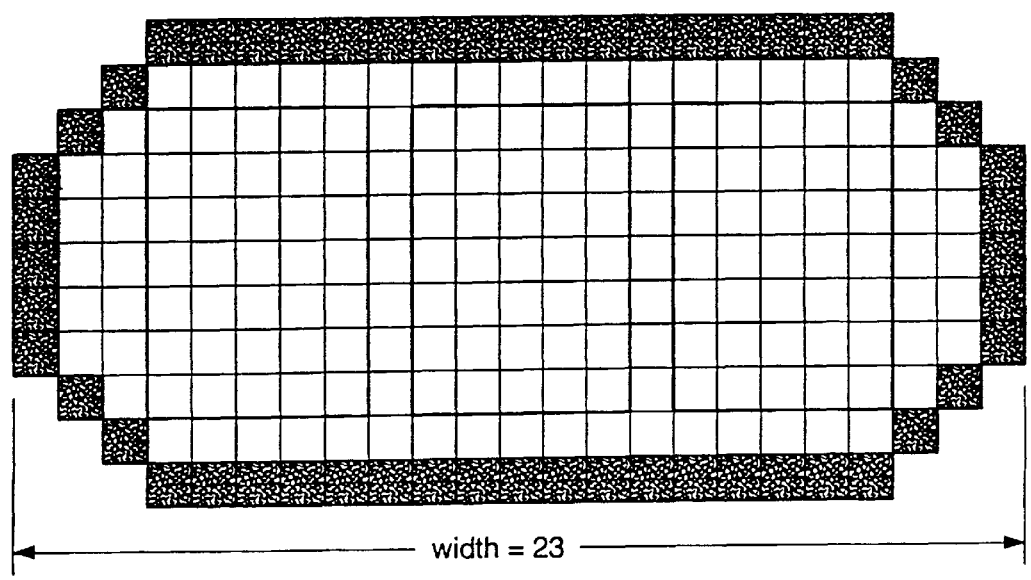
FIG._53B

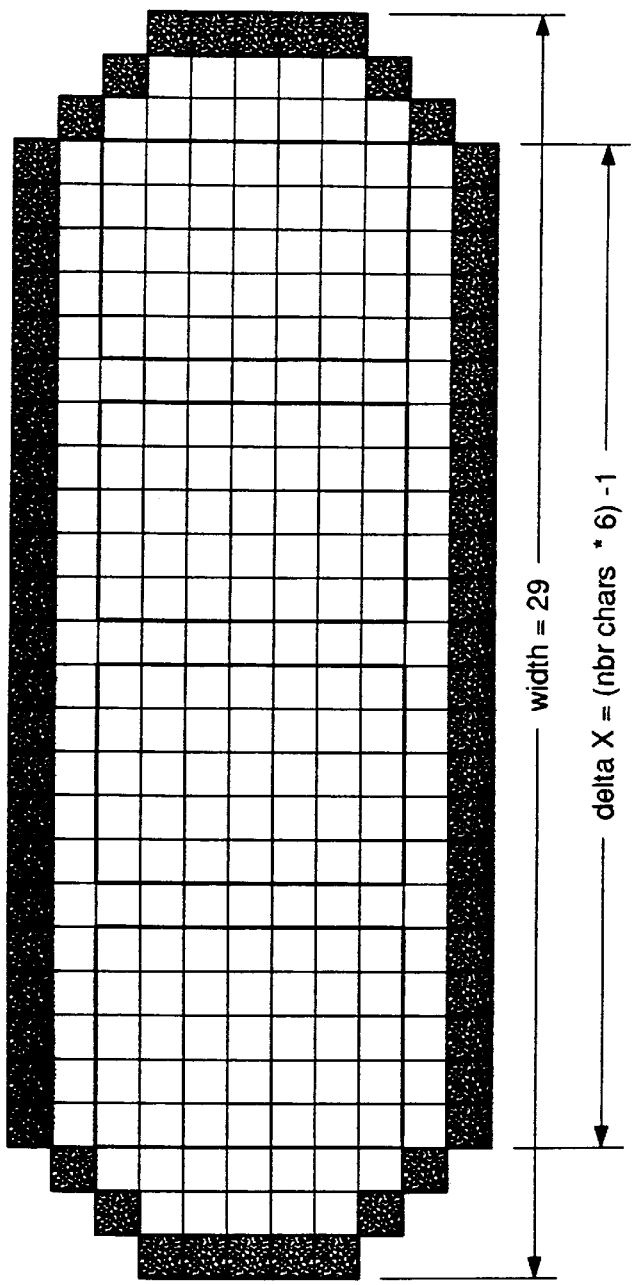
FIG._53C
FIG._54
FIG._55

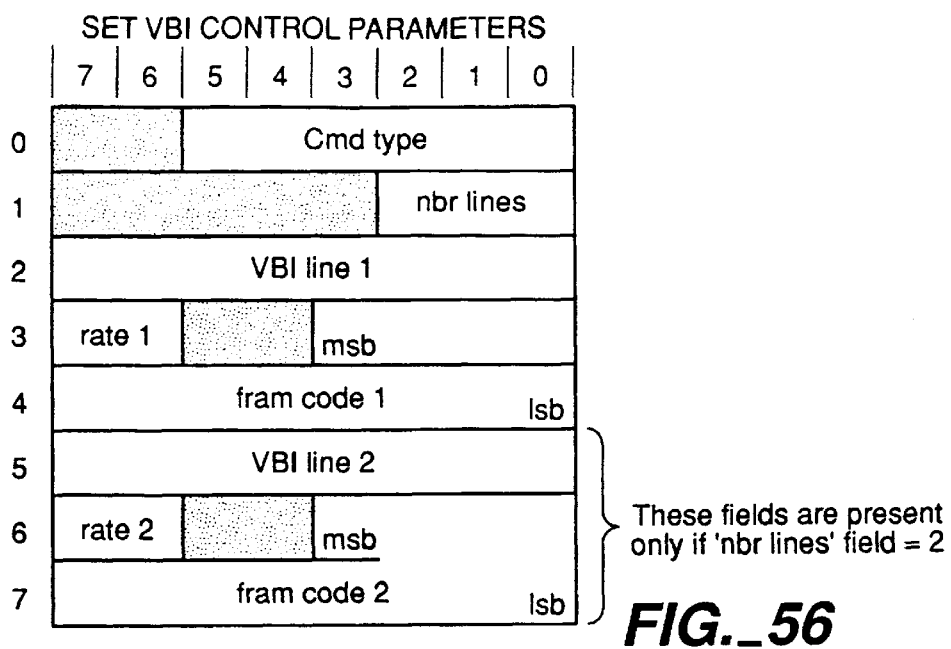
FIG._56
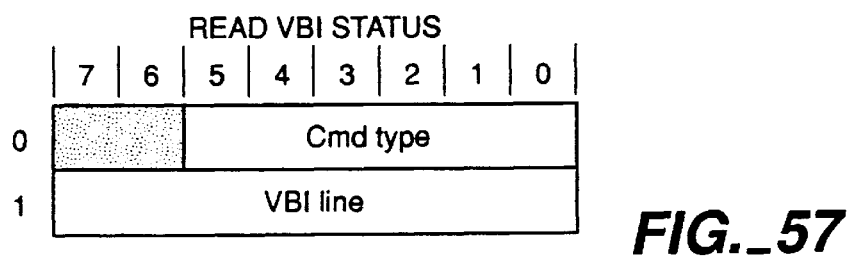
FIG._57
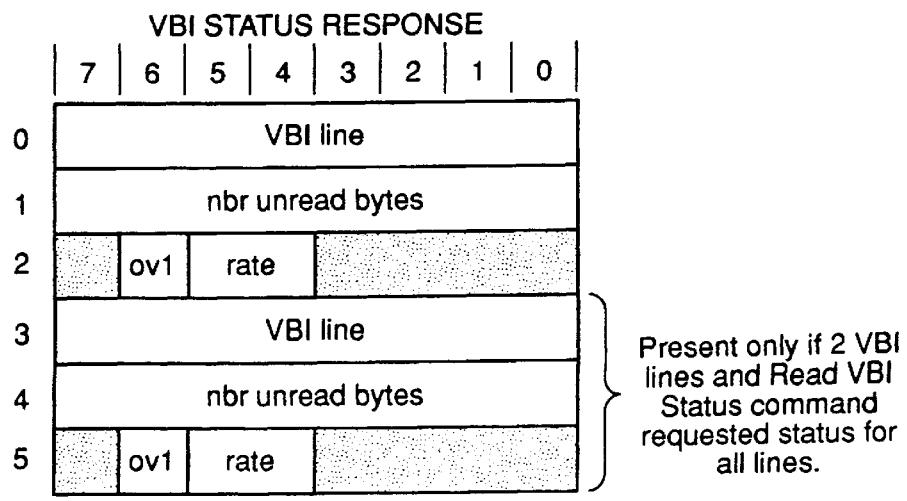
FIG._58

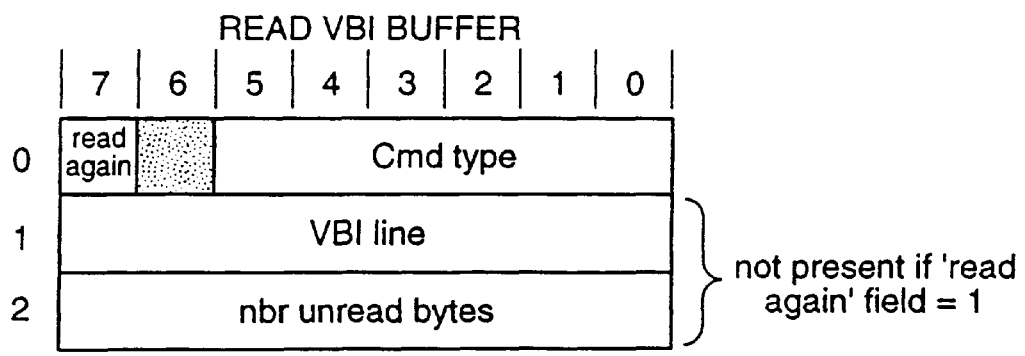
FIG._59
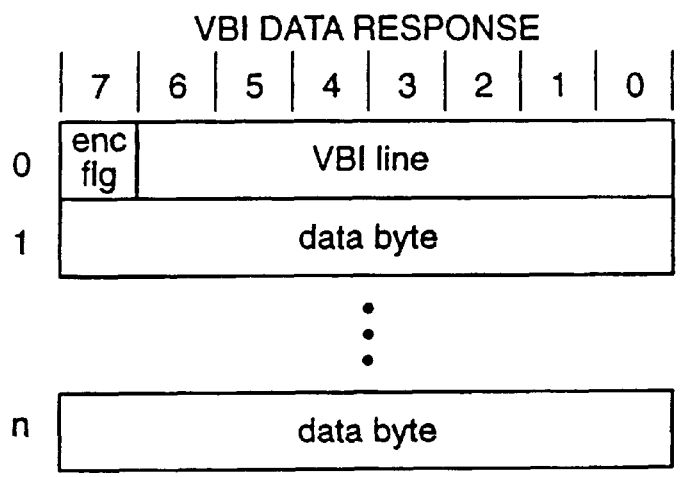
FIG._60

SYSTEM AND METHOD FOR TRANSMITTING AND UTILIZING ELECTRONIC PROGRAM GUIDE INFORMATION

ORIGIN OF THE INVENTION

This application is a continuation of U.S. patent application Ser. No. 08/239,225, filed May 4, 1994, now U.S. Pat. No. 5,790,198 which is a continuation in part of copending, commonly assigned Young et al., Pending U.S. patent application Ser. No. 08/198,538, now U.S. Pat. No. 5,479,268, filed Feb. 18, 1994 now U.S. Pat. No. 5,479,268, and entitled "User Interface for Television Schedule System," which is in turn a file wrapper continuing application of U.S. patent application Ser. No. 07/579,555, filed Sep. 10, 1990, now abandoned all of which are incorporated fully herein by reference.

BACKGROUND OF THE INVENTION

1. Field of the Invention

The present invention relates generally to a system and method for broadcasting, receiving and using television schedule information. More particularly, it relates to such a system and method in which the television schedule information is broadcast in, e.g., the vertical blanking interval (VBI) of a television broadcast, a schedule of television programs for a user's broadcast area or cable system is compiled from the broadcast, and the schedule is displayed on the user's television set for interactive use. As used herein, the term "broadcast" is used in a broad sense to include such transmission modes as cable and telephonic transmission.

2. Description of the Prior Art

It is known in the art to provide an interactive television program schedule system utilizing broadcast schedule information. For example, such a schedule system is disclosed in commonly assigned Young, U.S. Pat. No. 4,706,121, issued Nov. 10, 1987 and the above referenced Young et al. pending application.

In the design of such a schedule system, only a limited amount of memory and data processing capability can be provided in the user's equipment that receives the schedule information broadcast, compiles the schedule for the user's broadcast area or cable system, displays the schedule on the user's television set and interacts with the user, while enabling that equipment to be provided at a low enough price for mass marketing. This memory and data processing limitation was recognized by Hallenbeck, U.S. Pat. No. 5,038,211, issued Aug. 6, 1991. The solution proposed by Hallenbeck is to subdivide the schedule information into prioritized categories, store the highest priority category, and as much of the lower priority categories as possible in the amount of memory available. A significant problem with this approach is that less information may be provided about programs in the schedule when there are more programs in the schedule and the need for more information is greatest. Further development in light of the memory and processor limitations of consumer electronics is therefore required.

When schedule information is transmitted as part of a program broadcast signal and a prior art subscriber unit acquires the schedule information from the program broadcast signal, a potential problem arises when previously broadcast programs have been recorded on a VCR and are played back. The prior art subscriber unit lacks any ability to distinguish a video signal generated from a recorded program from a video signal received in real time from a broadcast. As a result, the subscriber unit may overwrite more recent program schedule information acquired from a real time broadcast with older program schedule information coming from a video tape.

Proposals to transmit television schedule information with television broadcast signals often use a low bandwidth transmission mode, such as one or more lines in the vertical blanking interval (VBI) of the television broadcast signals. The use of such low bandwidth transmission modes means that the format and management of the transmissions must be carefully planned in order to avoid practical problems. For example, when a schedule update is to be transmitted, unless special provisions are made for such updates, worst case transmission delay until the update is received and entered in a user's subscriber unit could amount to five hours, the time for transmission of a complete schedule for a week in an NTSC television broadcast signal using one line of the VBI for the schedule information. In the case of last minute schedule changes, such a delay would be unacceptable.

Data encryption is essential for a subscription-based broadcast television schedule system. Without data encryption, the schedule information could be acquired and used by pirate user equipment without payment of the subscription fee. However, decryption of encoded data is a processor intensive. A conventional approach of encrypting the entire schedule information transmission requires a faster and more expensive microprocessor than would otherwise be suitable for the subscriber units.

When implementing a television schedule system on a national or even international basis, provision must be made for different time zones. Adjusting times in the schedule for the different time zones in the process of transmitting the schedule adds substantial overhead to the data transmission. It would be desirable to eliminate the need for such adjustments in the transmission.

It may be desirable in the operation of a television schedule system to provide the schedule information embedded at different places in the television signal at different parts of the system in order to avoid the necessity of imposing uniformity throughout the system To do so, it is necessary to provide a way for recipients of the schedule information to identify it in the television signal.

In the operation of a broadcast television schedule system, acquisition of new schedule information by the subscriber units consumes a substantial proportion of available microprocessor processing time. When obsolete schedule information is deleted and new schedule information is acquired, a substantial portion of the new information, such as program titles, duplicates information already present in stored schedule information or to be deleted with the obsolete schedule information. Avoiding the deletion of information that will form part of new schedule information would help to minimize the amount of processor time devoted to the acquisition of new schedule information.

Because of the severe memory limitations in consumer electronic products, it is necessary to use the memory efficiently in order to provide as much information and as much functionality in the subscriber unit as possible with the available memory.

SUMMARY OF THE INVENTION

Accordingly, it is an object of this invention to provide an interactive television program schedule system and method that can be implemented with low cost microprocessors and memory in subscriber data processing systems.

It is another object of the invention to provide an interactive television program schedule system and method in which television program schedule data is transmitted and stored in a manner that allows a low cost microprocessor suitable for use in a mass produced consumer product to carry out subset searching of the television program schedule data.

It is a further object of the invention to provide such a system and method in which television program schedule information is transmitted in an efficient manner.

It is still another object of the invention to provide such a system and method in which the television program schedule information is acquired by the subscriber data processing systems in an efficient manner.

It is a still further object of the invention to provide such a system and method in which fast schedule updates to accommodate schedule updates can be provided with a low bandwidth transmission system.

It is yet another object of the invention to provide such a system and method that will be able to distinguish between currently broadcast schedule information and older schedule information included with a broadcast that was recorded.

It is yet a further object of the invention to provide such a system and method in which schedule update information is given priority treatment.

It is another object of the invention to provide such a system and method in which the schedule information transmission is selectively encrypted.

It is a further object of the invention to provide such a system and method in which a single system time is employed in schedule information transmission portions of the system and compensation for local time is carried out in the subscriber units.

It is still another object of the invention to provide such a system and method in which the subscriber units are able to identify schedule information provided in different locations of a television broadcast signal.

It is still another object of the invention to provide such a system and method in which portions of schedule information already acquired by a subscriber unit and which duplicate portions of new schedule information are retained, so that such schedule information portions need not be acquired again by the subscriber unit.

It is yet another object of the invention to provide such a system and method in which data compression is employed in a unique way to make most efficient use of available memory.

The attainment of these and related objects may be achieved through use of the novel television schedule information transmission and utilization system and method herein disclosed. In one aspect, a television schedule information transmission and utilization system in accordance with this invention has a central data processing system. A means is connected to the central data processing system for providing schedule information data for a predetermined territory to the central data processing system. The central data processing system includes means for formatting the schedule information data for the predetermined territory into a predetermined schedule information transmission format. A means is coupled to the central data processing system for transmitting the schedule information data for the predetermined territory in the predetermined schedule information transmission formats. A plurality of regional data processing systems, each located in a region of the predetermined territory, include means for receiving the schedule information data for the predetermined territory, means for selecting the schedule information data for the region in which each of the plurality of regional data processing systems is located and means for transmitting the schedule information data for the region. A plurality of subscriber data processing systems are in each of the regions. Each of the plurality of subscriber data processing systems include means for receiving at least a portion of the schedule information data for the region, means for storing the schedule information data received by the subscriber data processing system, means for assembling portions of the schedule information data received by the subscriber data processing system for display to a user of the subscriber data processing system and a display connected to the means for assembling portions of the schedule information data to display the portions of the schedule information data.

In another aspect of the invention, a television schedule information transmission system includes a central data processing system for a predetermined territory having means for transmitting television schedule data for the predetermined territory and subscriber data processing systems in the predetermined territory. The system is improved with a plurality of regional data processing systems, each located in a region of the predetermined territory. The plurality of regional data processing systems each include means for receiving the schedule information data for the predetermined territory, means for selecting the schedule information data for the region in which each of said plurality of regional data processing systems is located and means for transmitting the schedule information data for the region to a plurality of the subscriber data processing systems in each of the regions.

In a further improvement of the television schedule transmission system, the means for transmitting the schedule information data for the region in each of said plurality of regional data processing systems has an ability to transmit the schedule information data for the region in different places of a television broadcast signal. Each of the subscriber data processing systems includes a means for locating the schedule information data in the television broadcast signal.

In a further aspect of the invention, a method in a television schedule information transmission system includes transmitting schedule information data for a predetermined territory to a plurality of regional data processing systems each located in a region of the territory. The schedule information data for each region is selected with its regional data processing system. The schedule information data for each region is transmitted with its regional data processing system to a plurality of subscriber data processing systems in each region. Portions of the schedule information data received by each subscriber data processing system are assembled for display to a user of each subscriber data processing system. The portions of the schedule information data are displayed to the user.

The method further desirably includes having at least some of the plurality of regional data processing systems transmit the schedule information data in different places of a television broadcast signal. Each of the plurality of subscriber data processing systems locates the schedule information data in the television broadcast signal.

In still another aspect of the invention, a television schedule information transmission system includes a central data processing system for a predetermined territory having means for transmitting television schedule data for the predetermined territory and a plurality of subscriber data processing systems in the predetermined territory. The system is improved by providing means in the central data processing system for transmitting the television schedule data as commands. The commands include instructions for the plurality of subscriber data processing systems in the system and television schedule information in elemental form used by the commands in the plurality of subscriber data processing systems to assemble and display a television schedule.

In a still further aspect of the invention, a method in a television schedule information transmission system includes transmitting commands from a central data processing system to a plurality of subscriber data processing systems. The commands include instructions for the plurality of subscriber data processing systems in the system and television schedule information used by the commands in the plurality of subscriber data processing systems to assemble and display a television schedule. The television schedule is assembled from the television schedule information in each of the plurality of subscriber data processing systems. The television schedule is displayed to a user of each of the plurality of subscriber data processing systems.

In a still further aspect of the invention, a television schedule information transmission system includes a central data processing system for a predetermined territory having means for transmitting television schedule data for the predetermined territory and a plurality of subscriber data processing systems in the predetermined territory. The system is improved with means in the central data processing system for transmitting a predetermined character string comprising a portion of the schedule information to the plurality of subscriber data processing systems. A means in each of the plurality of subscriber data processing systems determines whether the predetermined character string has been acquired by that subscriber data processing system. A means in each of the plurality of subscriber data processing systems stores the predetermined character string in that subscriber data processing system if it has not already been acquired In yet another aspect of the invention, a method in a television schedule information transmission system includes transmitting a predetermined character string comprising a portion of the schedule information to a plurality of subscriber data processing systems in the system. Whether the predetermined character string has been acquired by a particular subscriber data processing system is determined. The predetermined character string is stored in that subscriber data processing system if it has not already been acquired.

In a further aspect of the invention, a television schedule information transmission system includes a direct broadcast satellite. A central data processing system has means for transmitting television schedule data for the direct broadcast satellite to the direct broadcast satellite. Subscriber data processing systems have means for receiving the television schedule data for the direct broadcast satellite from the direct broadcast satellite. The system is improved with a plurality of regional data processing systems, each located in a region of a predetermined territory. The plurality of regional data processing systems each include means for receiving the schedule information data for the predetermined territory. Means selects the schedule information data for the region in which each of the plurality of regional data processing systems is located. Means transmits the schedule information data for the region to a plurality of the subscriber data processing systems in each of the regions.

In another aspect of the invention, a method in a television schedule transmission system includes transmitting television schedule data for a direct broadcast satellite to the direct broadcast satellite. The television schedule data for the direct broadcast satellite is received from the direct broadcast satellite at a subscriber data processing system. Schedule information data for a predetermined territory is received in a regional data processing system located in a region of the predetermined territory. The schedule information data for the region in which the regional data processing system is located is selected in the regional data processor. The schedule information data for the region is transmitted to the subscriber data processing system.

In still another aspect of the invention, a television schedule information transmission system includes a central data processing system having means for transmitting television schedule data. A subscriber data processing system has means for receiving at least some of the television schedule data transmitted by the central data processing system. The system is improved by providing a subscriber dam processing system including a memory for efficiently storing database items comprising the television schedule information. Each of the database items has a handle as an index into a handle table identifying memory locations corresponding to the handle. This allows physical movement of database items from one memory location to another for garbage collection. This allows holes in the database memory which arise as data ages and is discarded to be recovered and concatenated into large useful memory blocks. This trades "free" microcontroller cycles for memory, which is expensive.

In a still further aspect of the invention, a method in a television schedule information transmission system includes transmitting television schedule data. At least some of the television schedule data is received at a subscriber data processing system as database items comprising the television schedule information. Each of the database items has a handle. The handle is used as an index into a handle table identifying memory locations corresponding to the handle.

In another aspect of the invention, a television schedule information transmission system includes a central data processing system for a predetermined territory having means for transmitting television schedule data for the predetermined territory including updates of television schedule data previously transmitted. There are a plurality of subscriber data processing systems in the predetermined territory. Each of the plurality of subscriber data processing systems includes a receiver for television schedule data and a memory for storing television schedule data. The memory is coupled to the receiver. The system is improved by including means in the central data processing system for assigning a transmission priority for the updates of television schedule data previously transmitted relative to other television schedule data.

In a further aspect of the invention, a method in a television schedule information transmission system includes establishing a relative priority for transmission of the television schedule information between updates of originally transmitted television schedule information and originally transmitted schedule information. The television schedule information is transmitted in accordance with the relative priority. At least some of the transmitted television schedule information is received at a subscriber data processing system.

In yet another aspect of the invention, a television schedule information transmission system includes a central data processing system for a predetermined territory having means for transmitting television schedule data for the predetermined territory and a plurality of subscriber data processing systems in the predetermined territory. Each of the plurality of subscriber data processing systems includes a receiver for television schedule data. A memory for storing television schedule data is coupled to the receiver. The system is improved by including means in the central data processing system for identifying the transmitted television schedule data by time relative to other transmitted television schedule data. Means in the subscriber data processing system determines if television schedule data received by the subscriber data processing system has a time identification later than a time identification of television schedule data stored in the memory.

In yet a further aspect of the invention, a method in a television schedule transmission system includes transmitting television schedule data with an identification of the transmitted television schedule data by time relative to other transmitted television schedule data. The transmitted television schedule data is received with a subscriber data processing system. The television schedule data is stored in a memory of the subscriber data processing system. Television schedule data is subsequently supplied including an identification by time relative to other television schedule data. The identification by time of the subsequently supplied television schedule data is compared with the identification by time of the television schedule data stored in the memory. The stored television schedule data is replaced with the subsequently supplied television schedule data if the identification by time of the subsequently supplied television schedule data is later than the identification by time of the stored television schedule data. The stored television schedule data is maintained in the memory if the identification by time of the stored television schedule data is later than the identification by time of the subsequently supplied television schedule data.

In still another aspect of the invention, a television schedule information transmission system includes a central data processing system for a predetermined territory having means for transmitting television schedule data for the predetermined territory and a plurality of subscriber data processing systems in the predetermined territory. Each of the plurality of subscriber data processing systems includes a receiver for television schedule data. A memory for storing television schedule data is coupled to the receiver. The system is improved by including means in the central data processing system for encrypting a selected portion of the television schedule data required by the subscriber data processing system to assemble a television schedule for display. Means in the subscriber data processing system decrypts the selected portion of the television schedule data.

In a still further aspect of the invention, a method in a television schedule transmission system includes selectively encrypting a portion of television schedule data necessary to assemble a television schedule for display. The television schedule data including the encrypted portion is transmitted. The television schedule data is received in a subscriber data processing system. The encrypted portion of the television schedule data is decrypted. The television schedule data, including the now decrypted portion, is used to assemble a television schedule for display.

In another aspect of the invention, a television schedule information transmission system includes a central data processing system for a predetermined territory having means for transmitting television schedule data for the predetermined territory and a plurality of subscriber data processing systems in the predetermined territory. Each of the plurality of subscriber data processing systems includes a receiver for television schedule data. A memory for storing television schedule data is coupled to the receiver. The system is improved by including a real time clock in the central data processing system for establishing a single system time for the transmission system. The means for transmitting television schedule data includes means for transmitting the single system time. The receiver includes means for receiving the single system time. The memory has a stored value for calculating local real time from the single system time.

In a further aspect of the invention, a method in a television schedule transmission system includes establishing a single system time related to real time. The single system time is transmitted to a subscriber data processing system. Television schedule data expressed in the single system tine is transmitted to the subscriber data processing system. A value is provided to the subscriber data processing system for calculating local real time from the single system time. Local times are calculated for a television schedule from the schedule data expressed in the single system time using the value.

In still another aspect of the invention, a television schedule information transmission system includes a central data processing system for a predetermined territory having means for transmitting television schedule data for the predetermined territory and a plurality of subscriber data processing systems in the predetermined territory. Each of the plurality of subscriber data processing systems includes a receiver for television schedule data. A memory for storing television schedule data is coupled to the receiver. The system is improved by having the means for transmitting television schedule data configured to transmit the television schedule data as a show list for each day in the television schedule. The subscriber data processing system is configured to maintain show lists for a rolling window comprising a plurality of days extending from present time into future time.

In a still further aspect of the invention, a method in a television schedule information transmission system includes transmitting television schedule data as a show list for each day in the television schedule. Show lists are maintained for a rolling window comprising a plurality of days extending from present time into future time.

In yet another aspect of the invention, a television schedule information transmission system includes a central data processing system for a predetermined territory having means for transmitting television schedule data for the predetermined territory and a plurality of subscriber data processing systems in the predetermined territory. Each of said plurality of subscriber data processing systems includes a receiver for television schedule data. A memory for storing television schedule data is coupled to the receiver. The system is improved by having the subscriber data processing systems configured to store the television schedule data in compressed form in the memory. A read only memory in the data processing system stores fixed text for the system. The fixed text is stored in said read only memory in compressed form.

In yet a further aspect of the invention, a method in a television schedule information transmission system includes storing television schedule data in compressed form in a memory of the system. Fixed text for the system is stored in a read only memory, also in compressed form.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 1–5 are block diagrams of television schedule information transmission and utilization systems in accordance with the invention.

Appendix A attached to and forming a part of this application contains more detailed block diagrams of portions of the television schedule information. transmission and utilization systems of FIGS. 1–5.

FIGS. 6–25 are schematic representations of message formats used in the systems of FIGS. 1–5.

FIGS. 26–60 are schematic representations of data structures, flow charts and display formats used in the systems of FIGS. 1–5.

DETAILED DESCRIPTION OF THE INVENTION

Turning now to the drawings, more particularly to FIGS. 1–4, there is shown television schedule information transmission and utilization systems 50A–50D. The systems 50A–50D transmit TV schedule data and associated network control messages as packets via the Video Blanking Interval (VBI) lines in the TV signal from various television program providers 51, such as PBS, MFV or Showtime. This data is acquired by StarSight Subscriber Units 52 and used to construct an internal database. This internal database can be accessed by the Subscriber Unit 52 to display a TV schedule for the channels that are received by the user's TV.

Since access to the network systems 50A–50D is via a subscription service, certain messages are encrypted by a security computer 53 to prevent access by nonsubscribers. Essentially any encryption system can be used with the invention, but an encryption system as disclosed in U.S. Pat. Nos. 4,531,020 and 4,531,021 is preferred.

Packets contain error detection information and system overhead bytes for finding the head of a packet. The information embedded in a Packet is termed a Message. Messages consist of one or more Commands. There are various types of Commands, each type distinguished by a unique code number. Commands contain the different types of information necessary to construct and maintain a TV schedule database, time markers, and user authorization information.

The systems 50A–50D are data networks that deliver specially formatted data to subscribers 52 located throughout the USA. This data is used to build an "on screen program guide" that enables the system subscribers to interactively view television program listings on their TV screen. The information for this network is derived from a database that is built by a computer program running on a UNIX computer 54. To build this database a data provider (DP) 56 is required to supply the computer 54 with program listing files called Show list files.

The Show list files are transferred electronically to the file system in computer 54 through a router connected to the DP's Ethernet and a digital leased line 58, using the standard TCP/IP program, FTP, or other file transfer protocol standard mutually agreed upon. The files may require compression, due to the bulk of data being transferred, using a mutually agreed upon data compression algorithm compatible with the UNIX file system in computer 54. The operating speed of the leased line 58 will be sufficient to transfer all data files in a reasonable length of time.

The files are transferred to the computer 54 on a daily basis 7 days a week, with the file transfer completed by 0800 hours PST. The daily file transfer will be into the home directory corresponding to the login name used to perform the file transfer.

The "Main" file download to the computer 54 will always be for the date 12 days into the future. Thus if today is the 10th, today's data download would be for start times beginning at 0000 hours GMT on the 22nd.

Since the data files are sent on a daily basis some mechanism must be in place to allow for the updating of a program listing that has already been transferred. This is accomplished via the "Update" file. An Update file contains records of all changes that have been made since the last Update file was produced, which modify any of the data for any date which is still "active". An "active" date is defined as the dates beginning with today's date, and spanning the 11 days following (that is, all dates from today to the date covered by today's "Main" file, but not including that date.

Last minute schedule changes require "Flash Updates", which provide a "Flash Update" file within 5 minutes after entry of any change. Such files "trickle" across the leased line 58 to the computer 54 throughout the day.

Details of the subscriber units 52 are provided in FIG. 5. The following description is in terms of a subscriber unit 52 for a TV Receive Only (TVRO) system (see also FIG. 4). With appropriate modifications, the subscriber unit 52 can also be incorporated in a cable decoder box for use with cable systems. The subscriber unit can also be built into televisions or VCRs or provided as a separate stand alone unit.

This description is for the electronic hardware of the StarSight Telecast "TVRO Subscriber Unit" 52. TVRO customers are people who have home satellite dishes for television viewing. TVRO stands for "TV Receive Only". The TVRO Subscriber Unit 52 will hook up to the customers TVRO Satellite system and will enable the customer to subscribe to StarSight's Electronic Program Guide Service. The TVRO Subscriber Unit 52 is a fully self contained, separate unit, that is installed in series with the existing customer TVRO equipment.

The Subscriber Unit receives Baseband Video from the customer TVRO system. The Program guide display screens are merged with the customer video in the Subscriber Unit. The customer has the options of Baseband Video out or Channel ¾ RF out.

The Subscriber Unit formats and displays TV program schedule information in real time, overlaid on top of the TV viewing screen. The TV schedule information is transmitted in one of the Vertical Blanking Interval (VBI) lines of a conventional TV broadcast. The Subscriber Unit stores this information in local on board memory. The information is displayed in the form of a "Grid Guide" on the TV screen when the customer presses a button on the remote control.

The Subscriber Unit 52 consists of the following subsections:

Inexpensive 8 bit Microprocessor 100.

64 K Bytes of code ROM 101.

512 K of RAM 102 for program data storage.

Custom gate array 103.

Segmented Base Registers 104 for fast memory data manipulation.

Security logic 106 for decoding incoming encrypted data

Serial "I.M." Bus 108 for display controller interface.

Serial "StarSight" Bus 110 for inter processor communications. (ISB)

Watchdog timer 112 for error recovery.

IR input 113.

Infrared Receiver circuits 114.

Infrared Transmitter circuits 116 for TV, VCR control.

IR output 117.

CRC-32 encoding and decoding logic 118.

On board power supply 120.

Power down RAM data retention 122.

Video Input 123.

On Screen Display Controller and Formatter 124.

Custom Color Converter 126 for overlay display.

RF Modulator 127.

Choice of Baseband Video or RF outputs 128 or 130.

The heart of the TVRO Subscriber Unit 52 is an "8032, 8 bit Microprocessor" 100. This microprocessor controls all sections of the Subscriber Unit. A brief description of this processor will be given for reference. For more detail, refer to the 8032 data books from Intel or Signetics.

The 8032 has an 8 bit Data Bus and a 16 bit Address Bus. The upper 8 bits of the address bus are always present. The lower 8 bits of the Address Bus are time multiplexed with the Data Bus and an External Address Latch is required to de-multiplex this bus. This latch is located inside of the DBE 1200 Gate Array 103. The 8032 has two address spaces, the "CODE" space and the "DATA" space. The DATA space is further divided into the RAM Memory area and the I/O area.

"CODE" refers to any access to Program ROM. The Program CODE space is 64 K bytes long and the 8032 can only "READ" from this space. All Code access uses the "PSEN" (Program Store ENable) line. The –WR and –RD lines do not assert during CODE accesses. +ALE is the control signal used to de-multiplex the Address Bus. The falling edge of +ALE will latch the lower 8 bits of the address. –PSEN will then assert to start the ROM read. The current design has the EPROM –CS line always tied to ground. This makes the EPROM "OE ACCESS" time the determining spec for ROM reads. By today's standards, this microprocessor bus timing is very slow and this allows for the use of inexpensive ROMs.

"DATA" refers to any access to external RAM 102. Special additional hardware has been added to the TVRO Subscriber Unit so that the DATA area can extend past the 64 K addressing limit. This is done via segmenting "BASE REGISTERS" 104 and will be discussed later. The 8032 –RD strobe will assert for RAM Data Reads and the –WR strobe will assert for RAM Data Writes. PSEN will not assert during Data accesses. The RAM Data accesses can only take place via the "MOVX" instruction. No other 8032 instruction will cause –RD or –WR to assert Once again, +ALE is used to latch the address, then –RD or –WR will assert to start the data transfer. Read data must be valid just before –RD negates. The Write data is valid the entire time that –WR is asserted.

Along with the RAM Data Space, there is also a "64 K I/O SPACE". This I/O space occupies the same first 64 K segment as the DATA RAM. There is a signal called +DRAM$_{13}$ ENABLE that is used to determine which area will be accessed. The I/O space is where the system control registers are located. There are 18 write registers and 13 read registers. These registers are used to control the various subsystems in the Subscriber Unit. Features like clock frequency selection, serial bus control, I.R. status and control, etc . . . , are all controlled through this register set There are other control registers located in the peripheral chips. The 8032 uses two serial Busses to communicate and control these peripheral chips. The "IM BUS" 108 is a 3 wire serial bus used to talk to the transaction processing unit (TPU 2740) 124. The TPU 2740 collects the incoming VBI data and also formats and displays the various StarSight overlay screens.

The Software Serial Bus 110 is used to talk to the Security Microprocessor 106 and also to the IR Blaster Chip 116. This is a two wire bus with a unique serial timing protocol.

The first 64 K of 8032 Address Space has three separate overlapping functions.

1. If –PSEN is asserted, then the CODE ROM will be accessed.
2. If +DRAM_ENABLE=logic '0', then the I/O registers will be accessed.
3. If +DRAM_ENABLE=logic '1', then the first 64 K of RAM will be accessed.

The area above 64 K is always RAM and the total length is 512 K bytes.

8032 SIGNAL SUMMARY

Table I summarizes the input and output signals of the 8032 microprocessor:

TABLE I

| Signal Name | FUNCTION | Direction |
| --- | --- | --- |
| +ALE | Latches the low 8 bits of the Address Bus. | Output |
| –PSEN | Enables Op-Code read fetches from ROM. | Output |
| –WR | Asserts to Write to external DATA RAM | Output |
| –RD | Asserts to Read from external DATA RAM | Output |
| –INT0 | Interrupt 0-Indicates the ISB circuit requesting service. | Input |
| –INT1 | Interrupt1 - Indicates that power is about to fail. | Input |
| PORT 0 | 8 bit Multiplexed 8032 Data and Address Bus. | I/O |
| PORT 1 | Various system control bits. | I/O |
| PORT 2 | Upper 8 bits of the Address Bus | Output |
| PORT 3 | 8032 control bits. | I/O |

Base Register Description

The 8032 Data Address space is only 64 K bytes long. The TVRO Subscriber Unit however, is required to store more than 64 K bytes of TV program data. The "READ and WRITE BASE REGISTERS" allow the 8032 to access additional memory above the 64 K limit.

The 8032 uses an internal 16 bit register called the "Data Pointer Register" (DPTR) to hold the address of the external DATA location. The Base Registers (located in the DBE 1200 Gate Array) hold another 16 bit value that is added to the Data Pointer value to form the actual RAM address. The Base Register contents is shifted 4 bits left with respect to the Data Pointer so that the RAM address becomes 20 bits long. 20 bits allows for a 1 Megabyte total Data RAM size. The 8032 can access any 64 K byte chunk of the external RAM starting at the address written in the Base Registers. (Since the base register is shifted 4 bits left, the 8032 can access any 64 K byte segment starting on even 16 byte boundaries.)

There are two base registers so that Memory Block Moves can be performed quickly. It would be very slow and cumbersome to the software if the value of the DPTR had to be changed for each read and then changed again before a write during block moves. The dual Base Registers allow you to put the starting address of the Read (Source) Block into the Read Base Register, and the starting address of the Write (Destination) block into the Write Base Register. A software loop can then be written that does a read followed by a write to the same DPTR address. The DPTR is then incremented and the process repeated. This allows software to quickly move blocks of Data anywhere in external RAM.

A provision has also been added to quickly disable the Base Registers. The signal +ENABLE_BASE will force the outputs of both Base Registers to all zeros. This is done without altering the contents of the Base Registers. This feature provides a quick method of accessing the first 64 K segment of RAM. Both RAM Reads and Writes will go to the same location. Processor related data will be stored in the first 64 K segment (Register Images, Software Counter Values, System Parameters etc . . . ). The upper segments are used to store TV program information.

Table II below tries to show how the DFTR is added to the Base Register to form the 20 bit RAM address.

Note: Base Reg shifted 4 bits left with respect to Address bus.

TABLE II

| +DRAM_EN must = 1 to access the external memory area | | | | |
|---|---|---|---|---|
| Base Reg | 15 14 13 12 | 11 10 9 8 | 7 6 5 4 | 3 2 1 0 |
| +8032 Addr | | 15 14 13 12 | 11 10 9 8 | 7 6 5 4 | 3 2 1 0 |
| =20 bit Addr | 19 18 17 16 | 15 14 13 12 | 11 10 9 8 | 7 6 5 4 | 3 2 1 0 |

As an example:

The READ BASE REGISTER is set to 0001 Hex.

The WRITE BASE REGISTER is set to 1080 Hex.

The Data Pointer (DPTR) is set to 382A Hex.

An 8032 Read (MOVX A,@DPTR), will access address 0383A Hex (note: 20 bits!).

An 8032 Write (MOVX @DPTR,A), will access address 1403A Hex (note: 20 bits!).

+DRAM_EN must=0 to access the I/O area.

DATA RAM DESCRIPTION

As previously mentioned, the DATA RAM 102 stores the TV program guide information. This RAM is currently available in 3 sizes, 128 K bytes, 256 K bytes or 512 K bytes. The TVRO product uses 512 K bytes. The Data RAM uses "PSRAM" chips. "PS" stands for Pseudo Static. The PSRAM is a standard DRAM that has been packaged with STATIC RAM pinouts. Extra logic is added so that DRAM refreshes are simplified. These PSRAMs also have a power down data retention feature that works down to 3 Volts.

There are four modes of PSRAM operation in this product. They are:

1. Sequence Up Mode.
2. Normal Data Transfer Mode.
3. Sequence Down Mode.
4. Power Down Data Retention Mode.

There are two sizes of PSRAM that can be used in this design. The 128 K by 8 chip or the 512 K by 8 chip. There is a provision to use two of the 128 K by 8 parts to obtain 256 K bytes of total memory.

These two parts have slightly different pin outs and operate in slightly different methods. Circuitry has been added to compensate for these differences. There is a bit called +512 KRAM that must be set by the software depending on which chip is used.

Also the PSRAMs must go through a "Sequence Up" state after power on and a "Sequence Down" state just prior to power off.

PSRAM OPERATION (Sequence Up Operation)

After initial power up, the PSRAMs must be "SEQUENCED UP" before any reads or writes can be done. The Sequence Up procedure is slightly different for 128 K and 512 K parts. This procedure was added to insure that logic and timing specifications of the PSRAM are maintained when the PSRAMs are in the power down data retention mode. There is a provision to use a large Capacitor or a Battery to keep the PSRAMs powered up when the system power is lost.

In order to preserve PSRAM data when the power is off, certain of the PSRAM inputs must be held in a known logic state. On top of this, these pins must follow defined timing constraints when they are put into the known logic states. The pins and logic levels are different for the 128 K and the 512 K parts.

For the 128 K parts:

−Chip_Enable2 (Pin 30) and −REFRESH (Pin 1) must both be held at logic '0' when the power is removed to insure data retention. When going from data retention mode to normal operation, −REFRESH (Pin 1) must go high at least 225 nS before +CHIP_ENABLE (Pin 30) goes high.

For the 512 K parts:

−Chip Enable (Pin 22) must be held at logic '1' and −OE/−REFRESH (Pin 24) must be held at logic '0' when the power is removed to insure data retention. When going from data retention mode to normal operation, −Chip_Enable (Pin 22) must go high at least 50 nS before −OE/−REFRESH (Pin 24) goes high.

There is also a timing constraint as to how soon after normal PSRAM REFRESH the above sequences can occur. The Sequence Up logic in the DBE 1200 Gate Array controls the above timing. After a Power On Reset (POR) sequence is finished, the Microprocessor toggles a bit called +SEQUENCE_UP [Wr Addr 7400 Hex, bit 5]. (Be sure to always return this bit to logic '0'). Toggling the +SEQUENCE_UP bit will start the Sequence Up State Machine. This State Machine will wait for the end of the next normal Refresh Pulse and then it will remove the forced logic levels using the correct timing as mentioned above. The refresh pulses occur about every 11 uS and the Sequence Up process takes about 1 uS. Software should wait at least 15 uS from the time that +SEQUENCE_UP is set till when the first PSRAM access is attempted.

PSRAM OPERATION (Normal Operation)

Normal PSRAM operation is very straightforward. Refreshes are automatic and transparent to the microprocessor. The PSRAM must be Refreshed at least once every 15 uS. The Refresh address is generated inside the PSRAM and is transparent to the user. In order to do a Refresh, the Refresh pin on the PSRAM must be held low for a minimum time. For ease of circuit design, the Refresh Request is generated by the internal clock divided by 256. With a 24 MHz clock, this happens about every 10.7 uS.

The Refresh Pulse to the PSRAM chip must not occur at the same time as a PSRAM read or write access. Since the Refresh Request and any PSRAM access are asynchronous, the −PSEN line is used to start a Refresh. When the Refresh Request is detected, the Refresh circuit waits until the next −PSEN falling edge. −PSEN falls at the beginning of a CODE access to ROM. CODE accesses to ROM happen all the time as the 8032 fetches OP-CODES. During this time, it is impossible for the 8032 to access PSRAM. The Refresh is very fast and it will be finished before the −PSEN CODE fetch is complete.

CAUTION: This system must have −PSEN toggling in order to refresh PSRAM. In normal operation this will happen all of the time. Be careful if you use an 8032 emulator. The refreshes will stop if you ever break and stop the emulator. Most emulators have an option to insure that −PSEN still asserts even when an emulator breakpoint occurs.

PSRAM OPERATION (Sequence Down Operation)

Sequence Down is the opposite of Sequence Up. The system has an "Early Warning Power Fail Detector" that will interrupt the 8032 before the supply voltage starts to drop. The 8032 responds to this interrupt by saving any critical PSRAM data and then asserting the +SEQUENCE_DOWN bit. Sequence Down will force the PSRAM critical inputs to their correct state and will do so insuring that the timing specification is maintained. The Sequence Down logic will not start until the end of the next Refresh to insure proper timing. The SEQUENCE DOWN rules are shown below.

For the 128 K parts:
+Chip_Enable2 (Pin 30) must go to logic '0' at least 60 nS before −REFRESH (Pin 1) is forced to logic '0'. After the power dies, external components should hold these lines at logic '0' as the gate array outputs will be undefined.

For the 512 K parts:
+Chip_Enable (Pin 22) must be forced to logic '1' at least 50 nS before −OE/−REFRESH (Pin 24) is forced to logic '0'.

PSRAM OPERATION (Power Down Data Retention)

As long as the critical input pins are held at their power down levels (See Above) and the voltage to the PSRAM chips stays above 3.0 Volts, the data will be retained.

PSRAM POWER DOWN LATCH

There is a very low current J-K Flip Flop that is powered by the same backup capacitor that powers the PSRAMs. This flip flop lets the software know if the voltage dropped below the minimum voltage specification during a power off period.

At initial power on, this latch should power up to logic '0'. The microprocessor can read the state of this latch on the +RAMV_OK line. If the latch is '0', then it should be assumed that the voltage dropped below the PSRAM minimum data retention specification and all RAM data is invalid. If the latch ='1', then the PSRAM data is still valid from before the power down.

If +RAMV_OK is logic '0', then the microprocessor can set it to logic '1' after self test diagnostics pass. Once this latch is set to logic '1', it will stay set until the PSRAM Vdd Voltage drops below about 3.1 Volts.

Five conditions are necessary to set this latch.
1. The PSRAM voltage must be greater than 3.1 Volts. (This releases the J-K Flip Flop Reset Pin).
2. The PCB +5 Volt supply must be greater than about 4.5 Volts. (ibis releases system POR).
3. The −ENBLAT line must be set to logic '0'.
4. The +BANDO line must be set to logic '1'.
5. The +LAT_CLK line must be toggled to logic '0' and then to logic '1'.

The −ENBLAT and +LAT_CLK lines are driven by 8032 microprocessor PORT pins. These pins will be initialized to logic '1' by 8032 hardware at POR time. The +BANDO line comes from the DBE 1200 gate array and is reset to logic '0' at POR time.

By requiring all of these conditions, it is hoped that the latch will not be able to be set by spurious noise glitches at power up. It would not be a bad idea to have checksum locations in PSRAM to verify that the data is valid if the latch reads a logic '1'. (Just in case the latch can be set by a noise glitch.)

The MC14xxx series CMOS devices were chosen for the latch circuit because this family guaranteed very low worst case current drain.

DBE 1200 GATE ARRAY 103

The Gate Array 103 is packaged in an 84 pin PLCC package. The Gate Array terminology is slightly different from the PCB terminology. The PCB uses "+" in front of a signal name to indicate "active high". The Gate Array dropped the "+" and just uses the signal name when the signal is "active high". The PCB uses "−" in front of a signal name to indicate "active low". The Gate Array adds the letter "X" in front of a signal name when it is "active low".

The following abbreviations for addresses and bits will be used.

(6000W.5)=Write Address 6000 hex, bit 5.
(6C00.3)=Read Address 6C00 hex, bit 3.

ADDRESS DECODING

74F138 type 1 of 8 decoders are used with the 8032 −RD or −WR strobe used for an enable. The outputs of the 74F138 will be valid only when the proper address is written or read.

The following tables show the Write and Read addresses that are decoded. The page number refers to the page of the Gate Array schematic of Appendix A that the register can be found on. The "Gate Array Name" is the name of the decoded signal on the schematic. Table III below shows the I/O Write register decodes and Table IV shows the I/O read register decodes.

+DRAM_EN must=0 to access these registers.

TABLE III

8032 I/O WRITE REGISTERS

| WRITE ADDRESS | Pg | WRITE REGISTER ACCESSED | Gate Array Name |
|---|---|---|---|
| 8032 PORT 1 | X | VARIOUS OUTPUT CONTROL BITS | |
| 8032 PORT 3 | X | VARIOUS CONTROL AND I/O BITS | |
| 000H | 3 | READ_BASE_REGISTER_LOW | XRBASELO |
| 0400H | 3 | READ_BASE_REGISTER_HIGH | XRBASEHI |
| 0800H | 3 | WRITE_BASE_REGISTER_LOW | XWBASELO |
| 0C00H | 3 | WRITE_BASE_REGISTER_HIGH | XWBASEHI |
| 1000H | 10 | PWM_CONTROL_REGISTER_LOW | XPWM_LO |
| 1400H | 10 | PWM_CONTROL_REGISTER_HI | XPWM_HI |
| 2000H | 12 | I.M. BUS ADDRESS REGISTER | XL_IM_AD |
| 2400H | 12 | I.M. WRITE DATA 1 REGISTER | XL_IM_D1 |
| 2800H | 12 | I.M. WRITE DATA 2 REGISTER | XL_IM_D2 |
| 2C00H | 12 | I.M. BUS START TRANSFER REGISTER | XSTRT_IM |
| 3000H | 9 | IM BUS CONTROL REGISTER | XIM_CTRL |
| 3C00H | 9 | SECURITY CHIP CLOCK FREQ REGISTER | XCLK_REG |
| 6000H | 9 | OUTPUT CONTROL REGISTER | XCNTRL_1 |
| 6400H | 13 | REFRESH WATCHDOG REGISTER | XWDOG_CS |
| 6800H | 18 | CRC-32 DATA REGISTER | XWR_CRC |
| 6C00H | 29 | ISB CONTROL REGISTER | XISBCTRL |
| 7000H | 24 | ISB TRANSMIT DATA REGISTER | XISBXMIT |
| 7400H | 31 | RAM SEQUENCE AND GATE ARRAY TEST REGISTER | XWR_TEST |

TABLE IV

8032 I/O READ REGISTERS

| READ ADDRESS | Pg | READ REGISTER ACCESSED | Gate Array Name |
|---|---|---|---|
| 0400H | 31 | READ TEST MULTIPLEXER REGISTER | XRD_MUX |
| 0800H | 5 | I.R. RECEIVE DATA REGISTER | XIRR_REG |

TABLE IV-continued

8032 I/O READ REGISTERS

| READ ADDRESS | Pg | READ REGISTER ACCESSED | Gate Array Name |
|---|---|---|---|
| 0C00H | 6 | ISB INTERRUPT STATUS REGISTER | XRD_STAT |
| 1000H | 12 | I.M. READ DATA BYTE #1 | XRD_BYT1 |
| 1400H | 12 | I.M. READ DATA BYTE #2 | XRD_BYT2 |
| 1800H | 6 | I.M. STATUS AND CHIP I.D. REGISTER | XSW_LO |
| 1C00H | 6 | I.R. RECEIVER STATUS REGISTER | XSW_HI |
| 6800H | 24 | ISB RECEIVE DATA REGISTER | XRRECREG |
| 6C00H | 29 | ISB STATUS REGISTER 2 | XISB_ST2 |
| 7000H | 16 | CRC-32 READ REGISTER 3 | XRDCRC3 |
| 7400H | 16 | CRC-32 READ REGISTER 2 | XRDCRC2 |
| 7800H | 17 | CRC-32 READ REGISTER 1 | XRDCRC1 |
| 7C00H | 17 | CRC-32 READ REGISTER 0 | XRDCRC0 |

PSRAM CONTROL

The PSRAM Control logic is shown on Page 2 of Appendix A. This logic consists of simple gates that route the control signals to their proper pins depending on the mode the chip is in. The chip has two memory size modes, 128 K and 512 K. There is also a Sequence Up mode and Sequence Down mode.

PSRAM CONTROL SIGNALS

XRFSH_18 (−ReFreSH or address_bit_18)

This is a dual purpose signal that should be tied to pin 1 of the PSRAM chips. When Sequenced Up, this signal is mode dependent In 128 K mode, the −REFRESH signal is routed to this pin.

In 512 K mode, Bit 18 from the Address Mux is routed to this pin.

When Sequenced Down, this signal is forced to logic "0".

XRAM_OE0 (−RAM Output Enable 0)

This is a dual purpose signal that should be tied to pin 24 of the lower PSRAM chip. When Sequenced Up, this signal is mode dependent.

In 128 K mode, this is the PSRAM read output enable line for the lower 128 K PSRAM chip. It can only assert (active low) if the address is to the lower 128 K and the 8032 −RD line asserts.

In 512 K mode, this is the PSRAM read output enable AND the Refresh input. If this signal asserts by itself, then a refresh happens. If it asserts along with the −Chip Select pin, then a PSRAM read takes place.

When Sequenced Down, this signal is forced to logic "0".

XRAM_WE0 (−RAM Write Enable 0)

This signal should tie to pin 29 of the low order PSRAM chip. A PSRAM write will be done when this signal asserts along with a valid chip select. When Sequenced Up, this signal is the Write Enable to the PSRAMs in both modes. When Sequenced Down, this signal is a don't care.

XRAM_OE1 (−RAM Output Enable 1)

This is a dual purpose signal that should be tied to pin 24 of the upper PSRAM chip. When Sequenced Up, this signal is the Output Enable control for reads from the upper PSRAM chip in 128 K mode. This signal is not used in 512 K mode as there is no upper chip installed. When Sequenced Down, this signal is a don't care.

XRAM_WE1 (−RAM Write Enable 1)

This signal should tie to pin 29 of the high order PSRAM chip. A PSRAM write will be done when this signal asserts along with a valid chip select. When Sequenced Up, this signal is the Write Enable to the upper PSRAM in 128 K mode. (Note: The current design does not use an "upper" chip in 512 K mode.) When Sequenced Down, this signal is a don't care.

XCE1 (−Chip Enable 1)

This is a dual purpose signal that should be tied to pin 22 of the PSRAM chips. When Sequenced Up, this signal enables the PSRAM chips to read and write in both modes. When Sequenced Down, this signal is forced to logic "1". The 512 K PSRAM chip requires this line to be forced to logic "1" during power down data retention mode. This line is a don't care on 128 K PSRAMs.

CE2_A17 (+Chip Enable 2 or Address_bit_17)

This is a dual purpose signal that should be tied to pin 30 of the PSRAM chips. When Sequenced Up, this signal is mode dependent.

In 128 K mode, this signal is tied to +Chip Enable and it is always logic "1".

In 512 K mode, Bit 17 from the Address Mux is routed to this pin.

XWRSTROB (−WRite STROBe)

During write, this is a shorter version of the 8032 write strobe. XWRSTROB is the timing signal used to write to PSRAMS. Data is written to PSRAM at the rising edge of XWRSTROB. This rising edge hits before the rising edge of the 8032 −WR to insure that any PSRAM data hold tis are met.

BASE REGISTERS AND ADDRESS MULTIPLEXER

Pages 3 and 4 of the Gate Array schematics in Appendix A show the Base Registers and the PSRAM address Multiplexer. See above for a description of the Base Register functions. This section will deal with the circuitry.

The Base Registers are shown at the left of Page 2. The outputs of these registers pass trough "AND" gates before going into the Adders. The AND gates allow the base register outputs to be quickly forced to all zeros at the Adder inputs.

The outputs of the Adders feed over to the MUX. This MUX places the results of the READ ADDERS on the PSRAM address pins most of the time by default. There is no way to know that the 8032 is going to do a write until the −WR strobe asserts. When −WR asserts, a flip flop switches the MUX over to the WRITE ADDER output. The read adder was chosen for the default value because RAM reads take a little longer than writes. The dual adders are there so that the write address is stable as soon as the −WR strobe asserts.

I.R. RECEIVE CIRCUIT

The I.R. Receive circuit has various modes of operation depending on whether the button on the remote is released or if it is continuously held down. This circuit is on page 5 of Appendix A.

When a valid code is clocked into the I.R. RECEIVE DATA REGISTER (0800R), the +IRR_VAL (IR Receive Valid) bit and the +VALTILRD (VALid TIL RD) bits will set. The +IRR_VAL bit will remain set until the remote button is released. There are 2 ways to clear the +VALTILRD bit.

1. Reading the I.R. RECEIVE DATA REGISTER will clear +VALTILRD.
2. If the remote button is released and then pressed again, then +VALTILRD will clear when the button is re-pressed.

+IRR_NC (I.R. RECEIVER NO CHANGE) will set the first time that the I.R. RECEIVE DATA REGISTER is read. It will remain set until the remote button is released.

+IRR_RDY goes high as soon as the remote button is pressed and stays set until released.

SECURITY CLOCK GENERATOR

The Security Clock Generator is at the lower middle of page 9 in Appendix A. This is a programmable clock generator for the Motorola Security Chip. The original spec for this clock was 5 MHz. To allow for changing oscillator frequencies, this clock was made programmable.

Both the high time and the low time of this clock period can be programmed independently by writing to I/O address 3C00 hex. The high time is set with the upper nibble while the lower nibble sets the low time. This time is in multiples of the input oscillator frequency.

The circuit works by loading the program nibbles into 74F169 type counters. These counters are set up as "down counters" and only one of them will decrement at any one time. After one counter reaches zero, the output will toggle, the counter will re-load and then the other counter will decrement. The inverters at the output of the program register set the initial value to "divide-by-7".

I.M. SERIAL BUS CIRCUIT

The I.M. Bus is used to talk to the TPU 2740 chip. The I.M. bus circuit is shown in Figures. Refer to the I.M. bus specification for a detailed explanation of this bus. Briefly, the I.M. bus is a 3 wire serial communication bus. The 3 lines are called I.M. CLOCK, I.M._DATA and I.M._IDENTIFY. The DBE 1200 gate array is always the I.M. Bus Master and therefore always drives the I.M._CLOCK line. The I.M._DATA line is a bi-directional data line (Open Drain with an external pull up resistor). The I.M._IDENTIFY line is an output used to identify the "I.M. Address" and also to terminate the transfer. An "IM BUS WRITE" is a transfer out of the 8032 to the IM Slave. An "IM BUS READ" is into the 8032 from the IM Slave device.

I.M. bus transfers always start with a 1 byte address and then 1 or 2 bytes of data. A bit called I1BYTE (3000W.0) determines how many data bytes to transfer. Another bit called WXR_BIT (3000W.1) determines if the transfer will be a read or a write. Page 11 of Appendix A shows the I.M. counter and control logic and Page 12 shows the I.M. Data Shift Registers.

I.M. CIRCUIT OVERVIEW

The I.M. circuit is operated via the control and data registers. Here is a quick summary:

I.M. BUS ADDRESS REGISTER (2000W page 12 XL_IM_AD). The 8032 writes the 8 bit address of the slave device that communication should be established with here. This address is latched in the 74HCT273 in Figure and is transferred to the shift register when the transfer begins. It is not necessary to reload this register if the same address is accessed on two successive I.M. transfers. The byte written to this register will always be the first byte written out of the Gate Array for all I.M. transfers.

I.M. WRITE DATA 1 REGISTER (2400W page 12 XL_IM_D1). The byte contained in this register will be the 2nd byte shifted out onto the I.M. bus during I.M. Writes. This register must be reloaded after each transfer.

I.M. WRITE DATA 2 REGISTER (2800W page 12 XL_IM_D2). The byte contained in this register will be the 3rd byte shifted out during I.M. Writes, but only if the transfer length is set to 2 bytes. This register must be reloaded after each transfer.

I.M. READ DATA BYTE 1 (1000R page 12 XRD_BYT1). After a read transfer, this register will contain the incoming data byte. If it is a 1 byte read transfer, then the data will be in this register. If it is a 2 byte read transfer, then the second byte received will be in this register.

I.M. READ DATA BYTE 2 (1400R page 12 XRD_BYT2). After a 2 byte read transfer, this register will contain the first incoming data byte. During a 1 byte read transfer, the outgoing address will wrap back and end up in this register. This wrap feature can be used for error checking or diagnostics.

I.M. BUS CONTROL REGISTER. (3000W page 9 XIM_CTRL) Bit 1 of this register determines whether the transfer is read or write. Bit 0 of this register determines if 1 or 2 data bytes will be transferred I.M. BUS START TRANSFER REGISTER. (2C00W page 11 XSTRT_IM) Writing any value to this register will start the I.M. bus hardware.

I.M. BUS STATUS REGISTER. (1800R page 6 XSW_LO) Bit 7 of this register contains the +IM_BUSY line. This line will be high during the I.M. transfer.

I.M. CIRCUIT OPERATION

The logic on page 11 controls the I.M. Bus transfers. The I.M. clock (IM_P_CK) and the 8032 input oscillator clk (OSC_2) are both derived from the 24 MHz oscillator. The 8032 does not specify any timing with respect to the input oscillator and the timing that is specified is very loose with respect to a 12 MHz input clock. For this reason, it must be assumed that the Start Transfer Pulse from the 8032 and the IM_P_CK are asynchronous. The first 3 flip flops at the lower left of Figure are used to re-synchronize these signals and to start the I.M. transfer.

After the transfer is started, the 74F269 counter on page 11 will start to count up from zero. The EN_IMCK line will allow the IM_P_CK to gate out to the I.M. bus clock pin 14. The first 8 clocks will clock out the address and the I.M._IDENTIFY line will assert during this time. When the counter reaches a count of 8, the I.M._IDENTIFY line will negate.

If an I.M. Write is in progress, then the I.M._DATA line will continue to be an output for the rest of the transfer. If an I.M. Read is in progress, the I.M._DATA line will switch from an output to an input after the 8th count. The transfer will abort after count 16 or count 24 depending on the state of the I1BYTE (3C00W.0) bit.

After all of the clocks have completed, the I.M._IDENTIFY line will briefly pulse low one more time to indicate that the transfer is complete. During this entire time, the IM_BUSY bit will be asserted and available to the 8032 as status. The IM_P_CLK is created by dividing the 24 MHz oscillator by 32. This yields a clock edge at about every 1.3 uS. A full 24 clock transfer takes about 32 uS.

WATCHDOG TIMER

The Watchdog Timer is on page 13 of the Gate Array Schematic, Appendix A. This timer can be turned on and off with the bit EN_WDOG (3000W.7). The Watchdog is reset in normal operation by writing to address 6400W. The data written to this address is "don't care".

The Watchdog timer is 16 bits long and it is clocked by the OSC_256 clock This timer was made out of synchronous counter blocks (I_SCBR) provided by the Gate Array vendor. The Watchdog starts at Zero and counts up. If it is allowed to overflow, then the reset line to the 8032 will assert. The Power on Reset line to the Gate Array will also assert. The 8032 reset line will assert about 256 clocks before the Gate Array POR internal reset asserts. The 8032 requires that a fixed number of clocks be provided while the reset line is asserted in order to properly reset The internal Gate Array POR line completely resets the Watchdog circuit, so it is necessary to delay these events for proper 8032 reset timing.

NOTE: The Gate Array internal POR line completely resets the chip to a known state except for the OSC divider clocks on page 9 and the IM Read data registers on page 12.

CRC 32 POLYNOMIAL CIRCUIT

The CRC-32 circuit is on pages 15–18 of the Gate Array Schematic. This circuit can be used to Check or Generate the CRC-32 Polynomial. This polynomial is four bytes long and is used to verify data integrity.

The circuit has two modes of operation, CRC-32 on and CRC-32 off. The bit X_EN_XOR (6000W.4) determines the mode. When this bit is logic "0", the CRC-32 logic is enabled and any data written to the CRC registers will be multiplied by the CRC-32 polynomial. When this bit is logic "1", the CRC-32 polynomial is disabled and the data shifts into the CRC-32 registers unaltered.

The circuit consists of four 8 bit Read Data Registers, one Write Data Register, the above mentioned control bit and control logic. Here is a summary of the registers.

CRC-32 READ REGISTER 3 (7000R)
CRC-32 READ REGISTER 2 (7400R)
CRC-32 READ REGISTER 1 (7800R)
CRC-32 READ REGISTER 0 (7C00R)
CRC-32 WRITE DATA REGISTER (6800W)
X_EN_XOR Control bit (6000W.4)
CRC 32 CIRCUIT OPERATION Data is entered into the CRC circuit one byte at a time. This is done by writing the byte to the CRC-32 Write Data Register (6800W). After the 8032 completes the write, a hardware state machine will take the byte and shift it into the CRC circuit. (This shift takes about 1.5 uS if the OSC is at 24 MHz.) When all of the bytes have been shifted in, the resultant can be read out of the four CRC-32 Read Registers. The CRC circuit can be turned off in order to initialize the four registers to a known value.

The CRC-32 Write Data Register is on page 18. This is a parallel in, serial out shift register. The end of the 8032 –WR strobe will start the shift logic in page 15. This logic will synchronize the shift start to the OSC_2 clock. A 3 bit counter will count out exactly 8 clocks, then shut the circuit off.

The X_EN_XOR bit can be used to initialize the CRC-32 circuit to a known value. Some CRC schemes start with all 32 bits set zero, others start with all bits set to one. When X_EN_XOR is set to logic "1", the CRC-32 circuit Exclusive-OR gates are all disabled. This allows the data written to the CRC-32 Write Data Register to enter, the CRC-32 flip flop chain unaltered. This feature also allows for breaks in the CRC calculation. When a break occurs, the software could read and store the data in the four CRC-32 READ REGISTERS. At a later time, this data can then be reloaded back into these registers.

The CRC-32 polynomial is:

$$x^{32}+x^{26}+x^{23}+x^{22}+x^{16}+x^{12}+x^{11}+x^{10}+x^{8}+x^{7}+x^{5}+x^{4}+x^{2}+x+1.$$

GATE ARRAY PINOUTS

Table V shows the pinouts for the gate array

TABLE V

| PIN NO. | PIN NAME | PIN TYPE | SPECIAL NOTES |
|---|---|---|---|
| 1 | GND1 | POWER | |
| 2 | VDD1 | POWER | |
| 3 | PRAM_A15 | OUTPUT_2 | drives psram address line |
| 4 | PRAM_A16 | OUTPUT_2 | drives psram address line |
| 5 | PXRFSR18 | OUTPUT_2 | drives psram rfsh in 128K mode, A18 in 512K mode. |
| 6 | PTESTOUT | OUTPUT_2 | TEST OUTPUT |
| 7 | PBAND1 | OUTPUT_1 | output digital control bit. |
| 8 | PBAND0 | OUTPUT_1 | output digital control bit. |
| 9 | PIRR_DTA | INPUT_1 | IR input |
| 10 | PIRR_CLK | INPUT_1 | IR input |
| 11 | PIRR_RDY | INPUT_1 | IR input |
| 12 | P_XRESET | INPUT_1 | SYSTEM POWER ON RESET |
| 13 | P_IM_DTA | I/O_1 | IM bus data line, open drain |
| 14 | PIM_CLK | OUTPUT_4 | IM bus clk line, output only |

TABLE V-continued

| PIN NO. | PIN NAME | PIN TYPE | SPECIAL NOTES |
|---|---|---|---|
| 15 | PIM_IDEN | OUTPUT_4 | IM bus identify line |
| 16 | PXRAMWE1 | OUTPUT_3 | PSRAM #1 R/W line |
| 17 | PXRAMWE0 | OUTPUT_3 | PSRAM #0 R/W line |
| 18 | PRAM_A13 | OUTPUT 2 | drives psram address line |
| 19 | PRAM_A8 | OUTPUT_2 | drives psram address line |
| 20 | PRAM_A6 | OUTPUT_2 | drives psram address line |
| 21 | PRAM_A9 | OUTPUT_2 | drives psram address line |
| 22 | GND2 | POWER | |
| 23 | VDD2 | POWER | |
| 24 | PRAM_A5 | OUTPUT_2 | drives psram address line |
| 25 | PRAM_A11 | OUTPUT_2 | drives psram address line |
| 26 | PRAM_A4 | OUTPUT 2 | drives psram address line |
| 27 | PRAM_A10 | OUTPUT 2 | drives psram address line |
| 28 | PXRAMOE0 | OUTPUT_3 | PSRAM #0 output enable line |
| 29 | PXRAMOE1 | OUTPUT_3 | PSRAM #1 output enable line |
| 30 | PXCE1 | OUTPUT_3 | PSRAM chip select |
| 31 | P6805CLK | OUTPUT_4 | Security Micro Clock |
| 32 | POSC_2 | OUTPUT_4 | 8032 microprocessor clock |
| 33 | P_XWR | INPUT_1 | 8032 write stobe |
| 34 | P_XRD | INPUT_1 | 8032 read strobe |
| 35 | PXISBINT | OUTPUT_3 | ISB interrupt line to 8032 |
| 36 | PUPRESET | OUTPUT_3 | active high reset to 8032 |
| 37 | PDRAM_EN | INPUT_2 | RAM enable bit |
| 38 | PXENBASE | INPUT_2 | Base Register enable bit |
| 39 | P_AD0 | I/O_2 | 8032 data bus |
| 40 | P_AD1 | I/O_2 | 8032 data bus |
| 41 | P_AD2 | I/O_2 | 8032 data bus |
| 42 | P_AD3 | I/O_2 | 8032 data bus |
| 43 | GND3 | POWER | |
| 44 | VDD3 | POWER | |
| 45 | P_AD4 | I/O_2 | 8032 data bus |
| 46 | P_AD5 | I/O_2 | 8032 data bus |
| 47 | P_AD6 | I/O_2 | 8032 data bus |
| 48 | P_AD7 | I/O_2 | 8032 data bus |
| 49 | P_ALE | INPUT_1 | 8032 address latch enable |
| 50 | P_XPSEN | INPUT_1 | 8032 program store enable |
| 51 | P_A15 | INPUT_2 | 8032 upper address bus bit |
| 52 | P_A14 | INPUT_2 | 8032 upper address bus bit |
| 53 | P_A13 | INPUT_2 | 8032 upper address bus bit |
| 54 | P_A12 | INPUT_2 | 8032 upper address bus bit |
| 55 | P_A11 | INPUT_2 | 8032 upper address bus bit |
| 56 | P_A10 | INPUT_2 | 8032 upper address bus bit |
| 57 | P_A9 | INPUT_2 | 8032 upper address bus bit |
| 58 | P_A8 | INPUT_2 | 8032 upper address bus bit |
| 59 | PIR_XCLK | OUTPUT_4 | 2 or 4 MHz clk for IR transmitter |
| 60 | P_A0 | OUTPUT_3 | demultiplexed 8032 lower address bus bit |
| 61 | P_A1 | OUTPUT_3 | demultiplexed 8032 lower address bus bit |
| 62 | P_A2 | OUTPUT_3 | demultiplexed 8032 lower address bus bit |
| 63 | P_A3 | OUTPUT_3 | demultiplexed 8032 lower address bus bit |
| 64 | GND4 | POWER | |
| 65 | VDD4 | POWER | |
| 66 | PXTAL1 | OSC INPUT | external crystal oscillator pin |
| 67 | PXTAL2 | OSC OUT | external crystal oscillator pin |
| 68 | P_A4 | OUTPUT_3 | demultiplexed 8032 lower address bus bit |
| 69 | P_A5 | OUTPUT_3 | demultiplexed 8032 lower address bus bit |
| 70 | P_A6 | OUTPUT_3 | demultiplexed 8032 lower address bus bit |
| 71 | P_A7 | OUTPUT_3 | demultiplexed 8032 lower address bus bit |
| 72 | PISB_CLK | I/O_1 | ISB clk line |
| 73 | PISB_DTA | I/O_1 | ISB data line |
| 74 | PBAND2 | OUTPUT_1 | output digital control bit |
| 75 | P1378_IN | INPUT_1 | divide by 2275 clk input for MC1378 |
| 76 | P1378OUT | OUTPUT_4 | divide by 2275 output for MC1378 |
| 77 | PPWM_OUT | OUTPUT_4 | Pulse Width Modulator output |
| 78 | PRF_SEL2 | OUTPUT_ | output digital control bit |
| 79 | PRF_SEL1 | OUTPUT_1 | output digital control bit |
| 80 | PRF_SEL0 | OUTPUT_1 | output digital control bit |
| 81 | PRAM_A7 | OUTPUT_2 | drives psram address line |

TABLE V-continued

| PIN NO. | PIN NAME | PIN TYPE | SPECIAL NOTES |
|---|---|---|---|
| 82 | PRAM_A12 | OUTPUT_2 | drives psram address line |
| 83 | PCE2_A17 | OUTPUT_2 | PSRAM CE2 in 128K mode, A17 in 512K mode |
| 84 | PRAM_A14 | OUTPUT_2 | drives psram address line |

OUTPUT_1 = 4 mA, NORMAL SPEED, (OUTPUT PORT CONTROL BITS)
OUTPUT_2 = 2 mA,, SLOW (10 nS) RISE AND FALL TIMES. (PSRAM ADDRESS OUTPUTS)
OUTPUT_3 = 2 mA NORMAL SPEED OUTPUT.
OUTPUT_4 = 4 mA NORMAL SPEED OUTPUT. (Used for CLOCKS).
Note: Outputs 1 and 2 grouped differently so output bit current can easily be changed between groups.
INPUT_1 = TTL INPUT LEVELS WITH SCHMITF TRIGGER
INPUT_2 = TTL INPUT LEVELS.
I/O_1 = 2 mA OUTPUT DRIVER (with active high enable), OPEN DRAIN OR TRISTATABLE. INPUT IS TTL LEVEL
I/O_2 = 2 mA OUTPUT DRIVER (with active high enable). INPUT IS TTL LEVEL [data bus]

TPU 2740 ONSCREEN CONTROLLER 124

The TPU 2740 124 functions as an On Screen Display (OSD) controller and also as a Closed Caption Data (CCD) VBI Data Slicer. This device has two functionally separate sections, the OSD and the CCD VBI data slicer. The TPU 2740 contains a RISC based processor called the Fast Processor (FP) that is used to collect the VBI data, communicate with the serial bus, and control the OSD. Some of the internal TPU2740 circuits are running at four times the input clock frequency (This is 72 MHz on the TVRO board with an 18 MHz input clock). Communications between the 8032 and the TPU2740 are via the 3 wire IM Serial Bus 108.

The TPU 2740 is a fully digital chip, Baseband Video data must first be digitized before the TPU can use it. A 6 bit Analog to Digital converter (uPC660) does this digitizing.

The uPC660 is shown on page 1 of the TVRO schematics in Appendix A. The input video signal is about 1 Volt P—P and this signal must be "clamped" to a known DC level before it can be digitized. The "VIDEO CLAMP AND FILTER" on page 1 does this using a "Back Porch Clamp" method. This clamp will bias the video signal into the A/D converter so that the "Back Porch" area will be at about 3.69 Volts DC. (The "Back Porch" is the area where the color burst sits.)

The resistor network on page 1 comprised of R15, R16, R17 and R18 sets the voltage levels for the clamp and the A/D circuits. The A/D upper reference (pin 11) is set to about 4.52 Volts and the lower reference (pin 13) is set to about 3.35 Volts. If the input video signal back porch area is biased to 3.69 Volts DC (at pin 12), then the maximum peak to peak swing of the video signal should always be between the voltages at the reference pins. The TPU only uses the incoming video signal to strip off VBI Closed Caption Data. There is no need for the entire 4 MHz video bandwidth so R7 and C6 form a low pass filter that rolls off the TPU video at about 1 MHz. (Note: The ratios of the clamp voltages are the same as the expected video signal IRE values.)

Circuitry in the TPU detects vertical and horizontal sync from the digitized video. The OSD and VBI data slicers use these signals for timing functions. A programmable comparator is used to detect vertical and horizontal sync pulses. It is important that the video clamp function correctly in order for this comparator to accurately detect sync. The FP reads the output of the sync detection circuitry and is able to count horizontal lines, thus is able to read VBI data from a particular VBI line and start the graphic on screen display at the correct video scan line. When a VBI signal that contains the proper lead in and framing data is detected, the VBI circuitry on the TPU will load the VBI data into internal registers that the FP may read. The FP reads this data and inserts it into a buffer. At a later time the VBI data may be read by the 8032 via the IM Bus.

The TPU requires good digitized video and a stable horizontal timing reference on pin 27. The horizontal rate signal is +Burst Gate from the MC1378 and is fed into the TPU at pin 27. If either of these signals is missing or poor, then the TPU will not be able to create a stable overlay.

The OSD portion of the TPU consists of cache memory, character memory, timing functions, and an external 256 K by 4 bit DRAM (U9). The FP reads high level graphic commands from the IM Bus and stores the graphic information in the external DRAM memory. In conjunction with the cache memory, timing circuitry, and the character generation hardware, the TPU FP outputs the graphic data on the R, G, B, and FBLOUT lines. 8 colors may be generated using the R, G, and B outputs. The FBLOUT (Fast BLanking OUT) signal determines if the video output should contain the R, G, B data from the TPU, or if the incoming live video should be passed through.

The TPU has a 256 K×4 DRAM (U9) for storing overlay screens and data. This is a fast page mode DRAM and refresh logic is avoided by constantly reading out the screen data, even when there is no overlay on the screen.

R,G,B COLOR CONVERTER.

The StarSight Telecast graphic display requires 8 colors, black, white, gray, yellow, light yellow, light green, and red. These colors are not the standard 8 NTSC saturated colors that the TPU puts out. A "Color Converter Circuit" is required to translate the TPU saturated digital colors into the StarSight graphic display "pleasing" colors. This circuit is on page 2 of the PCB schematic. The Color Converter if made from three "8 into 1 analog switches". There is one switch for each of the R,G,B outputs. There is a precision voltage divider that creates the desired R,G,B voltages. The analog switches route the proper voltage to their outputs based on the 3 bit digital R,G,B signal from the TPU. The TPU R,G,B outputs are programmed to be open drain so that a full TTL level swing is available to the multiplexing analog switches. R14 and C18 on page 2 form an inexpensive R-C delay for the Fast Blanking Signal to compensate for delays in the R,G,B channel.

OVERLAY GENERATOR AND VIDEO SYNCHRONIZER.

The Motorola MC1378 is used as a main building block for the Video Synchronizer. The MC1378 operates in REMOTE MODE (pin 1 is set HIGH). In this mode, external video is required to create the synchronizing timing signals. See page 3 of the TVRO Schematic of Appendix A for a block diagram of the 1378.

A 1 volt peak to peak NTSC video signal must be fed into pin 24 to provide timing information for both the 1378 and the TPU.

The signal at pin 24 is the called the "Remote Video Signal". This signal is internally clamped in the 1378 and then Composite sync is separated out. Composite Sync is used to separate out Vertical Sync and also to lock the 4.03 MHz Horizontal Phase Locked Loop. Both Composite Sync (pin 39) and Vertical Sync (pin 38) are externally available for debug and timing.

The separated composite sync is used to lock the 4.03 MHz PLL (using PD1). The VCO in this PLL is formed around a 4.03 MHz ceramic resonator. The free running frequency of this ceramic resonator must be adjusted with C39. The best way to adjust this VCO is to use a frequency counter and adjust C39 until the frequency at U1–5 is 15,750 Hz. This adjustment is made with the Video In signal disconnected so that the VCO is free running.

The 4.03 MHz VCO output is divided by 256 to obtain horizontal frequency, and then further decoded to create "BURST GATE". Burst Gate (MC1378 pin 5) is about 4 uS wide and is centered around the 3.58 MHz color burst. This signal is the main timing reference for the overlay display. It is used extensively by both the 1378 and TPU 2740. The TPU uses Burst Gate to decide when to start the overlay. There is a programmable counter in the TPU that sets the delay from Burst Gate to the overlay start. (The overlay starts when +FBLOUT goes low.) Any jitter on Burst Gate will cause an annoying side to side motion on the overlay.

The color burst from the remote video is used to lock the 4X color sub carrier oscillator using PD3 which is gated by burst gate.

Phase of the locally generated composite video from the encoder section is compared against the same sub carrier reference used to lock PD3. This is done by means of PD4 so that the sub carrier phases of both the local and the remote signals are made essentially equal.

Phase detector operation summary:

1. PD1—compares and locks the internally counted down 4.03 MHz VCO to the incoming remote horizontal sync. It is fast acting to follow VCR source fluctuation. Its PLL filter network consists of C24, C38, and R19.
2. PD2—is not used in this design.
3. PD3—a gated phase detector, which locks the crystal oscillator frequency divided by four to the incoming remote signal burst.
4. PD4—controls the internal phase shifter to assure that the outgoing local color burst has the same phase as the incoming remote burst at PD3.
15. PD5—not used in this mode of operation Video paths inside the MC1378

The remote video is AC coupled and fed in through pin 24 and clamped to proper DC level (blanking is at 0 V). The clamped video is fed to the Fast Video Switch where switching between the local and the remote video occurs controlled by Overlay Enable at pin 25. The second path leads to the PD3 where the remote video burst is compared against crystal oscillator frequency divided by four. The third path leads to Identity Detector which determines whether incoming signal is PAL or NTSC.

The local video is generated from R, G, and B signals which are direct coupled, 1 volt peak to peak inputs at pins 14, 15, and 16. After that follows the Color Difference and Luma Matrix which produces B-Y, R-Y, and the luminance –Y signals. The B-Y and R-Y signals are clamped and sent to their respective modulators. Modulated B-Y and R-Y signals are summed together thus making 3.58 MHz NTSC chroma signal which is fed out pin 18. This chroma signal is filtered by a 3.58 MHz band-pass filter consisting of C33, C34, C35, R22, R13, and T1. The filtered chroma signal is fed back in at pin 20. At this point the chroma signal is added to the luminance signal which passes through a 400 nS delay line. The need for this delay line arises because of the longer path for the chroma signal through the modulators and the band-pass filter. The delay line should have at least 4 MHz bandwidth, and good linearity through its entire bandwidth as well as linear group delay. The chroma and luma signals combined make the composite NTSC video signal which is then clamped by the local video clamp and fed to the fast video switch to be mixed with the remote video at the output pin 27.

To keep the local video amplitude correct in respect to the remote video amplitude the two burst amplitudes are compared in the ACC detector and made equal using a variable gain ACC amplifier in the locally generated chroma path.

The absolute burst amplitude of the remote signal is detected by the kill detector, the chroma of the locally generated signal being turned off when the remote burst falls below a predetermined level. The kill level can be adjusted by changing the value of the resistor R3 at pin 31. 470 K kills at about 10–20 mVp-p remote burst. Normal burst is 286 mVp-p.

POWER SUPPLY

The system requires 5 VDC digital, 5 VDC analog, and possibly 12 VDC analog (for certain RF Modulators). The current requirements are:

| 5 VDC Digital | 550 mA |
|---|---|
| 5 VDC Analog | 150 mA |
| 12 VDC Analog | 80 mA |

It is very important that the microprocessor –PWRBAD line is set to zero at least 10 mS before the 5 VDC Digital supply drops below 4.75 volts. This allows the microprocessor to complete any pending database transactions and do an orderly shutdown of the DRAM. This is accomplished by monitoring the unregulated power with the Seiko S80731AN power supervisor IC (U2). After the unregulated supply drops below about 8 volts, the S80731AN will assert –PWRBAD. This causes an interrupt in the microprocessor which will initiate power down subroutines. U3 monitors the 5 VDC supply and controls the –RESET line into the DBE 1200. This generates a clean reset signal during power up and power down.

I.R. TRANSMITTER 116.

The I.R. Transmitter 116 function is done with a MC68HC05C9 microprocessor. This microprocessor is programmed to interface with the software serial bus 110 for communication with the 8032. This microprocessor can generate pulses on its output pin that simulate IR signals for most VCR's. The ROM in the MC68HC05C9 contains the executable program and the codes and sequences to control a VCR via Infrared. Port B on the MC68HC05C9 is used to set the serial address that it will respond to. The clock signal is generated by a programmable clock divider in the DBE1200 gate array.

FIG. 6 illustrates how packets 300, messages 302 and commands 304 are related. FIG. 7 provides further details of packets 300. Unless otherwise noted, all fields are binary 2's complement numbers. All undefined bits within fields are reserved, and initialized to zero. All multi-byte variables are stored most significant byte first (big endian format), unless otherwise noted. Notable exceptions are the CRC16 and CRC32 fields, which are stored in reverse order, least significant byte first (little endian format).

All viewable text strings are comprised exclusively of printable characters, where printable is defined as any character with ASCII values in the range of 32 (20H) to 122 (07AH), inclusive. Both upper and lower case letters are supported. All fixed fields which contain ASCII strings that do not fill the field are to padded with NULL (ASCII value 0) characters. Unless otherwise specified, strings which do fill the field are not NULL terminated.

Packets 300

Packets 300 consist of error detection information and information to be operated on by a subscriber unit. The packet fields shown in FIG. 7 have the following descriptions, as shown in Table VI:

TABLE VI

| Field | Description |
|---|---|
| sync | Code number indicating the start of a Packet. Used to locate the start of a Packet when transmission errors occur. Value is always 2C(hex). |
| size | Is the total size of the packet, in bytes. This includes the 'sync', 'size' 'packet time stamp, 'CRC1', 'Message', and 'CRC32 ' fields. There is no official maximum size for packets. All units which listen to packet streams should be prepared to ignore any packet that exceeds the maximum packet size the unit can handle. First generation Subscriber Units ignore any packet that is greater than 2048 Bytes in length, total. |
| packet time stamp | Is the four byte time stamp of the minute the packet was transmitted. This field is used by subscriber units to differentiate data streams on recorded mediums (such as VCR tapes) from live data streams. The time is encoded as minutes since January 1, 1992, rounded to the nearest minute boundary. Since packet headers are not guaranteed to be transmitted on minute boundaries, the maximum error of this field is up to ± 30 seconds. |
| vbi Stream ID | Is a two byte number identifying the unique ID of the VBI stream the command has been transmitted on. This field may be used by subscriber unitsto identify their assigned "home" data stream, where their key distribution message will be broadcast. |
| CRC1 | Least significant word (16 bits) of the 32 bit cyclic redundancy code (CRC-32) vaiue for the Packet header. The CRC is computed over the 'sync' and 'size' fields. This field is stored least significant byte first (little endian format). |
| Message | Information bearing portion of a Packet. Contains one or more Commands. |
| Command | An entity that contains information pertaining to a specific portion of the database, or time markers, or user authorization information. Each type of Command contains a unique code number and a length field. |
| CRC32 | 32 bit cyclic redundancy check (CRC-32) value. The CRC is computed over the 'sync', 'size', 'CRC1', and 'Message' fields. The CRC32 generator polynomial is $x^{32} + x^{26} + x^{23} + x^{22} + x^{16} + x^{12} + x^{11} + x^{10} + x^8 + x^7 + x^5 + x^4 + x^2 + x^1 + 1$. This field is stored least significant byte first (little endian format). |

Messages 302

Messages 302 are the information bearing portion of a Packet 300. As shown in FIG. 8, they consist of one or more Commands 304. Messages contain an integral number of Commands and Commands are not split between Messages. The 'size' field in the packet header is used to determine when all Commands have been processed. The optimal size of the Message field is 250 bytes or less. Commands that are larger than 250 bytes should be contained singly in a packet. The bytes following the last byte in the last command is always the first byte of the CRC32 field.

Commands 304

Commands 304 are the elements of the StarSight Data Transmission Network required to build a TV schedule database, maintain the current time of day, and handle user authorization and security issues.

The different Commands are distinguished by a unique value known as the 'Cmd type'. It is contained in the least significant 6 bits of the Command's first byte. A total of 64 unique command types are possible. The second field is 'Cmd length', used to determine the byte size of the Command. The size includes the 'Cmd type' and 'Cmd length' fields. The 'Cmd length' field may be a one or two byte quantity. Table II lists all commands and specifies the size of the 'Cmd length' fields. Also included in this table is the encryption offset for the command. This concept is discussed in the section that follows this table.

TABLE VII

| COMMAND NAME | COMMAND CODE | SIZE FIELD SIZE | ENCRYPTION OFFSET |
|---|---|---|---|
| Time Command | 1 | 1 | 2 |
| Daylight Saving Time Change Command | 2 | 1 | 2 |
| Region Command | 3 | 2 | 10 (0AH) |
| Channel Data Command | 4 | 1 | 5 |
| Show list Command | 5 | 2 | 11 (0BH) |
| Show Title Command | 6 | 1 | 5 |
| Reserved | 7 | 1 | 2 |
| Show Description Command | 8 | 1 | 5 |
| Reserved | 9 | 1 | 2 |
| Reserved | 10 (0AH) | 1 | 2 |
| Theme Category Command | 11 (0BH) | 2 | 5 |
| Theme Sub-Category Command | 12 (0CH) | 2 | 5 |
| Subscriber Unit Reset Command | 13 (0DH) | 1 | 8 |
| Authorization Command | 14 (0EH) | 1 | 2 |
| Reserved | 15 (0FH) | 1 | 2 |
| Reserved | 16 (10H) | 1 | 2 |
| Key Distribution Command | 17 (11H) | 1 | 2 |
| Reserved | 18 (12H) | 1 | 2 |
| Reserved | 19 (13H) | 1 | 2 |
| Sequence Number Command | 20 (14H) | 1 | 2 |
| Station Node Status Command | 21 (15H) | 2 | 3 |
| Long Assign IR Codes Command | 22 (16H) | 2 | 18 (22H) |
| Reserved | 23 (17H) | 2 | 3 |
| Subscriber Unit Command | 24 (18H) | 2 | 9 |
| Reserved | 25 (19H) | 1 | 2 |
| Reserved | 26 (1AH) | 1 | 2 |
| Reserved | 27 (1BH) | 1 | 2 |
| Reserved | 28 (1CH) | 1 | 2 |
| Reserved | 29 (1DH) | 2 | 3 |
| All Future Command Definitions | 30–63 (1EH–3FH) | 2 | 3 |

Subscriber units that do not recognize a command type (as will happen in the future when new commands are implemented) must compute the Command length and skip over/ignore the command.

The most significant bit of the Command's first byte is a flag that signals whether the command is encrypted or not. When set, the command is encrypted, when clear, not encrypted. It is probable that the only commands which are passed to the Subscriber Unit in an encrypted format are Show list, Authorization, and Key Distribution Commands. The Subscriber Unit should however be prepared to decrypt any command.

The starting offset of the encrypted portion of the command is also listed in the previous table. Most commands leave a portion of their contents in the clear so that network entities which process the packet stream may filter out unneeded commands without decrypting the guts of the command. (Note that the encryption offset for future commands may be changed when the commands are actually implemented.)

The second most significant bit of the command's first byte indicates which of two program keys are to be used when decrypting the command. When the bit is clear, decryption program key 0 is used, when set, key 1 is to be used.

Since it is necessary to add an initialization vector and pad characters, the process of encrypting a command increases the amount of memory necessary for storing the command. The initialization vector is an 8 byte field that is always prepended to the start of the encrypted byte stream. The padding is appended to the byte stream before it is encrypted. The purpose of the padding is to help the Security Module determine if the encrypted data has been "tampered" with. Enough pad characters are added to make the length of the raw data stream a multiple of eight. If the length begins as a multiple of eight, 8 pad characters are added. The value of the pad characters are the number of fill bytes that have been added; i.e., if 3 extra bytes are added to the command then each fill byte will have the value 3. The encrypted data within the Command is stored as shown in FIG. 9.

Future revisions of this command set may append field definitions onto existing commands. Command processors should be prepared to ignore all data that follows the last recognized field.

Some commands are addressed to particular units or groups of units. Units are addressed using a logical address that is comprised of two parts; the four byte batch number and the one byte unit number. The batch number is used as the group address, directing the command to a group of units that share the same batch number. A batch number of zero has a reserved meaning; it addresses all units. All other possible batch numbers are valid addresses. (i.e. a command transmitted with batch number=0 is intended as a system wide broadcast, while a command with batch address 23456 is directed towards units in batch group 23456 only. Units in other batch groups should ignore the latter command).

The unit number is used to identify a particular unit within the batch group. Up to 255 units may be contained within a batch group. The unit number of zero has the reserved meaning of addressing all unit's within a batch group. (i.e. a logical address with batch number=23456, unit number=0 is directed to all units within the batch group 23456).

Commands required to build the subscriber unit database are typically sent repetitively, in the order shown in Table VIII:

TABLE VIII

| | |
|---|---|
| Theme Categories | Always acquired (if not already acquired). |
| Theme Subcategories | Always acquired (if not already acquired). |
| Regions | Region's list of channels is acquired if the unit has been authorized. |
| Channel Data | Channel data is acquired if the channel is in the region's list of channels. |
| Show lists | Show list is acquired if it is applicable to an active channel in the region's list of channels. Show lists give the schedule data for a single channel for a single day. The current day's data is sent more often than succeeding day's data. |
| Show Titles | Show title is acquired if it is referenced in some acquired Show list and the subscriber unit does not already have it. |
| Show Descriptions | Show description is acquired if it is referenced in some acquired Show list and the subscriber unit does not already have it. |
| Key Distributions | Key distribution commands are always processed, if the batch address of the command matches the unit's assigned batch address. |

Other messages are interspersed in this cyclic stream on a random basis as required. Note that transmission errors can cause missing messages and commands can therefore be received out of order. Note especially that there can be gaps in the Show lists. Subscriber units must be able to handle missing and out of order messages.

The following sections describe each command. Commands are shown in their non-encrypted form, but the reader must be aware that the above mentioned modifications due to encryption may be made to any command.

Time Command

Time Commands (FIG. 10) specify the current time of day and date. They are sent periodically, at a predetermined rate. Subscriber Units 52 (FIGS. 1–4) should reset their current time of day and date to agree with the value received in this message. The fields of time commands shown in FIG. 10 are as described in Table IX:

TABLE IX

| Field | Description |
|---|---|
| Cmd type | Command type = 1. Identifies command as a Time Command. |
| enc flg | Flag indicating if the current command has been encrypted. Command type and command length fields are never encrypted. 0 = not encrypted, 1 = encrypted. |
| key ID | Decription key ID. Identifies which of two current "program" decryption keys should be used to decrypt this command. |
| Cmd length | Number of bytes in the command (including the type and length fields). |
| Time | Current time of day and date encoded as number of minutes from midnight, January 1, 1992. Time of day and date is Greenwich Mean Time. |
| DS flg | Daylight Saving flag. Flag indicating if Daylight Saving is in effect. Sent whether or not default time zone uses Daylight Saving time. 0 = Daylight Saving not in effect, 1 = Daylight Saving in effect. |
| sign flg | Sign bit for the default time zone offset field, which follows. If set, it indicates the time zone offset is negative, and should be subtracted from Greenwich mean time. (For data provider stations West of the Greenwich Meridian, i.e. the entire U.S. and Canada). Note that this implies the time zone offset field is not a twos complement binary number. |
| default time offset | Four bit field indicating the number of hours offset from Greenwich Mean Time to the time zone of the data provider station transmitting the StarSight data. Intended to be used when displaying local time before the Subscriber Unit has been authorized (which sets the real time zone). The legal range for this field is from 0 to 12 binary. |
| time (secs) | Is the low order seconds part of the time field, stored previously in the command. The resolution of this field is seconds past the minute. The legal range is 0 to 59 inclusive. |

Daylight Saving Time Change Command

The Daylight Saving Time Change Command defines when the next Daylight Saving time changes will occur so that displays of schedule data for time periods that contain these changes can show the correct adjusted local time. Subscriber units must add their Time Zone offset (obtained from the Authorization Command) to calculate the GMT time for the change corresponding to their local change time. Show list entries after this calculated GMT time should be shown with a time offset affected by the upcoming Daylight Savings state. The fields in the Daylight Saving Time Change Command as shown in FIG. 11 are defined in Table X.

TABLE X

| Field | Description |
|---|---|
| Cmd type | Command type = 2. Identifies command as a Daylight Saving Time Change Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| Enable Daylight Saving | Time of day and date when the Daylight Saving time would be enabled at the Greenwich Meridian. Encoded as number of minutes from midnight, January 1, 1992. Time of day and date is Greenwich Mean Time. The enable time is always less than the disable time. |

TABLE X-continued

| Field | Description |
| --- | --- |
| Disable Daylight Saving | Time of day and date when the Daylight Saving time would be disabled at the Greenwich Meridian. Encoded as number of minutes from midnight, January 1, 1992. Time of day and date is Greenwich Mean Time. The disable time is always greater than the enable time. |

Region Command

The Region Command identifies all channels for which StarSight Data is available and could possibly be received by a Subscriber Unit in the given region. One Region Command is sent for each region in the area serviced by a data provider station. For example, the channel lineup for each cable system constitutes a region. The Authorization Command sends the region ID. Once the region ID is known, the Channel Data for each channel in the region can be acquired from the Channel Data Commands.

The channel IDs in this command are not needed by the subscriber unit after it has acquired the Channel Data for each channel in the user's region. However, the region ID and version must be held in case the Channel Data is lost (e.g., power outage) or has changed and must be re-acquired.

Channel ID entries are listed in the default order that Subscriber Units should display them in until the user has changed the sequencing using a setup screen. Channel ordering is more or less numerical, and Channels such as HBO and DISNEY are all given a native channel number equal to 1 and probably ordered alphabetically by the 'name-affiliation' field.

Only Base channels are sent in a Region Command (see Duplicate Channels Command). The fields in the Region Command as shown in FIG. 12 are defined in Table XI

TABLE XI

| Field | Description |
| --- | --- |
| Cmd type | Command type = 3. Identifies command as a Region Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| Region ID | Unique region ID number that must match one of the region IDs received in the Authorization Command. Identifies the region for which the following list of channel IDs is appropriate. This field is never to have a zero value. |
| region type | Indicates if region is a broadcast, cable, or satellite system. (0 = broadcast, 1 = standard cable, 2 = IRC cable, 3 = HRC cable, and 5 = satellite. All other values are undefined.). |
| prime offset | Offset, in units of ½ hours from 6:00 PM, to prime time for the region. E.g.; prime offset = 1 means prime time starts at 6:30 PM, = 2 means prime time starts at 7:00 PM, etc. |
| date type flag | Is a flag indicating how the date field in this command should be interpreted. If this flag is set, the date represents when the information in this command expires. If the flag is date represents the time the information in this command clear, the becomes valid. |
| date | Specifies the time when the information in this command either expires or becomes active. See the explanation of the date type flag. The date is encoded as number of minutes from midnight January 1, 1992, Greenwich mean time. |
| nbr Chan IDs | Number of channel IDs in the region. This number must be greater than 0. |
| Channel ID | Channel ID number used to identify the Channel Data Commands required to assemble channel data for all channels in the subscriber's system. This field is never passed with a zero value. |
| tune channel nbr | Channel number used to tune a TV/VCR to this channel. Maximum tunable channel is channel 511. Note: tune channel number is sent in this command to avoid having to send a Channel ID entry for each cable system that places the channel on a different tuning channel number. E.g.; HBO might be on channel 10 on one cable system and on channel 25 on another. Putting the tuning channel number here means only one HBO entry needs to be sent in the Channel Data Commands. |
| source | This field has no meaning if region type is broadcast. If region type is satellite, this field indicates the band, (00 = C Band, 01 = KU Band, and 02 & 03 are undefined). If region type is any of the cable types, this field indicates what source this channel is on (00 - no source specified, 01 = source A, 02 = source B, 03 = source C). |
| channel type | 3 bit field which indicates the type of channel (00 = no special attributes, 01 = extended basic, 02 = premium, 03 = pay per view, 04 = video on demand, all other values are reserved.). |
| satellite alpha ID | 5 bit field representing the alphabetic portion of the alphanumeric satellite identifier (i.e. the 'S' of satellite S4). This field is present (in all Channel ID entries) only if the 'region type' field == Satellite Field value 1 represents the letter 'A', 2 is 'B', etc . . . The legal range for this field is 1–26 inclusive, representing the alphahetic characters 'A' through 'Z'. |
| satellite numeric ID | 5 bit field representing the numeric portion of the alphanumeric satellite identifier (i.e. the '4' of satellite S4). This field is present (in all Channel ID entries) only if the 'region type' field == Satellite. The field is broken up over two consecutive bytes. The legal range for this field is 1–31 inclusive. |
| transponder no | 6 bit field representing the transponder number to be used to tune to this channel on a Satellite system. This field is present (in all Channel ID entries) only if the 'region type' field == Satellite. This field is never passed with a zero value. It's legal range is 1–63 inclusive. |

Channel Data Command

The Channel Data Command gives channel information used for various displays. Channel Data Commands are sent for each channel in all the regions serviced by a data provider station (PBS station node). The subscriber unit compiles information on all the channels in its region using the Channel Data Commands that contain a Channel ID entry matching one in its region list.

Only Base channels are sent in Channel Data Commands (see Duplicate Channels Command). The fields of the Channel Data Command as shown in FIG. 13 are defined in Table XII.

TABLE XII

| Field | Description |
| --- | --- |
| Cmd type | Command type = 4. Identifies command as a Channel Data Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| nbr entries | Number of Channel ID entries in the current command (not the total number in the system). This field must always have the value of 1 (i.e. only ONE channel entry can be included in each command.) |
| nat chan msb | Most significant bit for the 'native channel nbr' field. |

TABLE XII-continued

| Field | Description |
|---|---|
| Channel ID | Channel ID number used to identify the Channel ID entries that match those in the subscriber's region. |
| name flg | Flag indicating if the channel's name should be displayed as a number or as a three character text string. (0 = number, 1 = text). This flag must be set if the native channel number is specified as zero. |
| native channel nbr | The channel number associated with the channel if it were in a broadcast region. This is the number used to identify the channel when the 'name flg' is 0. Normally this number matches the tune channel number; however, on cable systems channels get moved around. E.g. channel 5 could be on cable channel 29. In this situation, the tune channel number will be 29 while the native channel number will be 5. If the native channel number is zero, the name_flg field in this command must be set. |
| name abbreviation bits | A bit field indicating which characters from the name affiliation string should be used as the stations "call letters". The MSBit (bit 7) of this field represents the first byte in the name affiliation string (byte 8), while the LSBit (bit 0) represents the last byte from the string (byte 15). (i.e., a value of 11110000B for this field, with a name affiliation string of KTVU-FOX would indicate the stations call letters are KTVU). If the name flg field is set, a total of one to four bits must be set in this field. |
| name-affiliation | Up to 8 character ASCII text string used to identify the channel for display purposes. Padded with Null characters if less than 8 characters long. This string may not be NULL terminated if it is eight characters long. |

Show list Command

Show list Commands provide schedule data for one day for a given channel. Show list commands do not contain schedule gaps (even for periods when the channel is off the air). Show list commands are sent for every channel in all regions of the system. Show list commands contain multiple Show Slot entries, with each entry corresponding to a single show in the channel's schedule.

Show list Commands represent at least 24 hours of schedule data. The first entry for a show list begins at midnight, Greenwich Mean Time. Programs which straddle the boundary between consecutive Show lists are represented only once, in the Show list in which their start time resides. The next Show list represents the portion of time in which a program from a previous Show list overruns into it with a dummy show entry. These filler entries are recognized using the 'dum flg', which when set indicates the entry for the show at this time slot can be found at the tail end of the previous day's show list. Only the first entry in a show list can have the 'dum flg' set. Dummy show entries operate identically to valid show entries, except that their title and description text may be substituted with something that labels it as a filler entry. If a program's start time coincides exactly with the Show list boundary time, it will be represented only once, in the next Show list.

Show list Commands, when they are encrypted, are encrypted starting with byte 11 in the above diagram (i.e.; starting with the 'nbr show slot entries' field). This allows the Show list Commands to be discarded if they are not applicable to the subscriber unit's region or have already been received. Ignoring unneeded Show lists may help a Subscriber Unit's data processing throughput, since decryption is time consuming. The fields of the Show list Command as shown in FIG. 14 are defined in Table XIII.

TABLE XII

| Field | Description |
|---|---|
| Cmd type | Command type = 5. Identifies command as a Show list Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| version | Show list version number. Used to identify when changes have been made to the Show list for the given day. 'version' starts at 0 when first sent over the network and increments for every change to the Show list for that day within the time period (i.e. one week) that the given day is active. If the version field differs from the value currently held by the subscriber unit then the new schedule replaces the current one. |
| Channel ID | Channel ID number identifying the channel whose schedule is being sent. Matches the channel ID number in one of the Channel Data Command entries. This field will never have a zero value. |
| start time | Start time and start date for the first show in this Show list command. Encoded as number of minutes from midnight January 1, 1992, Greenwich Mean Time. Start times for subsequent shows are calculated by adding successive duration's from each Show Slot entry. Thus, a show that starts in one day and finishes in the next (e.g., Johnny Carson) would be the last show in the list |
| nbr show slot entries | Number of shows on this channel for the entire day, counting the dummy entry if one exists. |
| DID flg | Flag indicating if a DID field is present in the current Show Slot entry; 0 = not present, 1 = present. |
| grp flg | Show group flag indicating if this show is a member of a show group. 0 = no, 1 = yes. |
| pay/view flg | Indicates show is a pay per view event. 1 = yes, 0 = not a pay/view. |
| fgrp flg | Show group flag indicating if this show is a member of a show group. 0 = no, 1 = yes. |
| dum flg | Dummy entry flag. Indicates that the program at this time slot can be found at the end of the previous day's Show list. Only the first entry in a show list may have the 'dum flg' set |
| duration | Show duration in units of 1 minute. The minimum total show duration is 5 minutes, the maximum is 4 hours, or 240 minutes. |
| SID | Show ID number. Unique 20 bit number used to identify the Show Title command containing the show's title. This field may have a zero value, which indicates no show information is present |
| DID | Description ID number. Unique 16 bit number used to identify the Show Description Command, which contains the show's episode description. If a description for this show does not exist, the DID flg will be left clear and this field will be omitted. This field may not have a zero value. |
| show group ID | Show group ID number. Identifies program as being a member of the set of programs that all have this same group ID number. Field is only present if the 'grp flg' field = 1. This field may not have a zero value. Note: A SERIES recording for a program that has a show group ID number will cause an members of the group found on the same channel to be recorded. Record queue entries for show groups are deleted 2 weeks after the last recording is made so that users do not have to turn off group recordings. |

Show Title Command

Show Title Commands contain the name of a program (e.g. COSBY SHOW) and some program attributes used in Theme searches. Show titles are usually compressed using a Huffman encoding scheme.

The uncompressed show title must be between 1 and 86 bytes in length, inclusive. Since the display capabilities of Subscriber Units is limited, titles which are greater then 38 bytes in length may be truncated.

Show Title Commands must be saved in the database if the show is in the Show list for at least one channel in the subscriber's region. All other Show Title Commands should be ignored. Show Titles that are needed are recognized by matching the SID number in the Show list with the SID number in the Show Title Command. The fields of the Show Title Command as shown in FIG. 15 are defined in Table XIV.

TABLE XIV

| Field | Description |
| --- | --- |
| Cmd type | Command type = 6. Identifies command as a Show Title Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| cmp flg | Flag indicating tifle is compressed. A few titles are longer when compressed using the Huffman encoding scheme (e.g. lots of 'x's or 'q's). 1 = title has been compressed, 0 = title is uncompressed ASCII. |
| CC | flag indicating show contains closed captioning information (VBI line 21). 0 = not close captioned, 1 = closed captioned. |
| stereo | Flag indicating show is broadcast in stereo. 0 = not stereo, 1 = stereo. |
| BW/C | Flag indicating if show is broadcast in black & white or color. 0 = color, 1 = black & white. |
| SID | 20 bit unique number identifying this show. This Show Title Command is of interest to the subscriber unit only if this number is also found in the Show list for some channel in the unit's region. This field is never passed with a zero value. |
| Theme ID | Number that identifies the Theme type and genre information appropriate for this program. Used for Theme searches. Subcategories have sets of Theme ID numbers identifying the types of shows to be selected when a Theme search is performed for that sub category. Shows whose 'Theme ID' field matches one of the values in the set are selected. A zero value indicates no theme information is present |
| show title | Huffman encoded or straight ASCII text string giving the show's title. Huffman encoding scheme is described in Appendix A. The string is always NULL terminated. The NULL character is appended before it is Huffman encoded. |

Show Description Command

Show Description Commands contain the description of an episode of a program and some program attributes used in Theme searches. Show descriptions are usually compressed using the same Huffman encoding scheme used for show titles.

The uncompressed show description must be between 1 and 162 bytes in length, inclusive. Since the display capabilities of Subscriber Units is limited, descriptions which are greater then 120 bytes in length may be truncated. Show Description Commands are sent for all shows that have descriptions in all regions serviced by the data provider. Show Description Commands must be saved in the database if the DID is referenced in the Show list for at least one channel in the subscriber's region. All other Show Description Commands should be ignored. Show Descriptions that are needed are recognized by matching the DID number in the Show list with the DID number in the Show Description Command. The fields of the Show Description Command as shown in FIG. 16 are defined in Table XV.

TABLE XV

| Field | Description |
| --- | --- |
| Cmd type | Command type = 8. Identifies command as a Show Description Command. |
| enc flg | Flag indicating if the current command has heen encrypted. Command type and command length fields are never encrypted. 0 = not encrypted, 1 = encrypted. |
| key ID | Decryption key D. Identifies which of two current "program" decryption keys should he used to decrypt this command. |
| Cmd length | Number of bytes in the command (including the type and length fields). |
| DID | Description ID number. Unique 16 bit number identifying this episode description. This Show Description Command is of interest to the subscriber unit only if this number is also found in the Show list for some active channel in the unit's region. This field is always non-zero. |
| cmp flg | Flag indicating description is compressed. A few descriptions are longer when compressed using the Huffman encoding scheme (e.g. lots of 'x's or 'q's). 1 = title has been compressed, 0 = title is uncompressed ASCII. |
| CC | Flag indicating show contains closed captioning information (VBI line 21). 0 = not close captioned, 1 = closed captioned. |
| stereo | Flag indicating show is broadcast in stereo. 0 = not stereo, 1 = stereo. |
| BW/C | Flag indicating if show is broadcast in black & white or color. 0 = color, 1 = black & white. |
| rating flg | Flag indicating if the command has the ratings fields in bytes 7, 8, and 9. Otherwise these bytes are absent and the Theme ID field begins in byte 5. 0 = ratings bytes not present, 1 = ratings bytes present. |
| critic's rating | Three bit field representing the critic's rating of the movie. It is a number which is interpreted as follows: 0 = no rating, 1 = poor, . . . 4 = excellent. Values 5–7 are reserved. |
| MPAA rating | Four bit field indicating the movie audience suitability rating. 0 = no rating, 1 = G, 2 = NR, 3 = PG, 4 = PG13, 5 = R, 6 = X, 7 = NC17. Values 8–15 are reserved. |
| traits bit mask | Eight bit mask indicating programs attributes such as violence or nudity.<br><br>Bit — Attribute<br>0 — profanity<br>1 — nudity<br>2 — violence<br>3 — adult situation<br>4 — adult themes<br>5 — not used<br>6 — not used<br>7 — adult language |
| year produced | The year which the episode was produced minus $1900_{10}$. For example, a movie produced in 1943 would have the binary value 4310. This byte is present only if the 'rating flg' is set. The value 00 indicates that the production year year has not been specified. |
| show description | Huffman encoded or straight ASCH text string giving the show's episode description. Huffman encoding scheme is described in Appendix A. The string is always NULL terminated. The NULL character is appended before it is Huffman encoded. |

Theme Category Command

The Theme Category Command specifies the major categories displayed in the subscriber unit's theme function. These categories form the first level of indexing in the hierarchical theme search function. For each major theme category a unique 8 bit ID number and a text string is specified. The text string names the category entry. The entries are listed serially within the command in the suggested presentation order.

The command includes a version number which is incremented each time the theme category command is changed. Subscriber Units should replace existing versions of the command stored in memory when a command with a differing version number has been transmitted. The fields of the Theme Category Command as shown in FIG. 17 are defined in Table XVI.

TABLE XVI

| Field | Description |
|---|---|
| Cmd type | Command type = 11 (0BH). Identifies command as a Theme Category Command. |
| enc flg | Flag indicating if the current command has heen encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| version | Theme Category set version number. Version number changes if any category is added, deleted, or the text changes. A completely new set of categories should be acquired when the version number changes. |
| nbr categories | Total number of primary Theme categories; i.e., number of Theme category entries that follow. |
| Theme Category ID | Unique 8 bit number used to identify corresponding sub category entries. This field is never passed with a zero value. |
| attributes flag word | An 8 bit flag word used to specify the properties of the theme sub-category. The meaning of each field in the flag word is as follows: Bit 0: DISPLAY NAME WITH DESCRIPTION - when set, the theme category name may be displayed with the description of a show with this theme id. (Some category names like ALL or OTHER may appear awkward when displayed with a description. These types of entries will have this bit cleared. Other entries, such as MOVIE or DOCUMENTARY are desirable additions to descriptions, and hence may have this bit set) Bits 1–7: RESERVED. |
| Category name length | Number of bytes in the 'Category name' field. Used to locate the start of the next entry and determine the length of the text string that follows. This field will never have a zero value (first generation Subscriber Units will crash if this is passed as zero). |
| Category name | Text string naming the category. This should be used to display the name of the category. The text is an uncompressed, null terminated ASCII string. |

Theme Sub-category Command

The Theme Sub-category Command specifies the subcategories displayed in the subscriber unit's theme function. These are displayed after the user has selected a major theme category. Each major theme category has one or more sub categories, which form the second level of the hierarchical search scheme. The description of each sub category includes the 8 bit ID of the parent category, a unique 16 bit theme ID number and a text string which names the entry. The entries are listed serially within the command in the suggested presentation order.

The command includes a version number which is incremented each time the theme sub-category command is changed. Subscriber Units should replace existing versions of the command stored in memory when a command with a differing version number has been transmitted. All subscriber units should store these sub category names if they do not already have an entry with the same Theme Category ID, Sub category ID, and version number. The fields of the Theme Sub-category Command as shown in FIG. 18 are defined in Table XVII.

TABLE XVII

| Field | Description |
|---|---|
| Cmd type | Command type = 12 (0CH). Identifies command as a Theme Subcategory Command. |

TABLE XVII-continued

| Field | Description |
|---|---|
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| Theme Category ID | Unique 8 bit number used to identify the primary category corresponding to this sub category entry. This field will never have a zero value. |
| nbr Sub-categories | 7 bit unsigned number indicating the total number of Theme Subcategories; i.e., number of Theme sub category entries that follow. This field will never have a zero value (First generation Subscriber Units will crash if this is passed as zero). |
| entry length | Total number of bytes in current sub category entry including this byte. Used for determining the start offset for the next entry and the number of bytes in the 'sub category name' field. This field will never have a zero value. |
| attributes flag word | An 8 bit flag word used to specify the properties of the theme sub category. The meaning of each field in the flag word is as follows: Bit 0: DISPLAY NAME WITH DESCRIPTION - when set, the theme subcategory name may be displayed with the description of a show with this theme id. (Some sub-category names like ALL or OTHER may appear awkward when displayed with a description. These types of entries will have this bit cleared. other entries, such as COMEDY or DRAMA are desirable additions to descriptions, and hence may have this bit set) Bits 1–7: RESERVED. |
| nbr Theme IDs | Number of Theme ID entries that follow this field. In the above diagram, the value of this field would be 'k'. This field will never have a zero value (First generation Subscriber Units will crash if this is passed as zero). |
| Theme ID 1-k | Set of 16 bit Theme ID numbers used to identify shows that should be selected when a Theme search is done for this sub category. That is, any program whose Show Title or Shoe Description entry contains any one of these Theme ID numbers would be included in the list of shows selected by this Sub category. These theme ID's are sorted in ascending order. These fields will never have zero values. |
| Sub category name | Text string naming the category. This should be used to display the name of the category. The text is an uncompressed, null terminated ASCII string. |

Subscriber Unit Reset Command

The Subscriber Unit Reset Command allows the StarSight Control Center to reset selected subscriber units. Different types of reset can be sent. The fields of the Subscriber Unit Reset Command as shown in FIG. 19 are defined in Table XVIII.

TABLE XVIII

| Field | Description |
|---|---|
| Cmd type | Command type = 13 (0DH). Identifies command as a Subscriber Unit Reset Command. |
| enc flg | Flag indicating if the current command has been encrypted. Command type and command length fields are never encrypted 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| reset type | Reset Control Bit Field: Bit 0: When set instructs the unit to clear the semi-volatile memory where the acquired network data is stored. When |

TABLE XVIII-continued

| Field | Description |
|---|---|
| | the unit restarts, it will begin re-acquiring network data (also known as a cold boot). Bits 1–7: Reserved. |
| serial nbr | 5 byte serial number which identifies the subscriber unit this command is addressed to. A serial number which is all zeroes indicates a "group broadcast", so all subscriber units should be prepared to respond to such a command. |

Authorization Command

The Authorization Command authorizes the subscriber unit to begin collecting and displaying schedule data. It is sent when a subscriber signs up for the StarSight service.

Until the Authorization Command is received, a subscriber unit does not know what region it is in, and hence, does not know which channels to collect data for. Similarly, it does not have the decryption key necessary to decrypt various commands until the Authorization Command is received.

Authorization Commands are addressed to individual subscriber units using the serial number given to a Customer Service rep during the authorization process. The first generation subscriber units are limited to supporting a single region and one or two separate VBI lines on the same tuning frequency. The fields of the Authorization Command as shown in FIGS. 20–22 are defined in Table XIX.

TABLE XIX

| Field | Description |
|---|---|
| Cmd type | Command type = 14 (0EH). Identifies command as an Authorization Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| SU serial nbr | Subscriber unit serial number assigned by the manufacturer. Used to address the subscriber unit during authorization or re-authorization. Subsequent commands are addressed to a subscriber unit using the batch and unit numbers. This number is given to the customer service representative during the authorization process and determines the RSA public key used to encode the encrypted portion of this command. |
| Authorization data | 72 byte block of authorization data, encrypted with the unit's factory assigned public key. The cryptogram must be decoded using the subscriber unit's private RSA key assigned to the StarSight Security processor at time of manufacture. The data is stored as follows before encryption: |
| batch nbr | 32 bit number identifying the encryption group to which the subscriber unit belongs to. When combined with the one byte unit number that follows this element, a unique address for the subscriber unit is formed. These numbers are assigned by this command and used to address this unit or its' batch group in all subsequent commands. |
| unit number | 1 byte unit ID. Each unit within a batch group is assigned a unique unit ID. |
| Service level mask | 2 byte bit mask indicating which StarSight services the user has subscribed to. The meaning of the individual bits is TBD. All bits are to be remain zero until defined. |
| program key 0 | The first 8 byte decryption key. Subsequent Key Distribution Commands are addressed to this unit's batch assigned group to assign new program keys. |
| program key 1 | The other 8 byte decryption key. |

TABLE XIX-continued

| Field | Description |
|---|---|
| len of data following | Is the number of data bytes remaining in the authorization block, not including the empty reserved data block and this field. In the current definition of this command, this field is equal to the constant 20 (14H). |
| batch key | 8 byte key assigned to this unit's batch group. This key is used to decyypt the program keys transmitted in the Key Distribution Command. Batch keys are only changed if the key is broken for a given batch. New batch keys are assigned to a batch by sending new Authorization Commands to each member of the group. |
| DP source | This field has the same meaning as the source field in the region command. It is intended to indicate which input source the data provider signal is on. |
| sign flg | Sign bit for the time zone offset field, which follows. If set, it indicates the time zone offset is negative, and should be subtracted from Greenwich mean time. (For data provider stations West of the Greenwich Meridian, i.e. the entire US and Canada). Note that this implies the time zone offset field is not a two's complement binary number. |
| time zone offet | Four bit field indicating the number of hours offset from Greenwich Mean Time to the time zone the subscriber unit is located within. Intended to be used when displaying local time before the Subscriber Unit has been authorized (which sets the real time zone). The legal range for this field is from 0 to 12 decimal. (This field should be interpreted identically to the default flme zone offset field contained in the Time command.) |
| VCR code group | Code number identifying the group of VCR control codes to be used when commanding the user's VCR to do a recording, to rewind, etc. This field is defaulted with value 8000H, which means that no code group has been specified. |
| Cable box code group | Code number identifying cable box control codes to be used when commanding the user's cable box to change channels. This field is defaulted with vaiue 8000H, which means that no code group has been specified. |
| Satellite code group | Code number identifying satellite control codes to be used when commanding the user's satellite inteĎace to change channels. This field is defaulted with vaiue 8000H, which means that no code group has been specified. |
| TV code group | Code number identifying codes used to contml the television remotely. This field is defaulted with a zero value. The. specific meanings of the code groups are TBD. |
| Primary Region ID | Unique number identifying the region in which the subscriber unit is located. This field specifies the set of channels for which data is collected. It corresponds with the region ID in the Region Command. First generation subscriber units can collect data for oniy one region. |
| DSA flg | Daylight Saving applicable flag. Flag indicating if Daylight Saving time is used in the subscriber's time zone. 0 = no, 1 = yes. |
| Tune Channel MSB | Most significant bit of the tune channel number field, which follows. |
| Data provider channel ID | Channel ID number for the station to be used for receiving all subsequent StarSight commands. Normally this will be the station used during the authorization process, but load balancing requirements may force a change. |
| Tune Channel No | Is the tuning channel number of the data provider. This information is transmitted in the authorization command so that the subscriber unit does not have to wait for a Channel Data Command to interpret the Data Provider channel ID field. The legal range for this field is 0 to 511, inclusive. |
| satellite alpha ID | 5 bit field representing the alphabetic portion of the alphanumeric satellite identifier (i.e. the 'S' of satellite S4). Field value 1 represents the letter 'A', 2 is 'B', etc . . . This fields is specified as zero if the dataprovider is a non-satellite source. If this field is non-zero, ifs legal range is 1–26 inclusive, representing the alphabetic characters 'A' through 'Z'. |
| satellite numeric ID | 5 bit field representing the numeric portion of the alphanumeric satellite identifier (i.e. the '4' of satellite S4). The field is broken up over two consecutive bytes. The legal range for this field is 1–31 inclusive. |

TABLE XIX-continued

| Field | Description |
|---|---|
| transponder no | 6 bit field representing the transponder number to be used to tune to this channel on a Satellite system. This fields legal range is 0–63 inclusive. |
| VBI line nbr | VBI line number to be used for acquiring StarSight data. |
| VBI Stream ID | Stream ID of primary data provider. The stream ID is transmitted with each time command. Subscriber Units may use this to identify the VBI stream they are listening to. This may be useful for Subscriber Units while searching for the home data stream after a cable company has made an unannounced change to its channel mapping. |
| RESERVED | 10 byte field, reserved for future definitions. All first generation subscriber units will not interpret the contents of this data block. |

Long Assign IR Codes Command

The Long Assign InfraRed Codes Command specifies the control codes to be used by the Subscriber Unit Universal Remote Control chip to control a specific peripheral device. The codes which describe the IR blaster language may optionally be sent for those devices that are not in the URC chip's internal database. Transmission normally occurs while a Customer Service Rep is in contact with a user who has called StarSight because they did not find the code group for their VCR/Cable Box/TV in the Subscriber Unit manual.

IR Codes may be sent either addressed to a specific unit via its Serial Number, or to groups of units with a given Product Code, Device Type (e.g. VCR), and Device ID. These commands may either be sent once per user request or repetitively when addressed to groups of SUs. The fields of the Long Assign IR Codes Command as shown in FIG. 23 are defined in Table XX.

TABLE XX

| Field | Description |
|---|---|
| Cmd Type | Command type 22 (16H). Identifies command as a Long Assign IR Codes Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| Serial Number | Subscriber unit serial number to which the command is addressed. A Serial Number of 0 means the command is addressed to all Subscriber Units having a Product Code, Device Type, and Device ID corresponding to the one in this command. |
| Interconnect Configuration | A number corresponding to the way the components controlled by the SU (i.e. TV, VCR, cable box) are connected. Values and configurations are TBD. |
| Vendor Specific | Byte value whose use depends on the product to which this command is addressed. For example, when addressed to a Zenith TV this value is the tuning method to be used with the downloaded IR codes. |
| Product Code | Number identifying the type/model of Subscriber Unit to which this command is addressed. Correlates with the type of URC chip in the SU. This command is ignored by a Subscriber Unit if this number does not match its Product Code when the Serial Number field = 0. |
| Device Type | Identifies the type of device (VCR, Cable Box, TV, IRD, . . .) that can recognize these IR codes.<br>0  Cable Box<br>1  TV<br>2  VCR<br>0C  IRD |
| Device ID | Code group number for the device that recognizes these IR codes. The Subscriber Unit (only if it has a matching |

TABLE XX-continued

| Field | Description |
|---|---|
| | address) replaces whatever code group number it currently has for the given Device Type with this number. Thus the headend can directly set the code group for a specific user. This is not done if the Serial Number field in this command is 0. In this case, the command is only processed if the user has already entered a code number that matches the Device ID for the same Device Type. |
| Version | Version number for the IR codes in this command. The SU saves the version number for each device type and only processes those Assign IR Codes commands addressed to groups of units if its version number for the specified device differs from the version number in the command. |
| IR Codes Length | Number of bytes in the IR Codes field. |
| IR Codes | Information (normally IR codes) to be used by the URC chip to control devices of the specified type. Structure within this field is determined by the URC chip manufacturer. |

Key Distribution Command

Key Distribution Commands give the current and next program keys to be used for decrypting encrypted commands. Subscriber units must watch the data stream for a Key Distribution Command containing its batch number. When the command is found it should send the authorization bit mask, both keys, and the authentication data field to the StarSight Security processor. If the bit in the authorization bit mask corresponding to the subscriber unit's unit number is 0 then the subscriber unit has been de-authorized and must suspend data collection. The fields of the Key Distribution Command as shown in FIG. 24 are defined in Table XXI.

TABLE XXI

| Field | Description |
|---|---|
| Cmd type | Command type = 17 (011H). Identifies command as a Key Distribution Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| batch nbr | 32 bit number identifying the encryption group to which the subscriber unit belongs. This number was assigned during the authorization process. |
| authorization bit mask | 256 bit mask (32 bytes) with each bit corresponding to one unit in the batch. The bit applicable to a subscriber unit is the bit corresponding to the unit's unit number. Bit is set (= 1) if the unit is authorized and reset (= 0) if not |
| program key 0 | Cryptogram encoded using the batch key assigned to the subscriber unit's group. The Starsight Security processor uses this key to decrypt encrypted commands when the 'key ID' field = 0. |
| program key 1 | Cryptogram encoded using the batch key assigned to the subscriber unit's group The StarSight Security processor uses this key to decrypt encrypted commands when the 'key ID' field = 1. |
| authentication data | 4 byte value used by the StarSight Security processor to authenticate the authorization bit mask and program key fields in this command |

Subscriber Unit Command

This command is used to transmit data bytes to one or more subscriber units. The definition of the format and contents is private to subscriber units. The network does not attempt to interpret the data.

This command provides a hook for transmitting commands and initialization data to subscriber units during development, without having to define separate, formal, network messages for each function, many of which may be temporary in nature. The fields of the Subscriber Unit Command as shown in FIG. 25 are defined in Table XXII.

TABLE XXII

| Field | Description |
|---|---|
| Cmd type | Command type = 24 (018H). Identifies the command as Subscriber Unit Command. |
| enc flg | Flag indicating if the current command has been encrypted. Command type and command length fields are never encrypted. 0 = not encrypted, 1 = encrypted. |
| key ID | Decryption key ID. Identifies which of two current "program" decryption keys should be used to decrypt this command. |
| Cmd length | Number of bytes in the command (including the type and length fields). |
| cmnd sub-type 1 | byte field indicating what type of subscriber unit command this is. The following command types have been defined: 01: Enter Diagnostics Menu if this command is addressed to the unit All other type values are reserved. |
| SU Serial Nbr | Is the assigned 5 byte serial number of the Subscriber Unit. All zeroes in this field indicates a group broadcast to all subscriber units. |

The following describes the Subscriber Unit 52 Database Engine Internal Data Structures. The general nature of the Subscriber Unit data is hierarchical. The schedule data hierarchy of data structures in descending order follows:

| | |
|---|---|
| CHANNEL DATA TABLE | Contains Subscriber Units list of channels |
| SHOW LIST | Contains a list of Show Titles, descriptions, start times, and durations for a channel. |
| SHOW TITLE | Contains the Show Title attributes and title text. |
| SHOW DESCRIPTION | Contains show ratings, attributes, and description text. |

Theme Categories and Theme SubCategories are used to select shows for viewing. They share a common data value (Theme Indexes) that are used to extract shows that match a Theme Category/SubCategory pair. The Theme data hierarchy in descending order follows:

| | |
|---|---|
| THEME TABLE | Table of Theme Categories |
| THEME SUB TABLE | Table of Theme SubCategories |
| THEME SHOW TABLE | Table of Theme selected shows |

For a description of Network Commands received by the Subscriber Unit see the InSight Data Transmission Network Protocol description.

Database Memory Pool Overview

The Memory Manager allocates and frees Blocks of Memory as requested by the application portion of the Subscriber Unit. The application software references Memory Blocks via a HANDLE. The handle of a memory block is an index to a table entry containing a POOL INDEX. The POOL INDEX is a scaled address that translates into the address of a MEMORY BLOCK. The HANDLE approach allows MEMORY BLOCKS to be relocated as system objects age and die, without requiring specific updating of application data structures.

The Memory Manager periodically runs a garbage collection process to collect unused MEMORY BLOCKS and recombine them into larger blocks. Because applications reference MEMORY BLOCKS with HANDLEs through the HANDLE TABLE, MEMORY BLOCKS can be relocated with specific updating of application data structures. In addition the memory pool can be temporarily locked to prevent the relocation of blocks during critical periods.

Each MEMORY BLOCK contains as the very first element the size of, and the OBJECT TYPE of the Memory Block. This aids in the relocation and merging of MEMORY BLOCKS.

The OBJECT TYPES break up into two main groups. The small OBJECTs which always can be defined in less than 16 Blocks of Memory. Currently each block of memory is 16 BYTEs long,. Small OBJECTS have their OBJECT TYPE encoded in the first NIBBLE, and the length in blocks encoded in the second NIBBLE of the first BYTE of the MEMORY BLOCK. Large OBJECTS have their OBJECT TYPE encoded as the first BYTE of the MEMORY BLOCK, and number of allocation units as the second BYTE of the MEMORY BLOCK.

If the first BYTE of the MEMORY BLOCK bit wise ANDed with 0xC0 is 0, then this is a Large OBJECT, otherwise it is a small OBJECT.

Database Memory Pool Access Scheme

A schematic representation of the database memory pool access scheme is shown in FIG. 26. Further details are as follows:

Handle Table

The Handle Table is a fixed allocation table, as shown in FIG. 27, containing two types of entries; free entries and in-use entries. Free entries will always have their 2 MSBs set so as to not be confused with in-use entries.

In-use entries contain the Index into the Pool for database items that are referenced via Handles; e.g.; Show Title entries. A database item's Handle is an index into the Handle Table. A database item's Pool Index can change due to garbage collection in the Pool, but its Handle will not change as long as that item exists in the database. Items deleted from the database return their Handle to the top of the free list.

Handle Table entry 0 is always the head of the free list. The Table is initialized to all free entries with each entry containing the Index of the next entry.

The size of the Handle Table limits the number of database items that can be kept in the Pool. Systems with various numbers of channels will require different Handle Table sizes.

| Field | Description |
|---|---|
| Pool Index | Index into the Pool for the first Pool Block containing the item. |

Database Show Schedule Access Overview

The database show schedule access scheme is shown in FIG. 28. The Channel Data is maintained in the Internal Database Engine data structure called the Channel Data Table. The Channel Data Table selects the channels accessed by a Region. The Channel Data Table is built by the system command processor from the Region Command and Channel Data Commands. The channel related information is extracted from the Region Command and placed in the Channel Data Table.

The Region Id to use is extracted from the authorization command. The Region Id is the key information for show schedule generation. The Region Id selects the Region Command processed by the subscriber unit, which defines the Channels Id accessed, which defines the Channel Data Table, which defines the Show Lists, which selects the Show Titles and Show Descriptions, which reference the Themes Categories and Theme Sub Categories. Once the Channel Data Table is defined, the Channels are referenced directly through the Channel Data Table.

Each lower level table in the show schedule is accessed through a HANDLE. The HANDLE is translated by the Handle Table into a pointer in memory.

Channel Data Table

As shown in FIG. 29, the Channel Data Table contains information on each channel in the Region. This data is used for access to the schedule data (Show Lists) for a channel, tuning, display on the Channel Banner, for channel gliffs, and during Setup. Further details are provided in Table XXIII.

TABLE XXIII

| Field | Description |
| --- | --- |
| Type/Nbr Blks | Pool Entry Type and number of blocks required to hold this Pool item. The type value indicates that this is a 2 byte field since the length can become very large due to the number of channels in the Region. Channel Data Table Type = 1. |
| Nbr Channels | Number of Channel Entries in the user's Region (including inactive channels). |

Channel Entry

There is one Channel Entry (see also FIG. 29) for each channel in the Region. Further details are provided in Table XXIV.

TABLE XXIV

| FIELD | DESCRIPTION |
| --- | --- |
| Channel ID | Channel's unique ID number assigned by the InSight Control Center. Used to distinguish Show Lists that the Subscriber Unit needs. |
| Tune Channel Nbr | Channel Number to be tuned to receive this channel's broadcasts. Tune Channel Number may differ from the original channel number if the channel is on a cable system. E.g.; Channel 5 (CBS) might be broadcast on channel 17 on a cable network. |
| Transponder Nbr | Satellite Transponder Number, for acquiring Satellite broadcasts. |
| Satellite Nbr | Satellite Number, and Index used with the Satellite Codes to generate the specific commands for communicating with the satellite receiver box. |
| Original Channel Nbr | Channel Number displayed in the channel gliff. This is the channel the user recognizes. |
| Signal Strength | Signal Strength rating for the channel acquired during Authorization scanning. Larger numbers represent stronger signals. |
| Data Pro Flg | Data Provider Flag. Identifies the channel we receive StarSight data from. Bit set during Authorization scan. |
| Inact Flg | Inactive Channel Flag. This bit is set when the user specifies this channel as unwanted. When this bit is set no data is collected for the channel. |
| No Desc Flg | No Descriptions Flag. Identifies channels for which no description data is acquired. Set during user Setup. |
| Name Flg | Flag indicating if channel icon should display the original Channel Number or the first three characters from the 'Name-Affiliation' Field. 0 = use number, 1 = use characters. |
| Name-Affiliation | Text string giving channel's name and (if appropriate) network affiliation; e.g., "KTVU-FOX". |
| Mask Bits | Bits which are set indicate which characters in the 'Name- Affilation' string are to be masked out. |
| Favorite Link | Channel ID Entry number for the next most favorite channel. Set During user Setup. Used when traversing this table in 'favorites' order. Very 1st entry will = 02H. |

TABLE XXIV-continued

| FIELD | DESCRIPTION |
| --- | --- |
| Show List Handle Table Handle | Handle for this channel's Show List Handle Table. |
| Dup Chan Handle | Handle for table of Duplicate Channels associated with this base channel. |

Channel Duplicates Table

The Channel Duplicates Table (FIG. 30) contains information on each channel in the Region that is the duplicate of a base channel. This data is used to adjust the display of Blocks of pay-for-view type channels. All of the channels share a common base Channel Show List, but add a starting time to the offset of the base channel's Show List. The Base Channel ID is not stored in the structure.

Instead the structure is referenced as a Handle by the channel entry in the Channel Data Table. If a channel entry has duplicate channels, then the Duplicate Channel Handle field has a Handle Number to access the table by. Further details are provided in Table XXV.

TABLE XXV

| Field | Description |
| --- | --- |
| Type/Nbr Blks | Pool Entry Type and number of blocks required to hold this Pool item. The type value indicates that this is a 2 byte field since the length can become very large due to the number of channels in the Region. |
| Nbr Channels | Number of duplicate Channel entries in the user's region (including inactive channels). |

Channel Duplicates Entry

There is one Channel Duplicate Entry for each duplicate channel in the Region. Further details are provided in Table XXVI.

TABLE XXVI

| Field | Description |
| --- | --- |
| Tune Chan Nbr | Tuned Channel Number for the channel that duplicates the Show List of the base channel by some time offset (9 bits). |
| Time Offset | This is the offset in minutes from the starting time of the Base Channel ID. |

Show List Handle Table

A 'Show List Handle Table' (FIG. 31) contains Handles to Show Lists for every day of the week. This table is pointed to by the 'Show List Handle Table' Handle located in the Channel Data Table. Via this table we can access Show Lists representing a weeks wort of scheduling. Further details are provided in Table XXVII.

TABLE XXVII

| Field | Description |
| --- | --- |
| Type/Nbr Blks | Pool Type = 40H, Nbr Blks = 1. Since both pieces of information are contained in the 1st Byte, this value will equal 41H. |
| Reference Count | Number of times this Show List is referenced by another object in database. When this structure is initially created, Reference Count will = 1 since Channel Data Table makes reference to it. |
| Monday–Sunday | One Handle for every day of the week. These Handles point to actual |

TABLE XXVII-continued

| Field | Description |
| --- | --- |
| Show List Handles | Show Lists representing a given day of the week. Initially, and as necessary, when given Handle = 0000, means Show List is needed. |

Show List

A Show List (FIG. 32) contains 24+hours of scheduling for a given channel. The only time it will in fact contain more than 24 hours of scheduling is when a program starts in the current day and crosses the 24 hour line while still broadcasting. All Show Lists will always begin at the same time every day. A Dummy Slot will be created to deal with overflow from the previous day if necessary. For a complete set of scheduling, seven separate Show Lists are required for every Program Originator supported by given Subscriber Unit. Access to the Show List is via the Show List Handle Table for a given day of the week. Further details are provided in Table XXVIII.

TABLE XXVIII

| Field | Description |
| --- | --- |
| Type/Nbr Blk | Pool Entry Type and Number of Blocks required for the entry. Show List pool type = 02H. |
| Version | The current Version of the Show List, allows us to recognize when a new Version of a Show List has arrived. |
| Start Time | Start Time (in number of minutes since midnight January 1, 1992 - GMT ) for the First Show in the Show List. Used for determining new schedule days as they come in. |

Show Entry

A Channel's schedule is given by an ordered sequence of Show Entries. These Entries give a show's duration, title, and possibly an episode description. The entries are either 4, 6, or 8 bytes long depending on whether the show has a description and/or Group ID.

Finding the entry that corresponds to a given start time requires the Entries to be scanned, in order, from the beginning of the list and adding Duration values. There must be no gaps in the Show List. Further details are provided in Table XXIX.

TABLE XXIX

| Field | Description |
| --- | --- |
| Dummy Flag | Set if 1st slot Dummy means last show of last Show List over. This much time contained in duration. |
| DID Flag | Description ID flag. If this bit = 1 , then a DID Handle field exists for this entry; i.e., entry is at least 6 bytes long and the show has a description. |
| Duration | Length of program minutes- Range: 1 minute–240 minutes (4 hrs). Shows longer than 4 hours must be broken into multiple parts with each part given a new slot. |
| GRP Flag | Group ID Flag. If this bit = 1 then a Group ID field exists for this entry; i.e. entry is at least 6 bytes long and the show is a member of a Record Group. If DID Flag set entry, entry is 8 bytes long. |
| SID Handle | Handle for the Show Tide Entry that gives this Show's Title and Theme Category information. |
| DID Handle | Handle for the Show Description Entry that gives this show's episode description and some additional Theme Category information. This field is only present if the 'DID Flg' field is set. |
| Group ID | Value of the Group ID that is used by the Record Manager to identify shows that are members of a Record Group. |

TABLE XXIX-continued

| Field | Description |
| --- | --- |
| Delimiters | Prior to 1st show slot there will be an 'EEH' delimiter. Following last show slot, there will be an 'FFH' delimiter. |

Show Title

Show Titles (FIG. 33) contain the usually compressed text of a Show's Title. There is one entry per unique Show Title.

Show Titles are Pool based items. An entry is created whenever a Show List received (for a channel the Subscriber Unit is collecting data for) that contains an SID for which the Subscriber Unit does not already have the Show Title. When an entry is created a Handle is allocated to it and the 'Need It' flag is set in the Show Title Handle Table Entry.

The entry size is determined by the length of the title. A single Pool Block is reserved (containing a null title string) when a new SID is received in a Show list. The entry is filled when the appropriate Show Title message is subsequently received and the 'Need It' flag is then cleared At that time, the entry may be relocated and expanded to multiple Pool Blocks (but its Handle will stay the same). Further details are provided in Table XXX.

TABLE XXX

| Field | Description |
| --- | --- |
| Type/Nbr Blks | Pool entry type and number of consecutive Pool blocks required for the entry. Show Title Pool Type = 5? H. |
| Theme ID | Unique number associated with Theme Category Data for this show. This is an index into the Theme Category Data Table. |
| Compressed Flag | Flag indicating if Show Tide text is compressed or not. Sometimes compression actually lengthens the string, so this flag is used to suppress de-compression when compression was not needed. (0 = not compressed, 1 = compressed). |
| CC | Flag indicating if show is Closed Captioned. 0 = no, 1 = yes. |
| Stereo Flag | Indication if show is broadcast in Stereo. 0 = no, 1 = yes. |
| BW/C | Flag indicating if show is broadcast in Black and White or Color. 0 = Color, 1 = B & W. |
| Reference Count | Number of times this Show Tide is referenced by a Show List, Record Queue entry, or other item in the database. When this field is 0 the entry and its corresponding Show Title Handle Table entry, are candidates for deletion. |
| Show Title | Text string for the Show Name. Normally this string is compressed by Huffman encoding; however, if he "Compressed" flag is not set, the text is straight ASCII. |

Database Show Title Hash Table Access Scheme

The database show title hash table access scheme is shown in FIG. 34. Show Title Handle Table Show Title Handle Tables (FIG. 35) are Pool based tables used to determine if a show title is needed or if it has already been received. There is one Show Title Handle Table for each possible value that an SID can Hash to; i.e., 256 tables.

A Show Title Handle Table entry is made for every unique SID received in any Show List message for a channel that the SU is collecting data for. The particular table that the entry is made in is determined by the SID's Hash value; that is, the SID's least significant 8 bits.

These tables must be updated as SIDs are eliminated from the database. A Show Handle Table Walker background task is turned on and accesses these tables at regular intervals and checks them for Reference Counts that have gone to 0. The Walker looks for entries that can be delete. Further details are provided in Table XXXI.

TABLE XXXI

| Field | Description |
|---|---|
| Type | Pool entry type for Show Title Handle Table = 03H. |
| Nbr Blks | Number of Pool Blocks required for the entry. |
| Nbr Entries | Number of table Entries. Used when searching table for matching SID values. This can never be 0. |

Show Title Handle Table Entry

The Show Title Handle Table contains multiple entries. Each of these Entries contains the following field:

| Field | Description |
|---|---|
| Need It Flag | Flag indicating if the Show Title text string message has been received for this SID. 0 = Show Tide received, 1 = not received. |

Show Title Hash Table

The Show Title Hash Table (FIG. 36) is a fixed size, pre-allocated table containing only Pool indices for each possible SID Hash value. The SID Hash value is an index into this table. The value in the nth entry is an index into the Pool for the Show Title Handle Table containing all SIDs received so far that Hash to n. Further details are provided in Table XXXII.

TABLE XXXII

| Field | Description |
|---|---|
| Pool Index | Pool Index for the first block of the Show Tide Handle Table for SID's that hash to this entries offset from the beginning of the table. A value of 0 means no SID's have been found so far (in Show Lists for channels we collect data for) that have Hashed to this entry. |
| SID | Unique Show ID number. Only the most significant 12 bits are stored since all entries in this table have the same least significant 8 bits. This 20 bit number is unique for each Show Title. |
| Handle | Index into the Handle Table which, in turn, gives the Pool Index for the first Pool Block containing the corresponding Show Title Entry. |

Show Description

Show Descriptions (FIG. 37) contain the (usually) compressed text of a show's episode description. There is one entry per unique show description. Show Descriptions are Pool based items. An entry is created whenever a Show List is received (for a channel the SU is collecting data for) that contains a DID for which the SU does not already have the show description. That is, the 'need it' flag is set in the Show Description Handle Table entry.

The entry size is determined by the length of the description. A single Pool block is reserved (containing a null description string) when a new DID is received in a Show List. The entry is filled when the appropriate Show Description message is subsequently received and the 'need it' flag is cleared At that time, the entry may be relocated and expanded to multiple Pool blocks (but its handle will stay the same). Further details are provided in Table XXXIII.

TABLE XXXIII

| Field | Description | | |
|---|---|---|---|
| Type/Nbr Blocks | Pool entry type and number of consecutive Pool blocks required for the entry. Show Description Pool Type = 6?H | | |
| Cmp Flg | Flag indicating if show description text is compressed or not. Sometimes compression actually lengthens the string, so this flag is used to suppress decompression when compression was not needed. (0 = not compressed, 1 = compressed). | | |
| CC | Flag indicating if the show episode is close captioned. 0 = no, 1 = yes. | | |
| Stereo | Flag indicating if the show episode is broadcast in stereo. 0 = no, 1 = yes. | | |
| BW/C | Flag indicating if the show episode is in black & white or color. 0 = color, 1 = B & W. | | |
| Rating Flg | Flag indicating if rating bytes are present. 0 = no, 1 = yes. | | |
| Critics Rating | Number of star's accorded the show by the critics. 0 = no rating. | | |
| MPAA Rating | Audience suitability rating. 0 = G, 1 = NR, 2 = PG, 3 = PG13, 4 = R, 5 = X, 6 = NC17. | | |
| Traits Bit Mask | Bit mask indicating show's attributes such as violence or profanity. See 'Show Description Command' for bit assignments. | | |
| | | Bit | Attribute |
| | | 0 | profanity |
| | | 1 | nudity |
| | | 2 | violence |
| | | 3 | adult situation |
| | | 4 | adult themes |
| | | 5 | mild violence |
| | | 6 | brief nudity |
| | | 7 | adult language |
| | | 8 | mature themes |
| | | 9 | not used |
| Reference Count | Number of times this show description is referenced by a Show List, Record Queue entry, or other item in the database. When this field is 0 the entry and its corresponding Show Description Handie Table entry are candidates for deletion. | | |
| Theme ID | Unique number associated with Theme category data for this episode of the show. This is an index into the Theme Category Data Table. | | |
| Show Description | Text string for the show name. Normally this string is compressed by Huffman encoding; however, if the 'compressed' flag is not set, the text is straight ASCII. String is null terminated. | | |

Database Show Description Access Overview

FIG. 38 depicts the database show title hash table access scheme.

Show Description Handle Table

Show Description Handle Tables (FIG. 39) are Pool based tables used to determine if a Show Description is needed or if it has already been received. There is one Show Description Handle Table for each possible value that an DID can Hash to; i.e., 256 Tables.

A Show Description Handle Table entry is made for every unique DID received in any Show List message for a channel that the SU is collecting data for. The particular table that the entry is made in is determined by the DID's Hash value; that is, the DID's least significant 8 bits.

These tables must be updated as DIDs are eliminated from the database. A Show Handle Table Walker background task is turned on and accesses these tables whenever 5 DIDs have been deleted; i.e. their Reference Counts have gone to 1. The Walker looks for entries that can be deleted. Further details are available in Table XXXIV.

TABLE XXXIV

| Field | Description |
|---|---|
| Type | Pool entry Type for Show Title Handle Table = 04H |
| Nbr Blocks | Number of Pool Blocks required for the entry. |
| Nbr Entries | Number of Table Entries. Used when searching table for matching DID values. |

Show Description Handle Table Entry

The Show Description Handle Table contains multiple entries. Each of these entries contains the fields shown in Table XXXV:

TABLE XXXV

| Field | Description |
|---|---|
| Need It Flag | Flag indicating if the Show Description text string message has been received for this DID. 0 = Show Description received, 1 = not received. |
| DID | Unique Description ID Number. Only the most significant 8 bits are stored since all entries in this table have the same least significant 8 bits. This 16 bit number is unique for each Show Description. |
| Handle | Index into the Handle Table which, in turn, gives the Pool Index for the first Pool Block containing the corresponding Show Description entry. |

Show Description Hash Table

The Show Description Hash Table (FIG. 40) is a fixed size, pre-allocated table containing only Pool indices for each possible DID Hash value. The DID Hash value is an index into this table. The value in the nth entry is an index into the Pool for the Show Description Handle Table containing all DIDs received so far that Hash to n. Further details are as follows:

| Field | Description |
|---|---|
| Pool Index | Pool Index for the first block of the Show Description Handle Table for DID's that Hash to this entries' offset from the beginning of the table. A value of 0 means no DID's have been found so far (in Show Lists for channels we collect data for) that have Hashed to this entry. |

Theme Category Table

The Theme Category Table (FIG. 41) contains the definition of the Themes downloaded to the Subscriber Unit. The Themes Categories are used to search for shows of a particular type. Each Theme Category contains one or more Theme SubCategories. Each Theme Category in the Theme Category Table has a Theme SubCategory Table associated with it. Further details are provided in Table XXXVI.

TABLE XXXVI

| Field | Description |
|---|---|
| Type/Nbr Blks | Pool entry type and Number of Blocks required to hold this Pool item. The type value indicates that this is a 2 byte field since the length can become large due to the number of possible Theme Categories. |
| Reference Count | Number of times this table is referenced. Initialized so the garbage collector does not delete it |
| Version | Version Number of the Theme Category Table New Categories and Sub Categories are collected when the Version Number changes. New Theme Counts must be also be determined. |

TABLE XXXVI-continued

| Field | Description |
|---|---|
| Nbr Theme Categories | Number of Theme Category Entries. |

Theme Category Entry

There is one Theme Category Entry for each Theme Category. Further details on the Theme Category Entry are provided in Table XXXVII.

TABLE XXXVII

| Field | Description |
|---|---|
| Theme Category ID | The Theme Category's Unique ID assigned by the Head End. Used to Identify Theme SubCategories for this Primary Category. |
| Theme SubCategory Table Handle | The Handle to the Memory Pool Block containing the Theme SubCategory Table that corresponds to this Theme Category. |
| Theme Category Name Length | The length of the text string in bytes. Used to locate the start of the next entry. |
| Theme Category Name | Compressed text name of Theme Category. Huffman encoded. |

Theme Subcategory Table

The Theme SubCategory Table (FIG. 42) contains information about Theme SubCategories contained in a Theme Category. Each Theme SubCategory Table is referenced by one Theme Category Entry. Each Theme SubCategory Entry contains a name, qualifiers, and Theme Indexes. The Theme Indexes in Show Titles and in Show Descriptions are matched against the Theme Indexes in a Theme SubCategory. Theme Indexes that match identify which shows are a members of a Theme SubCategory. Further details are provided in Table XXXVIII.

TABLE XXXVIII

| Field | Description |
|---|---|
| Type/Nbr Blks | Pool entry Type and Number of Blocks required to hold this Pool item. The Type value indicates that this is a 2 byte field since the length can become very large due to the number of Theme SubCategories in the Theme Category. |
| Theme Category ID | Theme Category ID of owning Theme Category. |
| Reference Count | Number of times this object is Referenced. |
| Nbr Theme SubCategories | Number of Theme SubCategory Entries in the Theme Category. |

Theme SubCategory Entry

There is one Theme SubCategory Entry for each channel in the Region. Further details on the Theme SubCategory Entry are provided in Table XXXIX.

TABLE XXXIX

| Field | Description |
|---|---|
| Subcategory Show Count | Count of shows that reference this SubCategory. A Show Title/Description pair should only be counted once. |
| Entry Length | Total remaining Entry Length in Bytes (Indexes & Text) |

TABLE XXXIX-continued

| Field | Description |
| --- | --- |
| Nbr Theme Indexes | Number of Theme Indexes that reference this Theme SubCategory. |
| Theme Index [] | Theme Indexes, (9 bits + Nbr extra Theme index Bits) long. This is implementation dependent. The Head End tells the Subscriber Unit how many bits are required for the largest Theme index. The default is 9 bits. The Subscriber Unit can encode those as 9 bit values, or as 16 bit values. |
| SubCategory Name | Compressed Text SubCategory Name. |

This section describes the messages sent between all processors in a subscriber unit 52. All messages are described even though some subscriber unit implementations may not use or require all of the messages.

Diagrams are given showing the format of the messages followed by a description of each of the fields in the message. Greyed fields represent currently unused fields, but the bits in these fields should be set to 0's in order to maintain compatability with future implementations. All fields are binary, 2's complement numbers unless otherwise noted.

Database Engine—I/O Processor Interfaces

The Database Engine and the I/O Processor communicate via an IM bus running at 1 Mbits per second. The I/O Processor receives Data Transmission Network data via one or more specified Vertical Blanking Interval line(s) and transmits the acquired raw bytes when requested by the Database Engine Processor. The Database Engine controls the tuned channel and specifies the particular VBI line(s) to be used.

The Database Engine also issues graphic display commands to the I/O Processor such as fill a rectangle with a given color, and save or restore the pixel contents of a given rectangle on the screen. All subscriber unit screens are constructed from these graphic display commands.

The Database Engine issues commands to the I/O Processor in a packet (FIG. 43) that contains a packet length field followed by one or more commands. The I/O Processor transfers all packet bytes to a RAM command buffer and, at the completion of the transfer, begins executing the commands in the order they were received in the packet The I/O Processor sets a status flag indicating that it is busy until all commands have been executed. Packet size is always the first two bytes received in any command sequence issued to the I/O Processor. Only one command packet can be sent to the I/O Processor at a time.

Graphics Commands

The following commands define the primitive graphics operations needed to draw system display screens on a television set connected to or incorporating the subscriber unit 52.

Screen coordinates are based on (0,0) being in the upper left corner of the screen. The TPU 2740 allows X coordinates as high as 503 but the system's maximum X coordinate is 251. This allows the system to keep X coordinates in a single byte and to have two pixels of different colors comprise a 'system pixel'. Hence (251,207) is the lower right corner of the screen and X coordinates received in commands must be doubled by the 2740.

All colors in the following commands are comprised of two basic TPU 2740 colors in the upper and lower nibbles of the color byte. Using two separate colors in a single system pixel enhances the number of colors that can be shown. Setting a system pixel actually involves setting two successive 2740 pixels along the X axis using the two colors in the color byte.

When areas are filled, the colors must be dithered. That is, the colors used for successive 2740 pixels along the X axis must alternate between the two colors given in the appropriate command color byte. Even rows start with color 1 while odd rows (i.e. Y coordinate is an odd number) start with color 2 and alternate between the two colors for successive pixels along the X axis.

The 2740's graphics routines clip output if the X or Y coordinate exceeds the limits of the screen. That is, graphics do not wrap if the coordinates of an operation go outside (0,0) to (251,207).

Commands with illegal parameter values are ignored An illegal 'cmd type' field causes all subsequent commands in the packet to be ignored; that is, the IOP is finished with a packet if it ever detects an illegal command type.

Graphics commands take precedence over VBI processing.

Set Graphics Defaults

The Set Graphics Defaults command (FIG. 44) causes the I/O Processor (IOP) to reset all its graphics variables to their initialization values. This command is used when the Database Engine has come up from a power on reset state. The IOP initializes these values to:

shadow width=shadow height=3
shadow color=BLACK
small font delta X=6
small font delta Y=10
large font delta X=8
large font delta Y=15
highlight=WHITE
underline1=GREY
underline2=BLACK Further details are provided in Table XXXX.

TABLE XXXX

| Field | Description |
| --- | --- |
| cmd type | Command ID number = 1 identifying this as a Set Graphics Defaults command. |
| shadow width | Number of pixels along the X axis for vertical shadows. Used by Draw Rectangle command. |
| shadow height | Number of pixels along the Y axis for horizontal shadows. Used by Draw Rectangle command. |
| shadow color 1,2 | Default colors to be used for shadows. |
| small font delta X | Number of pixels spacing along X axis for small font characters. Used by Write ASCII String command. |
| small font delta Y | Number of pixels spacing along the Y axis allowed for text lines written in small font characters. This value is added to the Y coordinate for the current text line when a carriage return character is encountered in a text string by the Write ASCII String command. |
| large font delta X | Number of pixels spacing along X axis for large font characters. Used by Write ASCII String command. |
| large font delta Y | Number of pixels spacing along the Y axis allowed for text lines written in large font characters. This value is added to the Y coordinate for the current text line when a carriage return character is encountered in a text string by the Write ASCII String command. |
| highlight 1,2 | Color ID numbers for the top embossing lines and left side lines. |
| underline 11,12 | Color ID numbers for the inner embossing underline and inner right side line. |
| underline 21,22 | Color ID nunbers for the lowest embossing underline and outside right verticle line. |

Erase Screen

The Erase Screen command (FIG. 45) causes the I/O Processor to blank the screen and set all display buffer pixels to the specified "transparent" color. Further details are provided in Table XXXXI.

TABLE XXXXI

| Field | Description |
|---|---|
| cmd type | Command ID number = 2 identifyig this as an Erase Screen command. |
| xpar color | Color ID number to be used for transparent pixels. Only the lower nibble is used in defining the transparent color. |

Draw Rectangle

Draws a rectangle of specified dithered colors. Rectangle can be filled, outlined, shadowed, and/or embossed in a single operation based on the corresponding flag bits set in the command. Each of these operations can be done independently of the other operations. For example, an empty rectangle can be drawn by setting only the 'outline' flag bit.

For solid color, filled rectangles, both 'fill color1' and 'fill color2' should be the same value. Rectangles should be filled, then embossed, outlined and shadowed in that order. Further details are provided in FIG. 46 and Table XXXXII.

TABLE XXXXII

| Field | Description |
|---|---|
| cmd type | Command ID number = 3 identifying this as a Draw Rectangle command |
| upper left X | X coordinate for the upper left corner of the rectangle. |
| upper left Y | Y coordinate for the upper left corner of the rectangle. |
| width | Rectangle size in pixels along the X axis. |
| height | Rectangle size in pixels along the Y axis. |
| fill color 1,2 | Color ID numbers for the dithered colors used to fill the rectangle. Only used if 'fill' bit is set. |
| outline color 1,2 | Color ID numbers for the dithered colors to be used for the outline around the rectangle. Not used if 'outline' flag = 0. |
| fill | Flag indicating if rectangle should be filled with dithered colors. 0 = no, 1 = yes. |
| outline | Flag indicating if rectangle should be outlined. 0 = no oudine, 1 = outline rectangle with 'outline' color. |
| shadow | Flag indicating if rectangle should have a shadow. If the shadow bit is set for drawing a pop-up then save and restore rectangle operations must account for the size of the shadow. Shadow size and color are set by the Set Graphics Defaults command. 0 = no shadow, 1 = draw shadow. |
| emboss | Flag indicating if rectangle should be embossed to give a 3D effect. Embossing colors used are determined from the 'fill color 1' and 'fill color 2' fields. 0 = no embossing, 1 = do embossing. |

Example rectangles are shown in FIGS. 47A–47E.

Save Rectangle

Causes the pixel contents of a specified rectangle on the screen to be saved in a temporary buffer for later restoration via a Restore Rectangle command. Further details are provided in FIG. 48 and Table XXXXIII.

TABLE XXXXIII

| Field | Description |
|---|---|
| cmd type | Command ID number = 4 identifying this as a Save Rectangle command. |
| upper left X | X coordinate for the upper left corner of the rectangle. |
| upper left Y | Y coordinate for the upper left corner of the rectangle. |
| width | Rectangle size in pixels along the X axis. |
| height | Rectangle size in pixels along the Y axis. |
| pop-up D | ID number assigned by the command initiator (value is equivalent to nesting level). This field is only used for debugging. |

A Restore Rectangle

Restores a rectangle to the screen that was previously saved with a Save Rectangle command. Rectangle to be restored is recognized by its 'pop-up ID' field Restoration coordinates allow a previously saved rectangle to be brought back at a different place on the screen, such as when moving a cursor or icon of some sort. Further details are provided in FIG. 49 and Table XXXXIV.

TABLE XXXXIV

| Field | Description |
|---|---|
| cmd type | Command ID number = 5 identifying this as a Restore Rectangle command. |
| upper left X | X coordinate for the upper left corner of the rectangle. |
| upper left Y | Y coordinate for the upper left corner of the rectangle. |
| save | Flag indicating if rectangle's storage area can be released for use by subsequent save operations. If the 'save' flag is set then another 'restore' operation can be performed without doing a corresponding 'save'. 0 = release, 1 = save. |
| pop-up ID | ID number previously assigned to a saved rectangle. Not used except for debugging. |

Move Rectangle Vertically

The Move Rectangle Vertically command (FIG. 50) causes the pixel contents of a specified rectangle to be copied to another place in display memory, effectively moving the rectangle on the screen. Only vertical moves are handled by this command. Rectangles are scrolled up or down one line at a time until the specified scroll size has been achieved. Further details are provided in Table XXXXV.

TABLE XXXXV

| Field | Description |
|---|---|
| cmd type | Command ID number = 6 identifying this as a Move Rectangle Vertically command. |
| upper left X | X coordinate for the upper left corner of the rectangle. |
| upper left Y | Y coordinate for the upper left corner of the rectangle. |
| width | Rectangle size in pixels along the X axis. |
| height | Rectangle size in pixels along the Y axis. |
| scroll size | Number of pixels to shift the rectangle per move operation. Negative numbers mean shift the rectangle to a position 'scroll size' pixels higher on the screen. Positive numbers mean shift the rectangle lower on the screen. |
| delay | Number of horizontal sync pulses to count before starting the next single line scroll operation. Provides some scroll rate control for the Database Engine. |

Write ASCII String

Output an ASCII string to the screen. Starting coordinates for the first character of the string correspond to the characters upper left corner. Successive characters are on a horizontal line until an ASCII carriage return character is encountered; subsequent characters are output 'delta Y' (as specified in the Set Graphics Defaults command for each font) pixels lower on the screen and restarting at the original X coordinate. Illegal characters cause a "?" to be output in their place.

Characters can be output in one of two fonts. Only upper case characters are supported in the large font. Further details are provided in FIG. 51 and Table XXXXVI.

TABLE XXXXVI

| Field | Description |
|---|---|
| cmd type | Command ID numher = 7 identifying this as a Write ASCII String command. |
| font | Identifies which of two fonts should be used for each character in the string. 0 = small font, 1 = large font. |

TABLE XXXXVI-continued

| Field | Description |
|---|---|
| start X | X coordinate for the upper left corner of the first character in the line. |
| start Y | Y coordinate for the upper left corner of the first character in the line. |
| text color 1,2 | Color ID numbers for the pixels that form characters. (Only the lower nibble is used - characters are not dithered.) |
| ASCII string | String of ASCII characters to be output. Output stops when a NULL is found. |

Draw Channel Icon

Draws a channel icon at specified coordinates. Coordinates for the icon represent the upper left corner of a rectangle that would exactly contain the icon if it held a 1 or 2 character channel name These coordinates must be adjusted if the 'ASCII channel name' field is longer than 2 characters In this case, the IOP must decrement the X coordinate sent in the command by 3 * (channel name length–1). An empty channel icon is drawn if the channel name string has no characters in it (i.e., an empty icon of 1–2 character size if byte 5=0). Further details are provided in FIG. 52 and Table XXXXVII.

TABLE XXXXVII

| Field | Description |
|---|---|
| cmd type | Command ID number = 8 identifying this as a Draw Channel Icon command. |
| upper left X | X coordinate for upper left corner of the icon. |
| upper left Y | Y coordinate for upper left corner of the ioon. |
| fill color 1,2 | Color ID numbers for the fill colors inside the channel icon. |
| text color 1,2 | Color ID numbers for the text in the channel icon and for the outline of the icon. |
| ASCII chan name | 0 to 4 characters to he used for labeling inside the channel icon. May be a name such as "SHOW", "G3–24", "RESET", "CNN" or a channel number such as "7" or "135".<br>Field has a NULL terminator; i.e. byte = 0 after last character of the name. If this string is of length 0 (i.e. first byte of this field = 0) then an empty icon is drawn. |

Examples of channel icons are shown in FIGS. 53A–53C.

Disable Transparent Color

The Disable Transparent Color command (FIG. 54) specifies that no color code number represents transparent pixels. This command is used to indicate when no color should be transparent and should be sent each time a full screen display is drawn. Further details are as follows:

| Field | Description |
|---|---|
| cmd type | Command ID number = 9 identifying this as a Disable Transparent Color command. |

Network Data Acquisition and Control Interface

System data is received via the PBS network, MTV, Showtime or other transmission source on one or more Vertical Blanking Interval (VBI) lines. The I/O Processor acquires data from each line (if there are multiple lines) and stores it into separate input buffers. Data is stored in the IOP's input buffers even if the framing code is bad for a given field. In this case, two bytes of 03s are stored. The data is only transferred to the Database Engine Processor if the command packet contains at least one command that requires a response.

When responding to a Database Engine request, the I/O Processor transfers as many bytes as it can that is less than or equal to the number of requested data bytes. If an input buffer becomes full, the I/O Processor begins dumping the data until the buffer is emptied or a reset is issued. A full buffer causes the 'ovfl' flag to be set in the next response it sends to the Database Engine.

The I/O Processor can handle up to 2 VBI lines of system data or one line of system data and closed caption data from line 21. Data is always acquired from both fields for each system data VBI line. Closed caption data is also acquired from both fields.

The I/O Processor responds within 10 milliseconds to any command that requires a response.

Stop VBI

The Stop VBI command (FIG. 55) causes the I/O Processor to initialize its internal variables related to VBI processing. All VBI buffer counters are cleared and any acquired data is lost VBI data acquisition is stopped until a Set VBI Control Parameters or a Flush VBI Buffer command is received. Further details are as follows:

| Field | Description |
|---|---|
| cmd type | Command LD number = 16 identifying this as a Stop VBI command. |

Set VBI Control Parameters

The Set VBI Control Parameters command (FIG. 56) allows the Database Engine to specify parameters that control the acquisition of VBI data. This command (or a Flush VBI Buffer command) must be issued after a Stop VBI command in order to enable VBI data acquisition.

Parameter must be sent for all VBI lines (maximum of two lines). Each new Set VBI Control Parameters command replaces all previous parameters. Parameters must be a by line number with the lowest VBI line first. Further details are provided in Table XXXXVIII.

TABLE XXXVIII

| Field | Description |
|---|---|
| cmd type | Command ID number = 17 identifying this as a Set VBI Control Parameters command. |
| nbr lines | Number of VBI lines to use for acquiring system data. |
| VBI line 1 | Primary VBI line number whose data is to be acquired. |
| fram code 1 | Framing code to be used for VBI line 1. |
| rate 1 | Data rate for VBI line 1. 0 = Telecaption rate (2 bytes per line), 1 = full rate (33 data bytes per line). |
| VBI line 2 | Additional VBI line numbers (if any) whose data is to be acquired. Not present if only one VBI line to be processed. Maximum of 2 VBI lines. |
| rate 2 | Data rate for VBI line 2. Not present if 'nbr lines' field = 1<br>0 = Telecaption rate (2 bytes per line), 1 = full rate (33 data bytes per line). |
| fram code 2 | Framing code to be used for VBI line x. Not present if 'nbr lines' = 1. |

Read VBI Status

The Read VBI Status command (FIG. 57) causes the I/O Processor to return status information on the specified VBI line buffer. Further details are provided in Table XXXXIX.

| Field | Description |
|---|---|
| cmd type | Command ID number = 18 identifying this as a Read VBI Status command |

-continued

| Field | Description |
| --- | --- |
| VBI line | VBI line number whose status is being requested. = 0 means return status for all active VBI lines. |

Status returned is formated as shown in FIG. 58 and further described in Table L:

TABLE L

| Field | Description |
| --- | --- |
| VBI line | VBI line number whose status is being returned. 'VBI line' = 0 means a status request was made for a VBI line that the IOP is not collecting data for; i.e., an illegal VBI line number was received in the command that generated this response. (Lines for which data is collected are set with a Set VBI Control Parameters command.) |
| nbr unread bytes | Number of data bytes in buffer for 'VBI line' that have not yet been read by the Database Engine. A value of 255 for this field indicates that the IOP has at least 255 bytes available. |
| ovfl | Flag indicating VBI buffer has overflowed since last read request (i.e., I/O Processor had to drop some VBI data since the buffer was full of unread bytes). 0 = no overflow, 1 = overflow occurred. |
| rate | Data rate for this VBI line. 0 = Telecaption rate, 1 = full rate. |

Read VBI Buffer

The Read VBI Buffer command (FIG. 59) causes the I/O Processor to return a specified number of data bytes from the buffer for the specified VBI line. Data is returned in first in, first out order. The number of data bytes actually returned will be less than or equal to the requested number of bytes. Further details are provided in Table LI.

| Field | Description |
| --- | --- |
| cmd type | Command D number = 19 identifying this as a Read VBI Buffer command. |
| read again | flag indicating that the last Read VBI Buffer command should be repeated using the same parameters in effect at that time (i.e. repeat the last Read VBI Buffer command). If this bit is set then the 'VBI line' and 'nbr bytes' fields will not be present in the command. 0 = read using parameters specified in this command, 1 = read using last specified parameters. |
| VBI line | VBI line number whose data is being requested. |
| nbr bytes | Maximum number of data bytes to be returned. If more bytes are requested than exist in the buffer then the number in the buffer will be returned. If the buffer is empty then a single byte VBI Data Response is returned (i.e., only byte 0 in FIG. 60) indicating that no data is available. |

Data returned has the format of FIG. 60. Further details are provided in Table LII.

TABLE LII

| Field | Description |
| --- | --- |
| err flg | Flag indicating if an error occurred since the last VBI access command. Database Engine should do a Read VBI Status to get error information. 0 = no error occurred, 1 = had error since last VBI access. The error flag is not cleared until a Read VBI Status command is done. |
| VBI line | VBI line number whose status is being returned. |
| data byte | Successive data bytes from the buffers for the given VBI line. Bytes are returned in first in, first out (FIFO) order. Number |

TABLE LII-continued

| Field | Description |
| --- | --- |
| | of bytes returned will be less than or equal to the number of requested data bytes. No data bytes are returned if the buffer is empty. |

Flush VBI Buffer

The Flush VBI Buffer command causes the I/O Processor to either transfer all existing data in a given VBI buffer or to reset VBI processing for a given VBI line without stopping data acquisition. VBI processing is re-enabled with the parameters sent in the last Set VBI Parameters command. This command re-enables VBI processing that had been suspended due to a Stop VBI command. If data is transferred then it is returned in the same response format as for a Read VBI Buffer command Further details are provided in Table LIII.

| Field | Description |
| --- | --- |
| cmd type | Command ID number = 20 identifying this as a Flush VBI Buffer command. |
| cfr flg | Flag indicating whether remaining data should be transferred or not. 0 = don't transfer remaining data - just reset both buffers, 1 = transfer any existing data (up to 255 bytes) and then reset both buffers. |
| VBI line | VBI line number that is being flushed. 'VBI line' = 0 means flush all VBI buffers. This field is ignored if non-zero and in concatenated VBI data transfer mode. |

Reception Groups

A Reception Group (or RG) is a named entity which has an associated Channel Lineup. There are three broad categories of Reception Groups: Broadcast, Cable and Satellite. Examples of these are shown in Table LIV:

TABLE LIV

| Type of RG | Name | Description |
| --- | --- | --- |
| Broadcast: | "SF BAY" | all channels receivable via VHF or UHF antennas in the San Francisco Bay Area |
| Cable: | "TCI, Fremont, CA" | all channels receivable by subscribers to the TCI Fremont cable system |
| Satellite: | "TVRO North America" | all channels receivable in North America via Home Satellite antenna |

Some RGs, and certainly Cable RGs, will have information associated with them which is of interest, and may be helpful in marketing and other operations. Some examples of such information are:

Name of Contact

Telephone Number

FAX Number

ADI

DMA

Each StarSight Subscriber Unit is considered to be a "member", so to speak, of one and only one RG. When it is first put into operation, the SU must be informed as to which RG it is in, so that it will display the Lineup which is true for that RG.

Lineup Explanation

A Lineup is the actual list of channels that are received in a particular RG. In fact at any given time, there is a one-to-one mapping of RGs and active Lineups: for every RG there is one and only one active Lineup, and for every active Lineup there is one and only one RG. It is possible that two RGs could sometimes have identical list of channels received; it is equally possible that one list could be changed while the other does not For this reason, each Lineup is RG-specific. A Lineup can usually be thought of as a description of information that could be obtained by viewing a physical geographic map (a map that shows coverage of TV stations and cable systems, that is); it contains information about which channels are available in the physical area that the Lineup covers. The purpose of a Lineup is to define what channels in a given RG need to be supported with data.

Because of the well defined physical area of cable TV and broadcast TV, the viewable channels that a TV viewer located in that area would be able to receive are well known. These channels make up a Lineup, which is required so as to know what listings data to transmit for a given RG.

It is possible for multiple LINEUP maps to cover the same area or overlap. An example of this might be two neighbors with one receiving TV via a home antenna and the other getting his from cable. In this case the cable subscriber would be in a different RG than his non-abled neighbor since he would be receiving more/different channels from his cable. In the above case the StarSight data destined for both RG's is delivered from one PBS station and each SU listens for the data defined in its SU Lineup.

In the case of broadcast TV a given RG could contain from one to dozens of channels and could include weak stations that are found in the fringe areas. In the case of a cable system the Lineup is very well defined and is the same for all subscribers in that cable system. The Lineup for satellite viewers is fairly constant for all viewers throughout the USA with the possibility of some differences between the east coast and the west coast but is more likely to be just one group covering all of the continental USA.

File Layout Specifications
Station List

The Station List is made up of records with each record identifying and describing the essential characteristics of one broadcast station or satellite feed.

To deal with unedited stations or repeater stations, a field is used to specify where, if anywhere, the stations schedule information is obtained. If the station is not currently edited, the value in this field is set to zero; if the schedule information is being provided using a different Station ID (in other words, this station is a repeater), then this field will contain the ID of the other station; if the station is handled normally (schedule is edited and data is provided under this ID), this field is left empty.

The Station List is required to contain an entry corresponding to every station or feed for which the vendor supplies data to StarSight, regardless of whether that feed is present in any Lineup supplied by the vendor to StarSight. This is because StarSight sometimes identifies a need for data for a station, due to a show or test. In a case like this StarSight might internally generate a lineup containing this station, and just ask the vendor to supply the schedule information.

In general, the vendor should be supplying data to StarSight for all regularly scheduled stations and feeds in the USA, as well as certain designated local-origination feeds; the Station List must contain an entry identifying each one of these, an entry for each alias for any of these, and an entry for every feed which appears in any lineup supplied by the vendor to StarSight.

Other fields give the station Call Letters or satellite feed's name, the usual abbreviation for the name, effective date and expiration date (for dealing with Call Letter changes).

P Lineup List

The Lineup List is made up of two types of records:
RG Records

Each RG record explains the details about one RG, such as contact names, location, type of service, daylight saving time observed etc.

Lineup Records

Each Lineup record describes one of the channels received by the RG. The union of all the currently-effective records describing channels in a given RG comprises the Lineup for that RG. There may also be records which are not currently effective, either because the date they become effective is in the future, or because the date on which they ceased to be effective is in the past. Each record contains sufficient information to unambiguously identify the RG and channel it applies to, and (along with knowledge of the current date) to determine whether or not it is currently effective. It also contains information which allows the construction of composite channels.

The Lineup List can be updated incrementally by transmitting a Lineup List Update, consisting of only the Lineups for RGs that have been modified since the last time the full Lineup List was transmitted. Note that any time a given RG's Lineup is updated, it must be updated in full; that is: a Lineup List Update may update only some of the RGs, but any RG which has its updated must be updated by transmitting all the lineup information for that RG.

Probable usage would be for the full Lineup List to be transmitted weekly, and a Lineup List Update, transmitted daily.

File Naming Conventions

Filenames for the Station and Lineup lists shall be assigned as follows: Base name of each file shall consist of six characters signifying year, month and day; basename shall be separated from a suffix by a period, and the suffix shall denote which type of file, according to Table LV below:

TABLE LV

| Basename.Suffix | Type of File | Examples |
| --- | --- | --- |
| yymmdd.STD | Station List Daily file | 940130.STD |
| yymmdd.LUW | Lineup Weekly file | 940519.LUW |
| yymmdd.LUD | Lineup List Update | 941121.LUD |
| yymmdd.TRD | TVRO Lineup File | 931225.TRD |

File Content

These files will contain records made up of ASCII text in the range of 20 to 7E hex inclusive. The only exception to this is the end of record terminator 0A hex, an ASCII Line Feed File Transfer The Station and Lineup files are pipe delimited-format (PDF) ASCII files comprised of newline-terminated records. These files are to be transferred to StarSight electronically.

Composite Channels

The issue of composite channels is handled through the Lineup. If a single tunable channel routinely airs programming from more than one programming source, it is then known as a composite channel. (Example: A cable channel #41 might show VH1 for part of the day and HBO for another part of the day, etc.)

The Lineup will deal with this by assigning each of the feeds that go into the composite to the same "tune" channel. The start and stop times can then be used to determine what data to compile for that composite.

Composite channels are seldom seen on broadcast TV or on Satellite TV but are quite normal for a cable provider.

Station List

Each record in the Station List file is comprised of the fields defined in Table LVI. Each field is delimited from the next with an ASCII "pipe" (7C hex) character. Fields with a specified default size of 0 may be left empty if no data is available; fields with a nonzero minimum size are mandatory. Note: to inform StarSight that an entry of the Station List is being deleted, a Station List record is transmitted containing data in the the "Station ID" and "Last Modified Date/Time" fields, with all other fields empty. This signals StarSight to stop doing the internal processing associated with this Station.

Station List Record Format

TABLE LVI

| Field # | Field Name | Field Size MIN | Field Size MAX | Description |
|---|---|---|---|---|
| 1. | Station ID | 12 | 12 | The 12 digit I.D. number of this Station or feed |
| 2. | Station Type | 0 | 1 | 0 = Full Power Broadcast<br>1 = Low Pwr Tv Station<br>2 = Satellite Feed<br>3 = Locally originated<br>4 = other<br>5 = unknown |
| 3. | Call Letters or Feed Name | 0 | 8 | Call Letters or usual name (must fit in 8 characters!): e.g., HBO-WEST |
| 4. | Usual Abbreviation of Name | 1 | 4 | (applies mostly to satellite feeds: must fit in at most 4 characters!) e.g. HBO |
| 5. | Explanation of Name | 0 | 120 | Fully-descriptive name of the feed (generally applies to satellite feeds). |
| 6. | Native Channel | 0 | 13 | Leave empty for locally-originated Stations; broadcast channel when received by antenna; for Satellite cable feeds: Sat Type, Satellite, Transponder, channel |
| 7. | Affiliation | 0 | 20 | Network affiliation, if any. |
| 8. | Schedule Data Source | 0 | 12 | if left empty: schedule data is provided using the ID supplied in field 0 = >no data provided for this station any other = = ID of schedule data source |
| 9. | Last Modified Date/Time | 10 | 10 | yymmddhhmm |
| 10. | Effective Date/Time | 10 | 10 | yymmddhhmm |
| 11. | Expiration Date/Time | 0 | 10 | yymmddhhmm |
| 12. | Comments | 0 | 300 | |
| END of RECORD | 0A hex and/or oD hex Line Feed and/or Carriage Return | | | |

A detailed description of the station list record format is provided in Table LVII.

TABLE LVII

| Field # | Name |
|---|---|
| 1. | Station ID (12 numeric)<br>Unique ID number assigned by vendor. This ID is used to identify the station or feed wherever this is required. |
| 2. | Station Type (empty, or 1 byte, numeric)<br>0 = Full Power Broadcast<br>1 = Low Pwr Tv Station<br>2 = Satellite Feed<br>3 = Locally-originated<br>4 = other<br>5 = unknown |
| 3. | Call Letters or Feed Name (up to 8 alphanumeric)<br>StarSight requires that no more taan 8 characters be used to identify the Station or Feed. |
| 4. | Usual Abbieviation of Name (1 to 4 alphanumeric)<br>Note: 4 characters, maximum! If there is a well-known abbreviation, supply it here. Most cable subs don't think about East- and West-coast feeds, so HBO-WEST would generally be abbreviated as just HBO for cable subs. |
| 5. | Explanation of Name (up to 120 bytes)<br>Give the fully-expanded name, if different fmm above. For example, if Field 3 contains "YOUTH" and Field 4 contains "YTV", Field 5 might contain "Youth Television". |
| 6. | Native channel (up to 13 bytes, alphanumeric)<br>For broadcast and LFFV stations, this field would contain just a number. For satellite feeds, supply a comnla-separated list that describes: Type of Satellite (C or Ku), which satellite (usually a letter and a number, like G5), which transponder (a number), and if necessary which channel within a taansponder (required when, for example, 10 compressed channels are available on a transponder). This field should contain data if the "Station Type" field contains 0, 1, or 2; it may be empty if "Station Type" is 3, 4, or 5. Super Stations such as WTBS, WGN and WWOR deserve special consideration. In their home markets, these stations are just normal broadcast stations with normal broadcast Native channel numbers; but when received from satellite, the Native channel number must refer to a satellite and transponder. This is to be handled by using two separate Station IDs to refer to the two distinct usages of these stations. If the schedule information is the same for both, this can be indicated by having one record give the other "Station ID" in the "Schedule Data Source" field. |
| 7. | Affiliation (up to 20 characters)<br>Which network(s), or IND, or empty if unknown |
| 8. | Schedule Data Source (up to 12 numeric)<br>if left empty: schedule data is provided using the ID given in field 1<br>0 = > no data provided for this station<br>any other = = ID of schedule data source |
| | Last Modified Date/Time (10 numeric)<br>The last time any field was modified. |
| 10. | Effective Date/Time (10 numeric)<br>GMT Date/Time this record became or will become effective. Used to specify Station information which is either current, or is not yet true, but will become true at a known future date and time, such as a change of name or Call Letters. This field specifies the date and time the information did or will become effective. |
| 11. | Expiration Date/Time (up to 10 numeric)<br>GMT Date/Time this record did or will expire. Similar to the preceding field, this field specifies a future date and time when this piece of Station information (e.g., Call Letters) will cease to be in effect. |
| 12. | Comments (up to 300 bytes)<br>Whatever might be useful in assuring the channel or feed is unambiguously identified. |

An example of a station list record is given in Table LVIII.

TABLE LVII

| Field # | Field Name | Sample Data |
|---|---|---|
| 1. | Station ID | 140032965 |
| 2. | Station Type | 2 |
| 3. | Call Letters or Feed Name | CARTOON |

TABLE LVII-continued

| Field # | Field Name | Sample Data |
|---------|------------|-------------|
| 4. | Usual Abbreviation of Name | TCN |
| 5. | Explanation of Name | The Cartoon Network |
| 6. | Native Channel | Ku,G1,8 |
| 7. | Affiliation | |
| 8. | Schedule Data Source | |
| 9. | Last Modified Date/Time | 9309170930 |
| 10. | Effective Date/Time | 9309170930 |
| 11. | Expiration Date/Time | |
| 12. | Comments | eh-Th-eh, eh-Th-eh, eh-Th-That's All, Folks! |
| END of RECORD | | (END of RECORD) |

A record containing the data described above is as follows:
140032965|2||CARTOON|TCN|The Cartoon Network|Ku,G1,8|||9309170930|9309170930||eh-Th-eh, eh-Th-eh, eh-Th-That's All, Folks!|(END of RECORD)

The Lineup List

The Lineup database will contain one record for each currently-effective channel in each RG, and may also contain a future lineup for each RG. A "channel" is any seperately-scheduled feed Composite channels are described using a separate record for each part of the composite.

Certain conventions must be observed, in order to minimize StarSight's processing burden:

1. Each field is delimited from the next with an ASCII "pipe" (7C hex) character. Fields with a specified default size of 0 may be left empty if no data is available; fields with a nonzero minimum size are mandatory.
2. To inform StarSight that an RG is being deleted, a normal-looking RG record is transmitted, except that it contains a 0 in the "Lineup Record Count" field, as well as a specific Date/Time for expiration, in the "Expiration Date/Time" field; all other fields should be formatted as per this specification. This signals StarSight to stop doing the internal processing associated with this RG, as of the specified Date/Time. Note: due to the delay inherent in processing this type information, it is not a good idea to reuse this RG number to identify a new RG. To assure no problems of this nature, RG numbers should not be reused at all.
3. A lineup must always be described in its entirety, with an RG record immediately followed by all the Lineup records associated with this RG.
4. When there is both a current and a future lineup defined for an RG, the current information is transmitted first, with an RG record having the earlier of the two effective dates, followed by all the current lineup records; then another RG record having an effective date in the future followed by all the lineup records for the future lineup.
5. If any Lineup data is provided for a given RG, the entire Lineup (including all currently-effective and all scheduled-to-become-effective data) for that RG must be provided.
6. All the records which deal with a given RG must be contiguous in the file; e.g., it is not allowed to have records that deal with RG 100, then RG 101, then again with RG 100, in the same file.
7. Lineup information is to be sorted in ascending order on the following key values:
   a. RG number
   b. Effective Date
   c. Source
   d. Tune Channel #
8. It is possible to explicitly schedule an "Expiration Date/Time" for the information in a given lineup, by providing this information in the optional field of this name in the RG record.
9. Any change to any record of a Lineup must be reflected by updating the "Lineup Info Last Date/Time Modified" field in the RG record for that lineup.
10. Note that there is not a field in the Lineup record for a "Last Date/Time Modified": this is handled by updating the "Lineup Info Last Date/Time Modified" field in the RG record; an update of the "Lineup Info Last Date/Time Modified" field implies that the entire Lineup for that RG has been updated and verified.
b 11. Note that there is not a field in the Lineup record for "Effective Date/Time": this is handled by updating the "Effective Date/Time" field in the RG record; the value of the "Effective Date/Time" field implies that the entire list of Lineup records that follow this RG record will become effective (or did become effective) on that Date and Time.

RG record format is shown in Table LVIII.

TABLE LVIII

| | | Field Size | | |
|---|---|---|---|---|
| Field # | Field Name | MIN | MAX | Description |
| 1. | Record Type | 1 | 1 | "R" = normal RG "S" = Satellite. |
| 2. | Lineup Record Count | 1 | 4 | Decimal # of Lineup records to follow. |
| 3. | RG number | 8 | 8 | (The 8 digit I.D. number of this RG) |
| 4. | RG group type | 1 | 1 | 0 = broadcast 1,2,3,4 = cable 5 = satellite(TVRO) |
| 5. | RG name/ Satellite Name | 0 | 120 | Unique name of this Reception Group (if cable, name of headend) |
| 6. | Cable System name/Satellite Abbreviation | 0 | 120 | (if cable, name of system) |
| 7. | MSO name/Sat Operator | 0 | 120 | (if cable, name of MSO) |
| 8. | Contact name(s) | 0 | 120 | |
| 9. | Contact tel number | 0 | 20 | |
| 10. | Street Address | 0 | 120 | |
| 11. | City | 0 | 120 | |
| 12. | State | 0 | 2 | |
| 13. | ZIP | 0 | 10 | |
| 14. | DMA Name/Sat Orbit Pos | 0 | 120 | (DMA) |
| 15. | DMA Rank | 0 | 3 | (DMA Rank) |
| 16. | ADI Name | 0 | 120 | |
| 17. | ADI Rank | 0 | 3 | |
| 18. | Communities Served | 0 | 300 | |
| 19. | Comments | 0 | 300 | |
| 20. | RG General Info Last Modified Date/Time | 10 | 10 | yymmddhhmm |
| 21. | RG Lineup Info Last Modified Date/Time | 10 | 10 | yymmddhhmm |
| 22. | Effective Date/Time | 10 | 10 | GMT Date/Time this record became or will become effective. |

TABLE LVIII-continued

| Field # | Field Name | Field Size MIN | Field Size MAX | Description |
|---|---|---|---|---|
| 23. | Expiration Date/Time | 0 | 10 | GMT Date/Time this record will or did expire. |
| END of RECORD | | 0A hex and/or OD hex Line Feed and/or Carriage Return | | |

RG Field Explanation
Field#
1. Record Type (1 byte)

This field must always contain one of the uppercase ASCII characters "R" or "S", to specify that this record is an RG record. If Record Type is "S", then the record is being used to describe a particular Satellite, and the meanings of certain fields are redefined (see details below). Both record types have the same number of fields, but several fields will always be empty when Record Type="S".

2. Lineup Record Count (1–4 bytes)

The decimal number of Lineup records that follow this record; that is: the number of following records used to completely define the Lineup of this RG.

3. RG number (8 bytes)

This number is the unique 8 decimal digit ID of this RG. RG numbers must not be reassigned: once an RG number has been assigned, it may eventually pass out of usage (say, because a company goes out of business); but even in this case, its RG Number should not be reused.

4. RG group type (1 byte)

The Lineup type defines what type of service this RG is targeted for:
  0=Broadcast TV, this is a conventional TV channel RG.
  1=Standard cable system, this is a conventional cable frequency plan.
  2=IRC cable system (IRC is a modified cable frequency plan.)
  3=HRC cable system, (HRC is another modified cable frequency plan).
  4=Cable System, Frequency Plan Unknown
  5=Satellite 5. RG Name (if Record Type="R") (up to 120 bytes)
Satellite Name (if Record Type="S")

Use a verbose description of up to 120 characters to describe the RG or Satellite as unambiguously as possible. If a cable RG, use the MSO Name field if appropriate; RG Name should uniquely identify an entity that can have its own lineup. For example, each headend of a cable system can have its own lineup, so each headend should have a name which is somehow unique, even if it is only a unique number, or a unique combination of the Cable System Name with a number.

6. Cable System Name (if Record Type="R") (up to 120 bytes)
Satellite Abbreviation (if Record Type="S")

If cable, this may be a system operated by a Multiple System Operator (MSO). If so, give the name commonly used in the community to identify this cable system. If satellite, give the usual letter/number combination used to refer to this satellite, such as G3 for Galaxy 3.

7. MSO Name (if Record Type="R") (up to 120 bytes)
Satellite Operator (if Record Type="S")

If cable, this may be a system operated by a Multiple System Operator (MSO). If so, name the MSO. If satellite, name the operator of the satellite.

8. RG local contact (0 to 120 bytes)

Name of a local contact person at the cable company.

9. Contact Telephone Number (up to 20 bytes)

Number of a local contact person at the cable company.

10. Street Address (up to 120 bytes)

Street address of a local contact person at the cable company.

11. City (up to 120 bytes)

Name of the city where contact is located.

12. State (0 to 2 bytes, alpha)

This is the U.S. Postal Service's 2-character abbreviation for the state.

13. ZIP (0 to 10 bytes)

The ZIP code is formatted as 5-bytes, dash, 4bytes. Quite often only the first 5 bytes are available.

14. DMA Name (if Record Type="R") (up to 120 bytes)
Orbit Position (if Record Type="S")

What name does Nielsen use to refer to the DMA within which this RG lies?

15. DMA Rank (always empty when Record Type="S") (3 bytes, numeric)

What is the Nielsen DMA Rank for the DMA within which this RG lies?

16. ADI Name (always empty when Record Type="S") (up to 120 bytes)

What name does Arbitron use to refer to the ADI within which this RG lies?

17. ADI Rank (always empty when Record Type="S") (3 bytes, numeric)

What is the Arbitron ADI Rank for the ADI within which this RG lies?

18. Communities Served (empty when Record Type="S") (up to 300 bytes)

Comma-separated list of towns, cities, communities, neighborhoods, districts or boroughs served by this RG. The list should be as succinct and correct as possible, but should err, if at all, on the side of including too many, rather than too few, names.

19. Comments (up to 300 bytes)

Any special information that might help to distinguish this RG from others nearby, or anything else the person doing data entry feels is important for StarSight to be aware of, especially as it relates to trying to identify which RG a new subscriber is in.

20. RG General Info Last Modified Date/Time (10 bytes, numeric)

GMT Date and Time this record was last modified: format yymmddhhmm;For example: 9307110514.

21. RG Lineup Info Last Modified Date/Time (10 bytes, numeric)

GMT Date and Time any Lineup information associated with this RG was last modified: format yymmddhhmm;For example: 9307110514. Note: the value "0000000000" is reserved, and has the special meaning: "No Lineup available for this RG".

22. Effective Date/Time (10 numeric)

GMT Date/Time the following lineup became or will become effective. Used to specify lineup information which is either current, or is not yet effective, but will become effective at a known future date and time. This field specifies the date and me the information did or will become effective.

23. Expiration Date/Time (empty, or 10 numeric)

GMT Date/Time this record did or will expire. Similar to the preceding field, this field specifies a future date and time when this piece of lineup information will cease to be in effect The Date/Time specified is assumed to be non-inclusive of the final minute, meaning that the lineup expires at the beginning of this minute, not the end An example of an RG record is provided in Table LIX:

TABLE LIX

| Field # | Field Name | Sample Data |
|---|---|---|
| 1. | Record Type | R |
| 2. | Lineup Record Count | 20 |
| 3. | RG number | 12345 |
| 4. | RG group type | 1 |
| 5. | RG name | 12345 |
| 6. | Cable System name | Megacable of Fremont |
| 7. | MSO name | Megacable Conglomerates, Inc. |
| 8. | Contact name(s) | Bob Engineer |
| 9. | Contact tel number | (510) 555-1212 |
| 10. | Street Address | 2020 Main Street |
| 11. | City | Fremont |
| 12. | State | CA |
| 13. | ZIP | 94538 |
| 14. | DMA Name | San Francisco Bay Area |
| 15. | DMA Rank | 5 |
| 16. | ADI Name | San Francisco Bay Area |
| 17. | ADI Rank | 5 |
| 18. | Communities Served | Fremont, Union City, Sunol |
| 19. | Comments | Sunol is closer to Dublin, but is on this cable system. |
| 20. | RG General Info Last Modified Date/Time | 9307060841 |
| 21. | RG Lineup Last Modified Date/Time | 9307060841 |
| 22. | Effective Date/Time | 9307060841 |
| 23. | Expiration Date/Time | |
| END of RECORD | | \x0A hex |

A sample record containing the data specified above is as follows:

R|20|12345|1|2345|Megacable of Fremont.|Megacable Conglomerates, Inc.|Bob Engineer|(510) 555-1212|2020 Main Street|Fremont|CA|94538|San Francisco Bay Area|5|San Francisco Bay Area|5|Fremont, Union City, Sunol|Sunol is closer to Dublin, but is on this cable system.|9307060841|9307060841|9307060841||END OF RECORD The lineup record format is shown below in Table LX.

TABLE LX

| | | Field Size | | |
|---|---|---|---|---|
| Field # | Field Name | MIN | MAX | Description |
| 1. | Record Type | 1 | 1 | "L" for normal lineups; "T" for Satellite TVRO lineups |
| 2. | RG number | 8 | 8 | (The 8 digit I.D. number of this RG file) |
| 3. | Tuneable channel | 1 | 3 | (channel # or letter) |
| 4. | Source | 0 | 1 | If multiple signal sources are used, which is selected for this channel? If there is only 1 signal source, this field should be left empty. |

TABLE LX-continued

| | | Field Size | | |
|---|---|---|---|---|
| Field # | Field Name | MIN | MAX | Description |
| 5. | Channel ID # | 12 | 12 | Must be a valid Station ID number from the Station List |
| 6. | Channel Type | 1 | 1 | 0 =not identified<br>1 = Basic,<br>2 = Extended Basic,<br>3 = Premium,<br>4 = PPV |
| 7. | Days | 0 | 7 | These numbers are single bytes with the following meaning:<br>1 = Sunday<br>2 = Monday<br>3 = Tuesday<br>4 = Wednesday<br>5 = Thursday<br>6 = Friday<br>7 = Saturday<br>For non-composite channels, this field should be left empty. |
| 8. | Start Time | 4 | 4 | GMT Hour/Minute |
| 9. | Stop Time | 4 | 4 | GMT Hour/Minute |
| 12. | End of Record | 0A Hex and/or 0D Hex | | ASCII Linefeed and/or Carriage Return Character |

A detailed description of the lineup record is as follows:

1. Record Type (1 byte)
   "R"=normal Lineup Record; "T"=Satellite TVRO Lineup Record.
2. RG Number (8 numeric)
   This is the same number used to identify the Reception Group in the RG record.
3. Tunable channel (1 to 3 bytes)
   This is the channel you would tune to in order to receive this programming. It is the cable channel number or letter for the cable system (when Record Type="L"), or the transponder number for TVRO (Record Type="T"). If two or more records have the same tune channel then this is a composite channel.
4. Source (empty if Record Type="T")
   Some cable systems have the capability to select among two or more separate cables; specify which cable (A, B, . . . ) to use, if this is such a system. Leave empty if this is a single-source system.
5. Channel ID (12 bytes)
   This is the unique number used to identify the schedule information for this channel. It refers to one of the stations defined in the Station List, using its unique Station ID.
6. Channel Type (1 numeric)
   What kind of channel is this (applies to cable and TVRO lineups):
   a.   =Don't know
   1=Basic
   2=Extended Basic
   3=Premium
   4=PPV
   b.   . . . can be assigned meanings at vendor's request
7. Days (0 to 7 bytes)
   These are the days in which data from this feed is used. For non composite 15 channels the days would be 1234567. For the non-composite case, since this is by far the most common case, leaving the field empty shall be defined to be equivalent to specifying all 7 days. Any combination of up to 7 days can be specified in this field.

These numbers are single bytes with the following meaning:
1=Sunday 2=Monday
3=Tuesday 4=Wednesday
5=Thursday 6=Friday
7=Saturday Thus a "Days" field of 257 specifies the days Monday, Thursday and Saturday.

8. Start/Time (4bytes)

This is the starting time (GMT) at which data from this channel should be used. For a non-composite channel the start time will always be 0000 hours GMT.

9. Stop Time (4bytes)

This is the stop time (GMT) for data from this station. For a non-composite channel the stop time will always be 0000 hours GMT. The Date/Time specified is assumed to be non-inclusive of the final minute, meaning that the lineup expires at the beginning of this minute, not the end.

10. End of Record

ASCII Linefeed (0A Hex) and or Carriage Return (0D hex).

Example: Lineup involving Current and Future data for a two-cable system:

The fictitious lineup below illustrates a system that uses only two channels on each of two cables, for which there exist both a current and a future lineup. The data are sorted as described above; that is the currently-effective information for source A is given first (sorted in ascending order by tuned channel number), followed by the currently-effective information for source B, then the future information for source A, and finally the future information for source B. The record in boldface is the only record that is actually different between the two lineups; channel 2 on Cable B is being reassigned. Note, however, that the future lineup is given in its entirety.

R|4|000000010|4|TUCSON CABLEVISION|TUCSON CABLEVISION|INTERMEDIA PARTNERS|CATHY|(602)629-8470|1440 E 15TH ST|TUCSON|AZ|85719-6495|||||9310000000|9308010400|9401150400|
L|00000010|2|A|10039521|1|1234567|0|0||
L|00000010|3|A|10042895|1|1234567|0|0|
L|00000010|2|B|503409|1|1234567|0|0|
L|00000010|3|3|B|9353489|1|1234567|0|0|
R|4|00000010|4|TUCSON CABLEVISION|TUCSON CABLEVISION|INTERMEDIA PARTNERS|CATHY|(602)629-8470|1440 E 15TH ST|TUCSON|AZ|85719-6495|||||9310000000|9401150400||
L|00000010|2|A|10039521|1|1234567|0|0|
L|00000010|3|A|10042895|1|1234567|0|0|
L|00000010|2|B|04509845|1|1234567|0|0|
L|00000010|3|B|9353489|1|1234567|0|0|

Example: Deleting an RG

The example below illustrates how to delete the RG which was described in the preceding example, effective Jan. 15, 1994 at 0400 GMT:

R|0|00000010|4|TUCSON CABLEVISION|TUCSON CABLEVISION|INTERMEDIA PARTNERS|CATHY|(602)629-8470|1440 E 15TH ST|TUCSON|AZ|85719-6495|||||9310000000|9310000000|9401150400|9401150400|

Note that this is just a normal-looking RG record, with the Expiration Date/Time filled in. Unlike the usual case, there are no following Lineup Records, as indicated by the 0 in the "Lineup Record Count" field.

Glossary Of Terms

The following terms are commonly used in the following description. Other terms not listed in this glossary should be familiar to personnel in the listings' data industry and to personnel involved in similarly connected businesses.

| Term | Definition |
|---|---|
| CAC | Community Access Channel |
| Channel | Discrete frequency band allocated to a TV station |
| Composite Channel | Two or more PO's tmie sharing the programming on a single channel. |
| DP | Data Provider. (provider of program listings' data) |
| Data Provider | Supplier of TV program listings' data. |
| FIELD | A sub part of a record. (records are made up of multiple fields) |
| GMT | Greenwich Mean Time (Universal Mean Time). |
| HRC | Cable system frequency transmission standard. |
| StarSight | StarSight Telecast Incorporated |
| IRC | Cable system ftequency transmission standard. |
| Local | The broadcast TV station that resides within 35 miles of the cable provider. |
| MAP | Reference to the physical area of a reception group (RG) |
| MPAA | Motion Picture Artists Association (suitability guidelines for viewers). |
| MSO | Multiple System Operator (operates more than one cable system) |
| PO | Program Originator (TV station, TV cable provider, Satellite video provider). |
| Prime Time | A segment of evening time considered as Prime Viewing Time. |
| Program Originator | (see PO) |
| PST | Pacific Standard Time (West Coast Time). |
| Record | A defined string of ASCII characters within a file. |
| RG | Reception Group, The available TV channels in a well-defined geographical area. |
| Runtime | The length in minutes of a show or movie. |
| Service Provider | The cable system head end, or Broadcast TV station that carries the StarSight program data. |
| Show list | A file containing records in Pipe Delimited Format which contain schedule listing information as described herein. |
| Start Time | The local time that the show begins. (hour - minute) |
| SU | Abbreviation for Subscriber Unit. Used to decode StarSight data. |
| SyndEx | Syndicate Exclusivity |
| TCP/IP | Transmission Control Protocol/Internet Protocol |
| Specified Zone | A predetermined distance or area from a broadcast station. |

Overview of This Description

The following description defines in detail the requirements of a Data Provider in relation to delivering television listings' data to StarSight Telecast. It defines in detail the format of the Show list (pipe-delimited file). The format of each record within these files are also defined.

Also outlined are the details of the electronic delivery of these files to StarSight, and the requirements and details of special files that are required due to nation wide program oddities, such as SyndEx.

The formats of the Show list records that are used in building the StarSight electronic database are highly integrated into our database program and these formats must not be altered or changed in any way without the written consent of StarSight Telecast. Use of the Vendor-Defined Fields (see below) is allowed, provided the syntax and meanings of the fields used are documented in advance.

File Transfer Specifications

File Transfer Media and Speed

The Show list files will be transferred electronically to StarSight Telecast's UNIX file system through a router connected to the DP's Ethernet and a digital leased line, using the standard TCP/EP program, FTP. The operating speed of the leased line will be sufficient to transfer all data files in a reasonable length of time.

File Transfer Protocol and Compression

The data will be transferred into StarSight Telecast's UNIX file system using TCP/IP file transfer protocol or other file transfer protocol standard mutually agreed upon. The files may require compression due to the bulk of data being transferred using a mutually agreed upon data compression algorithm compatible with our UNIX file system.

File Transfer Details

The files will be transferred to StarSight on a daily basis 7 days a week with the file transfer completed by 0800 hours PST. The daily file transfer will be into the home directory corresponding to the login name used to perform the file transfer.

The "Main" file download to StarSight will always be for the date 12 days into the future. Thus if today is the 10th, today's data download would be for start times beginning at 0000 hours GMT on the 22nd.

(see GMT specification below in this description)

Since the data files are sent on a daily basis some mechanism must be in place to allow for the updating of a program listing that has already been transferred This is accomplished via the "Update" file. An Update file contains records of all changes that have been made since the last Update file was produced, which modify any of the data for any date which is still "active". An "active" date is defined as the dates beginning with today's date, and spanning the 11 days following (that is, all dates from today to the date covered by today's "Main" file, but not including that date.

A class of service to be implemented will require "Flash Updates"; this class of service would provide a "Flash Update" file within 5 minutes after entry of any change. Such files would "trickle" across the leased line to StarSight throughout the day.

Show List File Introduction

StarSight Telecast operates a data network that delivers specially formatted data to StarSight subscribers located throughout the USA. This data is used to build an "on screen program guide" called StarSight that enables its subscribers to interactively view television program listings on their TV screen. The information for this network is derived from the StarSight database that is built by a computer program running on our UNIX computer. To build this database a data provider is required to supply StarSight with program listing files called Show list files.

GMT

A Show list file is a set of chronologically ordered records of television program listings. StarSight needs Show list files with the first record having its start time at 0000 hours GMT or for the first show starting after 0000 hours GMT. Thus the first record in each Show list file will be for the first show at or after Midnight GMT and the last record in a Show list file would be for the last show starting before 2400 hours GMT.

In other words a given Main file will contain only records for all POs for one day with one day starting at 0000 GMT and ending at 2400 GMT. Conversely a Main file must contain all of the shows for all POs for that day.

Daylight Saving Time

Since the "Start Time" field of any Show list record is always given in terms of GMT, the data provider is cautioned that daylight saving time must be accounted for twice a year, once in the spring when daylight saving is invoked and once in the fall when returning to standard time. This time modification must take place for all program data and all PO's unless the PO resides in a non daylight saving time state or county. Daylight saving time will cause the DP to compile or transfer records into the PO file that are corrected for the 1 hour forward adjustment in spring and the 1 hour backward adjustment in fall.

Please note that once showtimes have been adjusted to GMT, the Show list records should always be contiguous with no gaps or overlaps even on Daylight Saving transition dates.

SyndEx and Network Exclusivity

Due to FCC regulations a TV cable provider is required to block out programming (at the request of the local station) that directly conflicts in both time and content with the programming of a local broadcast TV station. This may cause the cable provider to substitute programming on that channel for the time in conflict StarSight must be informed of a SyndEx blockout no later than 24 hours prior to the blockout, in order to display the correct schedule for the blocked-out time slot.

Sports Blackout

Due to FCC regulations a sporting event can be blacked out from local TV coverage if a given percentage of tickets are not sold within 24 hours of that event StarSight requires Knowledge of the blackout.

Composite Channels

Some cable providers will divide a cable channel into multiple programming segments inserting programming from two or more program originators on one channel, at different times. The DP is required to provide StarSight with information that explains clearly what service is on such a channel at any given time. This information will be provided in the PO list for the channel in which the composite programming occurs.

The multiple PO information for composite channels is handled in the "RG List Format Specification" explained above.

Community Access Channels

The FCC requires each cable provider to support at least one Community Access Channel (CAC) for public use. Private citizens can request program time on this channel for their public views, public information or approved public programming.

StarSight requires a Show list file with the program information for each CAC, with the CAC Show list file name bound to the cable system name.

Low Power Stations LPTV

Low power (mostly privately owned) broadcast TV Stations exist in many areas of the United States. Some of these low power stations will require program listing support by the DP. These will be handled on a station by station basis with a Show list file for each LPTV.

The precise format in which the data for SyndEx, Network Exclusivity, ports Blackout, Composite Channel, Community Access Channel and Low Power Stations is to be provided, is to be determined Show List File Definition Show list files are made up of multiple records containing television program listings. The Show list records have a fixed number of fields. Most fields are of a fixed size with a few fields of variable size. This gives a Show list record a minimum and a maximum byte size. (See the Show list record field definition for the exact MIN/MAX size.)

Except for the end of record terminator, 0A hex (line feed) The Show list files will contain only ASCII characters and only within the range of 20 hex to 7E hex inclusive. This precludes any control codes, new line codes or end of record codes being part of any Show list file.

Show List File Names

There are three sorts of files discussed in this description. They all have the same record format, but they are used somewhat differently. They are referred to as the "Main" file, the "Update" file, and the "Flash" files for a given date. The Main file contains only the data for one particular date. It amounts to the initial load of all data for that date. The Update file contains information that revises Show list data that was provided on earlier days. It contains data which may encompass several different days, just depending on what new information has been entered. The Flash file contains update information that has just been entered.

The Main filename shall consist of the letters "MAIN" followed by four digits that represent the date, then [optionally] ,a period and the suffix "DAT". For example "MAIN0812.DAT" is a valid Main filename, and so is "MAIN0812".

The Update filename shall consist of the letters "UPDT" followed by four digits that represent the date, then [optionally] ,a period and the suffix "DAT". For example, UPDT0812.DAT is a valid Update filename, as is "UPDT0812".

Flash filenames shall consist of the letters "FLSH" followed by four digits that represent the time of day, then [optionally] ,a period and the suffix "DAT". For example, FLSH0642.DAT is a valid Update filename, as is "FLSH0642". Since interfaces to different types of computer systems are a given, the file naming convention has been chosen so as to work with virtually any computer operating system in existence. The alpha letters within filenames may be in either all uppercase or all lowercase; mixed case is not allowed.

Each PO's data will have its own portion of the file, identified by identifying the PO in the first field of each record concerned with that PO. The identification number (not to exceed 12 bytes) will consist of ASCII digits 0 through 9 only, and will be identical to the Station ID number assigned for this PO in the Station List file, which is defined in a separate document.

Show List File Length

Each file will contain Show list records as defined elsewhere in this document. The file will contain as many of these records as required to fill one 24-hour day.

Each record in a given file has a program length as defined in the "runtime" field and a "starttime" as defined in the starttime field of the Show list record. These Start Times and runtimes will cause the content of a file to be contiguous for the 24 hour day, leaving no gaps in the time sequence.

Contiguous Files

All "Main" file records will have contiguous Start Times and run length from day to day and week to week, etc., without any time gaps.

The Show list record format is shown in Table LXI.

TABLE LXI

| Field No. | FIELD NAME | MAX (bytes) | MIN (bytes) | DESCRIPTION |
|---|---|---|---|---|
| 1. | Station ID number | 12 | (1) | Unique ID number for this PO |
| 2. | Start Date | 8 | (8) | YYYYMMDD |
| 3. | Start Time | 4 | (4) | Program start time: hour, minutes |

TABLE LXI-continued

| Field No. | FIELD NAME | MAX (bytes) | MIN (bytes) | DESCRIPTION |
|---|---|---|---|---|
| 4. | Runtime | 4 | (4) | Program runtime minutes 0005 to 9999 |
| 5. | Close Caption | 1 | (1) | Close caption indicator. Y, N |
| 6. | Stereo | 1 | (1) | Program audio broadcast type. Y, N |
| 7. | Color | 1 | (1) | Program video broadcast type. C, B |
| 8. | Type | 3 | (3) | Program Type (see table 1, table 2) |
| 9. | Movie Number | 10 | (0) | Up to ten decimal digits |
| 10. | Group ID | 5 | (5) | unique series program link, 0 to 65536 |
| 11. | Title | 50 | (0) | Program title. |
| 12. | Program Descr. #1 | 300 | (0) | Program description. |
| 13. | Program Descr. #2 | 200 | (0) | Program description. |
| 14. | Program Descr. #3 | 100 | (0) | Program description. |
| 15. | Program Descr. #4 | 50 | (0) | Program description. |
| 16. | Critique | 1 | (1) | Movie critics rating 0,1,2,3,4 |
| 17. | Episode | 50 | (0) | Program episode description. |
| 18. | Year | 4 or | (0) | Year the movie was produced. |
| 19. | Director | 25 | (0) | Name of the movie director |
| 20. | Last Name of Star 1 | 25 | (0) | Last name of star in the movie. |
| 21. | First Name of Star 1 | 25 | (0) | First name of star in the movie. |
| 22. | Last Name of Star 2 | 25 | (0) | Last name of star in the movie. |
| 23. | First Name of Star 2 | 25 | (0) | First name of star in the movie. |
| 24. | Last Name of Star 3 | 25 | (0) | Last name of star in the movie. |
| 25. | First Name of Star 3 | 25 | (0) | First name of star in the movie. |
| 26. | Action | 1 | (1) | T, F. |
| 27. | Adventure | 1 | (1) | T, F. |
| 28. | Biography, Biographical | 1 | (1) | T, F. |
| 29. | Classic, Classical | 1 | (1) | T, F. |
| 30. | Coreedy | 1 | (1) | T, F. |
| 31. | Dance | 1 | (1) | T, F. |
| 32. | Docudrama | 1 | (1) | T, F. |
| 33. | Documentary | 1 | (1) | T, F. |
| 34. | Drama, Dramatic | 1 | (1) | T, F. |
| 35. | Fantasy | 1 | (1) | T, F. |
| 36. | Historical | 1 | (1) | T, F. |
| 37. | Horror | 1 | (1) | T, F. |
| 39. | Martial Arts | 1 | (1) | T, F. |
| 40. | Musical | 1 | (1) | T, F. |
| 41. | Mystery | 1 | (1) | T, F |
| 42. | Opera | 1 | (1) | T, F. |
| 43. | Romance, Romantic | 1 | (1) | T, F. |
| 44. | Satire, Satirical | 1 | (1) | T, F. |
| 45. | Science | 1 | (1) | T, F. |
| 46. | Science Fiction | 1 | (1) | T, F. |
| 47. | Suspense | 1 | (1) | T, F. |
| 48. | Thriller | 1 | (1) | T, F. |
| 49. | Western | 1 | (1) | T, F. |
| 50. | Situation Comedy | 1 | (1) | T, F. |
| 51. | G | 1 | (1) | T, F. |
| 52. | NC17 | 1 | (1) | T, F. |
| 53. | NR | 1 | (1) | T, F. |
| 54. | PG | 1 | (1) | T, F. |
| 55. | PG 13 | 1 | (1) | T, F. |
| 56. | R | 1 | (1) | T, F. |
| 57. | AO | 1 | (1) | T, F. |
| 58. | PROFANITY | 1 | (1) | T, F. |
| 59. | NUDITY | 1 | (1) | T, F. |
| 60. | VIOLENCE | 1 | (1) | T, F. |
| 61. | ADULT SITUATION | 1 | (1) | T, F. |

TABLE LXI-continued

| Field No. | FIELD NAME | MAX (bytes) | MIN (bytes) | DESCRIPTION |
|---|---|---|---|---|
| 62. | ADULT THEME | 1 | (1) | T, F. |
| 63. | ADULT LANGUAGE | 1 | (1) | T, F. |
| 64. | PPV EVENT | 1 | (1) | T, F. |
| 64. | 1st Vendor-Defined Field | — | — | |
| 65. | 2nd Vendor-Defined Field | — | — | |
| 63 + n. | nth Vendor-defined Field | — | — | |
| END OF RECORD | | 1 | (1) | LINEFEED ('\x0A hex') |

END OF RECORD markers and end of file markers will be a single LINEFEED (0A hex) and or CARRIAGE RETURN (0D hex)

Show types for general programming are shown in Table LXII:

TABLE LXII

| Show Type Code | Description |
|---|---|
| CHL | Children's Shows |
| COM | Comedies |
| DOC | Documentaries |
| MAG | Magazine |
| MIN | Mini-Series |
| MOV | Movies |
| REL | Religious |
| GAM | Game |
| SGN | Sign Off |
| MUS | Musicals |
| SER | Series |
| SPC | Specials |
| SRL | Soaps & Serials |
| TLK | Talk |
| NEW | News |
| EXR | Exercise |
| MIS | Miscellaneous |
| NAT | Nature |
| HOW | How-to |
| MED | Medical |
| NET | Network Series |
| SYN | Syndicated Series |
| BUS | Business |
| PUB | Public Affairs |
| LAP | Local Access Programming |
| PDP | Paid Programming |
| EDU | Education |
| UNK | Unknown |

NOTE:
Show type designators are always of fixed 3 character length. More designators may be added as required Show types for sports programming are shown in Table LXIII:

TABLE LXIII

| SHOW TYPE CODE | DESCRIPTION | SHOW TYPE CODE | DESCRIPTION |
|---|---|---|---|
| LSB | Baseball - Live | SPB | Baseball |
| LSK | Basketball - Live | SPK | Basketball |
| LSW | Bowling - Live | SPW | Bowling |
| LSX | Boxing - Live | SPX | Boxing |
| LBC | Bicycling - Live | SBC | Bicycling |
| LSN | Fishing - Live | SPN | Fishing |
| LSF | Football - Live | SPF | Football |
| LSG | Golf - Live | SPG | Golf |
| LSY | Gymnastics - Live | SPY | Gymnastics |
| LSH | Hockey - Live | SPH | Hockey |
| LSE | Horse Events - Live | SPE | Horse Events |
| LSL | Lacrosse - Live | SPL | Lacrosse |
| LSA | Motor Sports - Live | SPA | Motor Sports |
| LSS | Soccer - Live | SPS | Soccer |
| LSQ | Snow Skiing - Live | SPQ | Snow Skiing |
| LST | Tennis - Live | SPT | Tennis |
| LSJ | Track/Field - Live | SPJ | Track/Field |
| LSP | Sports Live | SPO | Sports |
| LS@ | Water Sports - Live | SP@ | Water Sports |
| LSZ | Wrestling - Live | SPZ | Wrestling |
| LSO | Volley Ball - Live | SSO | Volley Ball |
| SP1 | Sporting Shows | | |

NOTE:
Show type designators are always of fixed 3 character length. More designators may be added as require Detailed Show List Field Class Explanation The Show list record fields are divided into four classes. They are data fields that contain the program information, the delimiter fields that separate the data fields, the record terminators that terminate and separate the records and the end of file terminator.

Explanation of the Field Classes

Note that all of the fields in the following specification have a minimum and a maximum size described as bytes. Most fields are of a fixed length and must not vary from that specified length. Other fields have a variable minimum and a maximum length while a few are defined as a minimum or maximum. Even if a fixed length field contains no meaningful data, it must be padded out to its minimum length with the appropriate character. The maximum field length must also be adhered to and no field is ever allowed to exceed its maximum length.

Data Field Text

The text contained in any field will contain no control codes and all fields will contain only the ASCII character set within the range of the hexadecimal values 20 to 7E inclusive.

Delimiter

This one byte character is the pipe '|' (PIPE ASCII 7C hex). It separates the different fields of a Show list record, it is unique within a Show list record and will not be used anywhere else in the Show list record except as a delimiter. There are equal numbers of delimiters and data fields. The Show list records have the pattern of FIELD, DELIMITER, ., ., HELD, DELIMITER, END OF RECORD. A delimiter follows the last data field of any record.

End Of Record

All records are terminated with an end of record terminator that follows the last delimiter of the last data field in a Show list record. This terminator is the ASCII code for Line Feed (0A hex), or Carriage Return (0D hex), or both together in either order.

End Of File

The end of file terminator is defined to be the text string "ZZZZZEOF". The final data record of a Show list file must be followed by an End of File terminator, to signal that all data has been transmitted.

Detailed Data Field Explanation
Field #
1. Station ID (1 to 12 bytes) The Station ID is the unique number (assigned by the data provider. See the Station List record format) used to refer to this program originator (TV station, cable channel or satellite provider). It is never greater than 10 decimal digits. No other characters are allowed.

2. Start Date (8 bytes) 8 byte number describing the GMT date when the program will air. (year, month, day) This date must be the same for all records in a given file. Bytes 1 through 4 define the current year, for example: 1991.

Bytes 3 and 4 define the month, with January numbered as 01, December as 12.

Bytes 5 and 6 display the day of the month from 01 to 31.

3. Start Time (4 bytes) 4 byte number is the program air time GMT and is entered as military time.

Bytes 1 and 2 are the hour in GMT time that the program will air.

(Example

6am=06, noon=12,

6pm=18, midnight=00)

Bytes 3 and 4 are the minute that the program will air. (Example one MIN past the hour=01, 1 minute before the hour=59)

4. Runtime (4 bytes) Program length in minutes. The minimum show run time length is 0005 minutes and the maximum length is 9999 minutes. (The StarSight data base program breaks shows with runtimes greater than 240 minutes into multiple shows of 240 minute lengths.) Runtime data is shown in Table LXIII.

TABLE LXIII

| Field Name | Field # | Sample Data |
|---|---|---|
| Station ID | 1 | 5963215 |
| Start Date | 2 | 991231 |
| Start Time | 3 | 0900 |
| Run Time | 4 | 0060 |

Sample Fragment of the above Show list record fields.
5963215|1|991231|0900|0060|
Field #
5. Closed Caption (1 byte) If the show is closed captioned this field will be a "Y" (yes). If not it will be "N" (no).

6. Stereo (1 byte) If the show is in stereo this field will be a "Y" (yes). If not it will be "N" (no).

7. Color (1 byte) If the show is in color this field will be a "C" (color). If not it will be "B" (black & white).

8. Type (3 bytes) mnemonic, indicating the program type indicating movie, sports, news, talk show, etc. (See Tables LXI and LXII)

9. Movie Number (0 to 10 decimal digits) This unique number is provided by the data provider as a unique number for a show and is different for the title of every show or movie ever made. Once used this number remains locked for future reference to that title.

Examples of these fields are given in Table LXIV.

TABLE LXIV

| Field Name | Field # | Sample Data |
|---|---|---|
| Closed Caption | 5 | Y |
| Stereo | 6 | N |
| Color | 7 | C |
| Type | 8 | MOV |
| Movie Number | 9 | 1234567890 |

A sample fragment of the above Show list record fields is as follows:
Y|N|C|MOV|1234567890|
Field #
10. Group ID (5 bytes) This 5 byte number will be from 00000 for no program link, to 65535 for up to 65,535 unique program links. This number allows for unique groupings of two or more special programs or shows that may need to be linked together for recording purposes. The linking or grouping of these programs would be required for the series recording of programs that do not have the same title name as in ROOTS 1 and ROOTS 2. This field will be 00000 if there is no program link and a unique decimal number up to 65,535 if there is a link. This unique number is kept until the linked programming is completed and any show with a reference to that number has passed out of the database. After that time, this number can be recycled and used over again. No provision is made to lock a Group ID number to any show on a permanent basis.

The upper bound of 65,535 is necessary since this number is converted to a 2 byte binary number by StarSight and sent to the SU in this manner.

This number may be used to cross channel boundaries and link together as a group two or more shows on two or more different channels, provided that there is no conflict in record times.

11. Title (0 to 50 bytes) This field contains the title or name of the program, names of sports team, talk show, etc.

Examples of these fields are given in Table LXV.

TABLE LXV

| Field Name | Field # | Sample Data |
|---|---|---|
| Group ID | 10 | 0000 |
| Title | 11 | Man flys. |

A sample fragment of the above Show list record fields is as follows:
0000|Man Flys|

The following four program description fields are to have different descriptions when available. Multiple descriptions will not show as multiple copies of the same description. A description must go into the smallest field that it will fit completely into. If 4 different program descriptions exist, insert the descriptions into the appropriate length field in descending order.

Fields 12–19: Descriptions, Critique, Episode Title, Production Year, and Director.

12. Program Description 1 (0 to 300 bytes) This is a longest description of the of the program, show, sporting event, etc.

13. Program Description 2 (0 to 200 bytes) This is a shortened description of the of the program, show, sporting event, etc.

14. Program Description 3(0 to 100 bytes) This is a shortened description of the of the program, show, sporting event, etc.
15. Program Description 4 (0 to 50 bytes) This is the shortest available description of the of the program, show, sporting event, etc.
16. Critique (1 byte) Critics rating of the movie. This is '0' if there is no rating or a 1,2,3 or 4 depending upon the quality of the movie, 4 being the best.
17. Episode (0 to 50 bytes) This provides for the episode description of a series show.
18. Year (0 or 4 bytes) This is the year that the movie or show was produced. (1956, etc.)
19. Director (0 to 25 bytes) The name of the movie director.

Examples of these fields are given in Table LXVI.

| Field Name | Field # | Sample Data |
| --- | --- | --- |
| Description 1 | 12 | Man sprouts wings, flys south for the winter and saves the population of a foreign country |
| Description 2 | 13 | Man sprouts wings, flys south for the winter and saves a country |
| Description 3 | 14 | Man sprouts wings and saves a country |
| Description 4 | 15 | Man flys and saves country |
| Critique | 16 | 4 |
| Episode | 17 | Flying man |
| Year | 18 | 1999 |
| Director | 19 | John Filmmaker |

A sample fragment of the above Show list record fields is as follows: Man sprouts wings, flys south for the winter and saves the population of a foreign country|man sprouts wings, flys south for the winter and saves a country|Man sprouts wings and saves a country|man flys and saves country|4|Flying man|1999|John Filmmaker|

Fields 20–25: Names of Stars
20. Star 1 Last Name (0 to 25 bytes) The last name of the 1st actor.
21. Star 1 First Name (0 to 25 bytes) The first (middle) name of the 1st actor.
22. Star 2 Last Name (0 to 25 bytes) The last name of the 2nd actor.
23. Star 2 First Name (0 to 25 bytes) The first (middle) name of 2nd actor.
24. Star 3 Last Name (0 to 25 bytes) The last name of the 3rd actor.
25. Star 3 First Name (0 to 25 bytes) The first (middle) name of 3rd actor.

Examples of these fields are given in Table LXVII.

TABLE LXVII

| Field Name | Field # | Sample Data |
| --- | --- | --- |
| Star 1 | 20 | Falls |
| Star 1 | 21 | Joe |
| Star 2 | 22 | Floats |
| Star 2 | 23 | Mary |
| Star 3 | 24 | Soars |
| Star 3 | 25 | Sam |

A sample fragment of the above Show list record fields is as follows:

Falls|Joe|Floats|Mary|Soars|Sam|

Genre Byte Fields: Fields 26–49

The Genre Byte Fields are divided into 3 categories. The first is the THEME category and it provides for the general description of the show type. StarSight uses this theme information to divide the programs into discrete categories when theme searches are done. The second category is the MPAA rating and is used to inform the viewer of the movie industries rating of appropriate age of the viewer for this show. This rating is usually only valid for movies. The third category further explains the MPAA rating.

The following 24 data fields are the explanation of the program theme type. A maximum of 5 of these 24 fields are set as 'T' for any 1 program. Some are mutually exclusive and will not be set to 'T' in unison at any time.

Field #
26. Action
27. Adventure
28. Biography
29. Classic
30. Comedy
31. Dance
32. Docudrama
33. Documentary
34. Drama
35. Fantasy
36. Historical
37. Horror
38. Martial Arts
39. Musical
40. Mystery
41. Opera
42. Romance
43. Satire
44. Science
45. Science Fiction
46. Suspense
47. Thriller
48. Western
49. Situation Comedy An example of a record fragment involving the fields above is given in Table LXVIII:

TABLE LXVIII

| Field Name | Field # | Sample Data |
| --- | --- | --- |
| Action | 26 | T |
| Adventure | 27 | T |
| Biography | 28 | F |
| Classic | 29 | F |
| Comedy | 30 | T |
| Damce | 31 | F |
| Docudrama | 32 | F |
| Documentary | 33 | F |
| Drama | 34 | F |
| Fantasy | 35 | T |
| Historical | 36 | F |
| Horror | 37 | F |
| Martial Arts | 38 | F |
| Musical | 39 | F |
| Mystery | 40 | F |
| Opera | 41 | F |
| Romance | 42 | F |
| Satire | 43 | T |
| Science | 44 | F |
| Science Fiction | 45 | T |
| Suspense | 46 | T |
| Thriller | 47 | F |

TABLE LXVIII-continued

| Field Name | Field # | Sample Data |
| --- | --- | --- |
| Western | 48 | F |
| Situation Comedy | 49 | F |

A sample fragment of the above Show list record fields is as follows:.

T|T|F|F|T|F|F|F|F|T|F|F|F|F|F|F|T|F|T|T|F|F|F|

MPAA rating: fields 50–56

Field #

50. G (1 byte) General audience
51. NC17 (1 byte) No children under 17.
52. NR (1 byte) Not rated.
53. PG (1 byte) Parental guidance.
54. PG13 (1 byte) Parental guidance under 13 years.
55. R (1 byte) Restricted.
56. AO (1 byte) Adult Only. Most severe rating.

Examples of these fields are given in Table LXIX.

TABLE LXIX

| Field Name | Field # | Sample Data |
| --- | --- | --- |
| G | 50 | T |
| NC17 | 51 | F |
| NR | 52 | F |
| PG | 53 | F |
| PG13 | 54 | F |
| R | 55 | F |
| AO | 56 | F |

A sample fragment of fields 50–56 is as follows:

T|F|F|F|F|F|F|

MPAA explanation: Fields 57–62.

Field #

57. Profanity (1 byte)
58. Nudity 11 byte)
59. Violence (1 byte)
60. Adult Situations (1 byte)
61. Adult Themes (1 byte)
62. Adult Language (1 byte)
63. PPV Event: Field 63.

(1 byte) set to 'T' to indicate this show is a Pay-per-View Event, 'F' if not, empty if not known.

Examples of these fields are given in Table LXX.

TABLE LXX

| Field Name | Field # | Sample Data |
| --- | --- | --- |
| Profanity | 57 | T |
| Nudity | 58 | F |
| Violence | 59 | T |
| Adult Situations | 60 | F |
| Adult Themes | 61 | T |
| Adult Language | 62 | T |
| PPV Event | 63 | T |

A record fragment for fields 57–63 is as follows:

T|F|T|F|T|T|T|

Fields 64 and Above: Vendor-Defined Fields

All fields following the 'PPV Event' field are optional (except the mandatory End of Record terminator). No minimum or maximum number of these fields is prescribed, and no particular limit is enforced as to the number of characters in any one of these fields.

Vendor may use this portion of the record to provide additional data related to the show which the prescribed format might make difficult or impossible to convey. Each Vendor-defined field should be used to describe one data element.

Field content is free-format, with the previously-stated constraint that all data must be transferred as printable ASCII text, with no Vertical Bar(hex 7C), Carriage Return (hex 0D), or Linefeed (hex 0A) occurring as data, since these characters have the special meanings of "Field Delimiter" (Vertical Bar) and "End-of-Record" (Carriage Return and/or Linefeed), respectively.

The intention is to allow the vendor as free a hand as possible in describing the show. Additional information about show type, genre, category, subcategory, etc. can be placed in these fields, and also other types of information which may not be currently anticipated. If these fields are used, vendor must separately provide StarSight with a document which defines as fully as possible how these fields are used by the vendor.

The example that follows is not intended to prescribe a set format; it is just illustrating one possible way the Vendor Defined Fields could supplement the other information in the record. In this example, we will assume the vendor has additional categorization available for sports shows, over and above what is prescribed in the normal format. The vendor must document the fields separately from the data itself: let's say Vendor XYZ has provided StarSight with a document containing the following information:

| Field Name | Content or Meaning |
| --- | --- |
| SPNAME | Name of sport |
| SPENV | "Indoor" or "Outdoor" |
| SP$ | "Professional", "Amateur", or "Pro-Am" |
| SPLIVE | If present, game is being carried live. |
| SPTEAM | If present, this is a team sport |

NOTES ON SYNTAX IN VENDOR-DEFINED FIELDS SUPPLIED BY VENDOR XYZ: "Field Name" is an unbroken ASCII string (no spaces or tabs allowed) from the list above. The presence of the field name in some cases implies a "TRUE" status; in other cases a value over and above the field's name is also specified. If a value is being specified, the field name is followed by a single space or tab, and everything else in the field comprises its value.

Given this information, Vendor XYZ could now transmit StarSight a record with Vendor-Defined fields that look like the example below:

| First Vendor Defined Field | 64 | SPNAME Field Hockey |
| Second Vendor Defined Field | 65 | SP$ Professional |
| Third Vendor Defined Field | 66 | SPENV Outdoor |
| Fourth Vendor Defined Field | 67 | SPTEAM |
| Fifth Vendor Defined Field | 68 | SPLIVE |

Note that even though SPENV, for example, is specified in field #66 in this record, it could be specified in any Vendor-Defined field, or not mentioned at all. The same observation applies to all the Vendor-Specified fields. This is true because of the method used in this example of giving the name of the field as data. If the vendor chose to stick to a more rigid convention, in which every field is always present whether there is data for that field or not, the name or usage of each field could be entirely position-dependent, and could be documented separately, thus eliminating the need to transmit field names with the data; either method is acceptable, and if the Vendor has another method they prefer, this would probably be acceptable too, so long as it stays within the rules stated earlier.

A sample fragment of the above Show list record fields is as follows:

SPNAME Field Hockey|SP$ Professional|SPENV Outdoor|SFTEAM|SPLIVE|End Of Record (LINEFEED hex 0A) and/or (CARRIAGE RETURN hex 0D)

Marks the end of a record. Flexibility of definition is to allow for the transfer of text between different types of computer systems.

End Of File Record

Following the final data record in a file, the Vendor must append a special End-of-File record, which is defined to be a record that begins with the text string "ZZZZZEOF", followed (possibly with intervening Vendor-Defined fields) by End of Record. StarSight's software will encounter this text string when it is expecting to read a Call Sign value; the value mad will be tested against this reserved value, and if they match, StarSight's software will halt reading of the file.

More importantly, this text string will also be used to test for completion of a file transfer. If a new file appears in the data input directory, the input software will examine the final record of the file for this symbol; if the symbol is not found, then the data transfer has either aborted in midstream, or has not yet completed; in either case, it would not yet be appropriate to begin loading the data Note that the definition of this record is that it begins with ZZZZZEOF and ends with End of Record; the remainder of the record may defined by the Vendor, within the usual constraints for Vendor-Defined fields. Supplemental information that would be useful here might include a count of the number of records in the file, the date/time of production, a list of stations with which problems occurred, or any other summary information the vendor considers relevant.

SPECIAL NOTE(s):

The format of the Show list records that are used in building the StarSight electronic database are highly integrated into our database program and these formats must not be altered or changed in any way without the written consent of StarSight Telecast. Use of the Vendor-Defined Fields is allowed, provided the syntax and meanings of the fields used are clearly documented in advance of use. Since the PO names used within the Show list file are referenced by the StarSight database application, the PO names must be unique and remain constant. The changing of any PO name without proper coordination with StarSight will cause a mismatch of data in the StarSight database.

It should be apparent to those skilled in the art that various changes in form and details of the invention as shown and described may be made. It is intended that such changes be included within the spirit and scope of the claims appended hereto.

What is claimed is:

1. A method of compiling and displaying television schedule information data for use in a subscriber data processing system in a television schedule information transmission system having a central data processing system and a plurality of subscriber data processing systems, wherein the television schedule information data is transmitted to each of such subscriber data processing systems in a television broadcast signal and wherein, each of such subscriber data processing systems has a microprocessor, a memory, and a display monitor, said method comprising the steps of:

receiving the television broadcast signal in the form of commands including instructions for the microprocessor and television schedule information data;

extracting a portion of the television schedule information data from the television broadcast signal responsive to the instructions included in the commands;

storing the portion of the television schedule information data in a database residing in the memory as database items, wherein each of the database items has a handle as an index into a handle table in the database identifying memory locations corresponding to the handle, the handle table being used by a computer program to reference the memory locations;

assembling portions of the television schedule information data responsive to the instructions included in the commands; and displaying the portions of the television schedule information data on the display monitor.

2. The method of claim 1, wherein the television schedule information data is received by a subscriber data processing system if the commands are directed to that subscriber data processing system.

3. The method of claim 2, wherein a batch number as part of a command is used as a group address to direct the command to at least one subscriber data processing system sharing the same batch number.

4. The method of claim 2, in which one of the commands is an authorization command authorizing the subscriber data processing system to begin collecting and displaying the television schedule information data.

5. The method of claim 1, wherein at least one of the commands received is private to the subscriber data processing system.

6. The method of claim 1, wherein the television schedule information data is received in the blanking interval of the television broadcast signal.

7. The method of claim 1, wherein the receiving step comprises the step of decrypting an encrypted command.

8. The method of claim 1, wherein the assembling step comprises the steps of:

executing the instructions included in the commands;

determining if certain of the television schedule information has already been acquired by the subscriber data processing system; and acquiring the certain of the television schedule information if it has not already been acquired.

9. The method of claim 1, wherein the assembling step comprises the steps of:

periodically receiving a time command at a predetermined rate having a value for the current time of the day and date;

resetting a field for the current time of the day and date in the memory to agree with the value received in the time command.

10. The method of claim 9, further comprising the steps of:

receiving a daylight change command defining when a next daylight change will occur;

adding a time-zone offset to a local time to show the correct adjusted local time when the next daylight change occurs.

11. The method of claim 1, wherein the assembling step comprises the steps of:

receiving a command including channel ID numbers and television scheduling information;

matching the received channel ID numbers to a list of channel ID numbers stored in the memory representing the valid channels in the subscriber data processing system; and compiling the television scheduling information on the channels for which the channel ID number in the list stored in the memory representing the valid channel matches that of the received channel ID number.

12. The method of claim 11, further comprising the steps of:

receiving a second command providing at least 24 hours of television scheduling information data.

13. The method of claim 11, further comprising the steps of:

receiving a show title command containing a name of a television program;

comparing the name of the television program to a show list maintained in the memory;

saving the show title command in the database if there is a match between the name of the television program and any entry in the show list; and ignoring the show title command in the database if there is not a match between the name of the television program and any entry in the show list.

14. The method of claim 13, wherein the name of a television program is compressed text using a Hoffman encoding scheme.

15. The method of claim 1, wherein the handle table referencing memory blocks comprising the memory locations with the handles includes a first entry to indicate free memory locations and a second entry to indicate in-use memory locations.

16. The method of claim 1, wherein the storing step comprises the steps of:

periodically running a garbage collection process to collect unused memory blocks;

recombining the unused memory blocks into larger memory blocks; and making the larger memory blocks accessible by the computer program.

17. The method of claim 1, wherein the database items are arranged hierarchically in descending order as a list of channels and a list of show titles, show description, show start time and show durations for each channel.

18. The method of claim 17, wherein the database items are further arranged hierarchically in descending order as a theme table defining theme categories, theme sub-table defining theme sub-categories, and theme show table defining themes of a selected list of shows.

19. A method of compiling and displaying television schedule information data for use in a subscriber data processing system in a television schedule information transmission system having a central data processing system and a plurality of subscriber data processing systems, wherein the television schedule information data is transmitted to each of such subscriber data processing systems in a television broadcast signal and wherein, each of such subscriber data processing systems has a microprocessor, a memory, and a display monitor, said method comprising the steps of:

receiving the television broadcast signal in a blanking interval of the television broadcast signal in the form of commands including instructions for the microprocessor and television schedule information data, wherein the television schedule information data is received by a subscriber data processing system only if the commands are directed to that subscriber data processing system;

extracting at least a portion of the television schedule information data from the television broadcast signal responsive to the instructions included in the commands;

storing the at least a portion of the television schedule information data in a database residing in the memory as database items arranged hierarchically in descending order, wherein each of the database items has a handle as an index into a handle table in the database identifying memory locations corresponding to the handle, the handle table is used by a computer program to reference the memory locations and perform garbage collection;

assembling portions of the television schedule information data responsive to the instructions included in the commands; and displaying the portions of the television schedule information data on the display monitor using a baseband video or RF output signal.

20. An apparatus for compiling and displaying television schedule information data in a subscriber data processing system in a television schedule information transmission system having a central data processing system and a plurality of subscriber data processing systems, wherein the television schedule information data is transmitted in a television broadcast signal, comprising of:

a microprocessor;

a memory;

a display;

means for receiving the television broadcast signal in the form of commands including instructions for the microprocessor and television schedule information data;

means for extracting at least a portion of the television schedule information data from the television broadcast signal responsive to the instructions included in the commands;

means for storing the at least a portion of the television schedule information data in a database residing in the memory as database items, wherein each of the database items has a handle as an index into a handle table in the database identifying memory locations corresponding to the handle, the handle table is used by a computer program to reference the memory locations;

means for assembling portions of the television schedule information data responsive to the instructions included in the commands; and means for displaying the portions of the television schedule information data on the display monitor.

21. The apparatus of claim 20, wherein the memory comprises:

a ROM for storing code for the microprocessor; and a RAM for storing program data.

22. The apparatus of claim 20, further comprising a watchdog timer for error recovery.

23. The apparatus of claim 20, further comprising electronic circuitry for generating baseband video and RF output signals.

24. An apparatus for compiling and displaying television schedule information data in a subscriber data processing system in a television schedule information transmission system having a central data processing system and a plurality of subscriber data processing systems, wherein the television schedule information data is transmitted in a television broadcast signal, comprising of:

a microprocessor;

a memory including a ROM for storing code for the microprocessor and a RAM for storing program data;

a display;

means for receiving the television broadcast signal in a blanking interval of the television broadcast signal in the form of commands including instructions for the microprocessor and television schedule information data, wherein the television schedule information data is received by a subscriber data processing system only if the commands are directed to that subscriber data processing system;

means for extracting at least a portion of the television schedule information data from the television broadcast signal responsive to the instructions included in the commands;

means for storing the at least a portion of the television schedule information data in a database residing in the memory as database items arranged hierarchically in descending order, wherein each of the database items has a handle as an index into a handle table in the database identifying memory locations corresponding to the handle, the handle table is used by a computer program to reference the memory locations and perform garbage collection;

means for assembling portions of the television schedule information data responsive to the instructions included in the commands; and means for displaying the portions of the television schedule information data on the display monitor using a baseband video or RF output signal.

* * * * *